US012666081B2

(12) United States Patent
Choi et al.

(10) Patent No.: US 12,666,081 B2
(45) Date of Patent: *Jun. 23, 2026

(54) VIDEO ENCODING METHOD AND DEVICE, AND VIDEO DECODING METHOD AND DEVICE

(71) Applicant: SAMSUNG ELECTRONICS CO., LTD., Suwon-si (KR)

(72) Inventors: Kiho Choi, Suwon-si (KR); Minsoo Park, Suwon-si (KR); Minwoo Park, Suwon-si (KR); Woongil Choi, Suwon-si (KR); Yinji Piao, Suwon-si (KR); Seungsoo Jeong, Suwon-si (KR); Narae Choi, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/011,923

(22) Filed: Jan. 7, 2025

(65) Prior Publication Data

US 2025/0150628 A1      May 8, 2025

Related U.S. Application Data

(63) Continuation of application No. 17/416,987, filed as application No. PCT/KR2019/018244 on Dec. 20, 2019, now Pat. No. 12,231,689.
(Continued)

(51) Int. Cl.
*H04N 19/625* (2014.01)
*H04N 19/105* (2014.01)
(Continued)

(52) U.S. Cl.
CPC ......... *H04N 19/625* (2014.11); *H04N 19/105* (2014.11); *H04N 19/136* (2014.11);
(Continued)

(58) Field of Classification Search
CPC .... H04N 19/105; H04N 19/119; H04N 19/12; H04N 19/136; H04N 19/159;
(Continued)

(56) References Cited

U.S. PATENT DOCUMENTS 9,628,799 B2     4/2017  Kim et al.
9,635,363 B2     4/2017  Kim et al.
(Continued)

FOREIGN PATENT DOCUMENTS

CN          108605135 A        9/2018
CN          108632611 A        10/2018
(Continued)

OTHER PUBLICATIONS

"Joint Separable and Non-Separable Transforms for Next-Generation Video Coding"—Zhao et al., IEEE Transactions on Image Processing, vol. 27, No. 5, May 2018 (Year: 2018).*
(Continued)

*Primary Examiner* — Mainul Hasan
(74) *Attorney, Agent, or Firm* — Sughrue Mion, PLLC

(57) ABSTRACT

Provided is an image decoding method including: obtaining, from a bitstream, a syntax element regarding multiple transform selection (MTS) with respect to a current coding unit or a current transform unit included in the current coding unit; determining a horizontal transform kernel or a vertical transform kernel with respect to the current transform unit based on the obtained syntax element; obtaining a residual signal by performing inverse transformation on the current transform unit, based on the determined horizontal transform kernel or vertical transform kernel with respect to the
(Continued)

START

OBTAIN, FROM BITSTREAM, SYNTAX ELEMENT REGARDING MULTIPLE TRANSFORM SELECTION (MTS) WITH RESPECT TO CURRENT CODING UNIT OR CURRENT TRANSFORM UNIT INCLUDED IN CURRENT CODING UNIT — S105

DETERMINE HORIZONTAL TRANSFORM KERNEL OR VERTICAL TRANSFORM KERNEL WITH RESPECT TO CURRENT TRANSFORM UNIT BASED ON SYNTAX ELEMENT — S110

OBTAINER —105
IMAGE DECODER —110
100

OBTAIN RESIDUAL SIGNAL BY PERFORMING INVERSE TRANSFORMATION ON CURRENT TRANSFORM UNIT, BASED ON DETERMINED HORIZONTAL OR VERTICAL TRANSFORM KERNEL WITH RESPECT TO CURRENT TRANSFORM UNIT — S115

GENERATE RECONSTRUCTION BLOCK INCLUDING CURRENT CODING UNIT OR CURRENT TRANSFORM UNIT BASED ON RESIDUAL SIGNAL WITH RESPECT TO CURRENT TRANSFORM UNIT — S120

END current transform unit; and generating a reconstruction block including the current coding unit or the current transform unit based on the residual signal with respect to the current transform unit.

4 Claims, 36 Drawing Sheets

Related U.S. Application Data

(60) Provisional application No. 62/864,845, filed on Jun. 21, 2019, provisional application No. 62/811,774, filed on Feb. 28, 2019, provisional application No. 62/792,261, filed on Jan. 14, 2019, provisional application No. 62/783,670, filed on Dec. 21, 2018.

(51) Int. Cl.

| | |
|---|---|
| *H04N 19/136* | (2014.01) |
| *H04N 19/176* | (2014.01) |
| *H04N 19/186* | (2014.01) |
| *H04N 19/503* | (2014.01) |
| *H04N 19/593* | (2014.01) |
| *H04N 19/70* | (2014.01) |

(52) U.S. Cl.
CPC ......... *H04N 19/176* (2014.11); *H04N 19/186* (2014.11); *H04N 19/503* (2014.11); *H04N 19/593* (2014.11); *H04N 19/70* (2014.11)

(58) Field of Classification Search
CPC .. H04N 19/186; H04N 19/503; H04N 19/593; H04N 19/625; H04N 19/70
See application file for complete search history.

(56) References Cited

U.S. PATENT DOCUMENTS

| | | | | |
|---|---|---|---|---|
| 10,645,399 | B2 | 5/2020 | Jeon et al. | |
| 11,265,578 | B2 | 3/2022 | Choi et al. | |
| 2018/0020218 | A1 | 1/2018 | Zhao et al. | |
| 2018/0103252 | A1 | 4/2018 | Hsieh et al. | |
| 2018/0249179 | A1* | 8/2018 | Han | H04N 19/137 |
| 2020/0092555 | A1 | 3/2020 | Zhao et al. | |
| 2020/0099924 | A1* | 3/2020 | Seregin | H04N 19/134 |
| 2020/0112734 | A1* | 4/2020 | Zhao | H04N 19/186 |
| 2020/0177901 | A1 | 6/2020 | Choi et al. | |
| 2021/0120269 | A1* | 4/2021 | Chen | H04N 19/119 |
| 2021/0203969 | A1* | 7/2021 | Salehifar | H04N 19/12 |
| 2021/0235072 | A1* | 7/2021 | Ko | H04N 19/105 |
| 2022/0007022 | A1* | 1/2022 | Kang | H04N 19/70 |
| 2022/0109877 | A1 | 4/2022 | Choi et al. | |
| 2022/0353511 | A1* | 11/2022 | Lim | H04N 19/137 |
| 2022/0394300 | A1* | 12/2022 | Koo | H04N 19/12 |

FOREIGN PATENT DOCUMENTS

| | | | | |
|---|---|---|---|---|
| CN | 108712649 | A | 10/2018 | |
| KR | 10-2366765 | B1 | 2/2022 | |
| WO | 2015/012600 | A1 | 1/2015 | |
| WO | 2017111648 | A1 | 6/2017 | |
| WO | 2018160231 | A1 | 9/2018 | |
| WO | 2019009584 | A1 | 1/2019 | |
| WO | PCT/KR2019/018244 | | 12/2019 | |
| WO | WO-2020050651 | A1 * | 3/2020 | ............. H04N 19/18 |

OTHER PUBLICATIONS

"Improvement of HEVC Inter-coding Mode Using Multiple Transforms"—Philippe et al., 2017 25th European Signal Processing Conference (EUSIPCO) (Year: 2017).*

Office Action issue on Dec. 3, 2024 by the Vietnamese Patent Office in corresponding VN Patent Application No. 1-2021-03748.

Office Action issued May 2, 2024 by the European Patent Office for EP Patent Application No. 19899921.1.

Office Action issued Apr. 24, 2024 by the Korean Patent Office for KR Patent Application No. 10-2022-7005673.

Office Action issued Mar. 13, 2023 by the India Intellectual Property Office in corresponding IN Patent Application No. 202147031180.

Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, Document: JVET-L1002-v1, 2018, Total 37 pages, XP030198628.

Chen et al., "AHG17: adding control of transform skip coding," Joint Video Experts Team (JVET) of ITU-T SG 16 WP 3 and ISO/IEC JTC 1/SC 29/WG 11, Document: JVET-O0783-v1, 2019, Total 6 pages, XP030220361.

Benjamin Bross, et al., "Versatile Video Coding (Draft 2)", Joint Videdo Experts Team (JVET) of ITU-T SG 16 WP 3 and ISO/IEC JTC 1/SC 29/WG 11, JVET-K1001 version 6, Jul. 10-18, 2018, 141 pages.

Zhao, et al., "CE6: Sub-block transform for inter blocks (CE6.4.1)", Joint Video Experts Team (JVET) of ITU-T SG 16 WP 3 and ISO/IEC JTC 1/SC 29/WG 11, 13th Meeting, Jan. 9-18, 2019, Document: JVET-M0140 v1v3, pp. 1-19.

Zhao, Y., et al., "CE6: Sub-block transform for inter blocks (CE6.1.2)", Joint Video Experts Team (JVET) of ITU-T SG 16 WP 3 and ISO/IEC JTC 1/SC29/WG 11, 12th Meeting: Oct. 3-12, 2018, Document: JVET-L0358-v1v2, pp. 1-9.

Choi, et al., "CE6-related: Simplification on MTS kernel derivation", Joint Video Experts Team (JVET) of ITU-T SG 16 WP 3 and ISO/IEC JTC 1/SC 29/WG 11, 12th Meeting: Macao, CN, Sep. 2018, pp. 1-5.

Bross, B., et al., "Versatile Video Coding (Draft 3)", Joint Video Experts Team (JVET) of ITU-T SG 16 WP 3 and ISO/IEC JTC 1/SC 29/WG 11, 12th Meeting, Oct. 3-12, 2018, Document: JVET-L1001 v6v7v11, pp. 1-226.

Communication dated Oct. 6, 2022, issued by the European Patent Office in counterpart European Application No. 19899921.1.

Communication dated Feb. 3, 2024, issued by the National Intellectual Property Administration, PRC in Chinese Application No. 201980092531.9.

Communication dated Jul. 13, 2021 issued by the Korean Intellectual Property Office in application No. 10-2021-7005950.

International Search Report (PCT/ISA/210) dated Apr. 1, 2020 issued by the International Searching Authority in International Application No. PCT/KR2019/018244.

International Preliminary Report on Patentability (PCT/IPEA/409) dated May 24, 2021 issued by the International Searching Authority in application No. PCT/KR2019/018244.

Extended European Search Report dated Oct. 25, 2024, issued by the European Patent Office in European Application No. 24196671.2.

Bross et al., "Versatile Video Coding (draft 7)", Joint Video Experts Team (JVET) of ITU-T SG 16 WP 3 and ISO/IEC JTC 1/SC 29/ WG 11, jvet-p2001-v8, 2019, pp. 1-455 (473 pages total).

U.S. Appl. No. 17/416,987, filed Jun. 21, 2021.

U.S. Appl. No. 62/864,845, filed Jun. 21, 2019.

U.S. Appl. No. 62/811,774, filed Feb. 28, 2019.

U.S. Appl. No. 62/792,261, filed Jan. 14, 2019.

U.S. Appl. No. 62/783,670, filed Dec. 21, 2018.

* cited by examiner

FIG. 1C

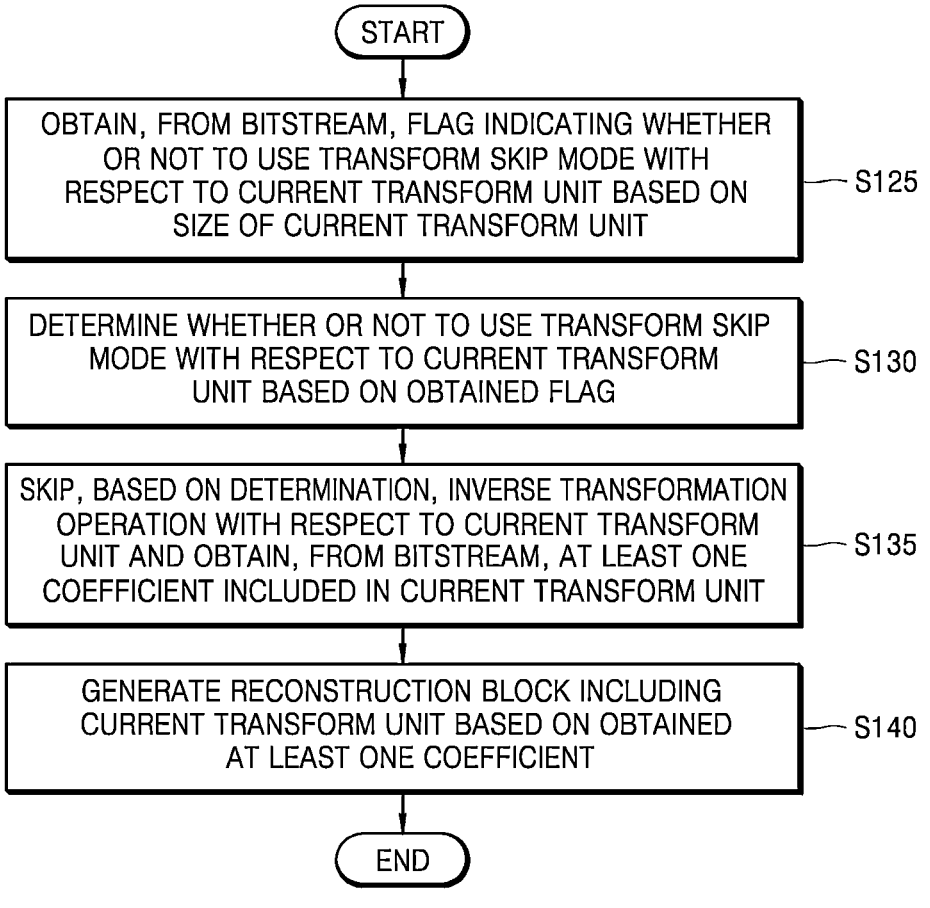

START

OBTAIN, FROM BITSTREAM, FLAG INDICATING WHETHER OR NOT TO USE TRANSFORM SKIP MODE WITH RESPECT TO CURRENT TRANSFORM UNIT BASED ON SIZE OF CURRENT TRANSFORM UNIT — S125

DETERMINE WHETHER OR NOT TO USE TRANSFORM SKIP MODE WITH RESPECT TO CURRENT TRANSFORM UNIT BASED ON OBTAINED FLAG — S130

SKIP, BASED ON DETERMINATION, INVERSE TRANSFORMATION OPERATION WITH RESPECT TO CURRENT TRANSFORM UNIT AND OBTAIN, FROM BITSTREAM, AT LEAST ONE COEFFICIENT INCLUDED IN CURRENT TRANSFORM UNIT — S135

GENERATE RECONSTRUCTION BLOCK INCLUDING CURRENT TRANSFORM UNIT BASED ON OBTAINED AT LEAST ONE COEFFICIENT — S140

END

FIG. 1D

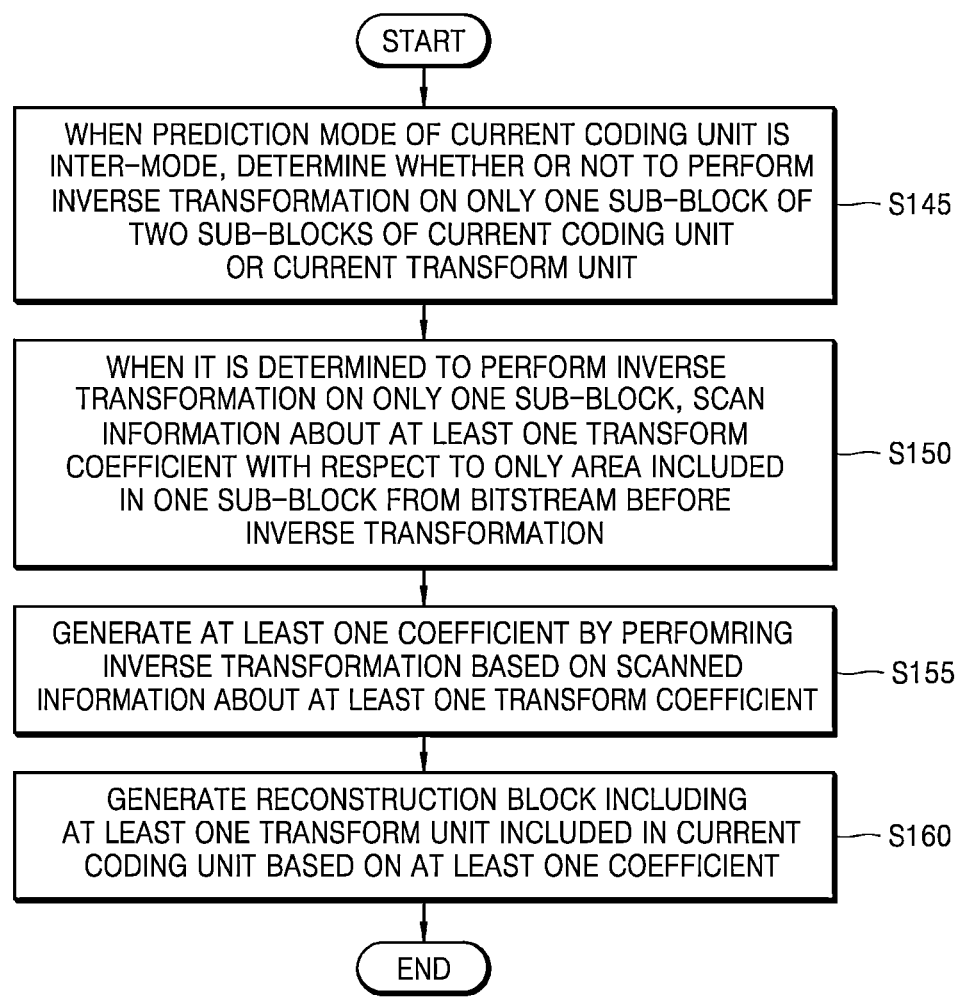

START

WHEN PREDICTION MODE OF CURRENT CODING UNIT IS INTER-MODE, DETERMINE WHETHER OR NOT TO PERFORM INVERSE TRANSFORMATION ON ONLY ONE SUB-BLOCK OF TWO SUB-BLOCKS OF CURRENT CODING UNIT OR CURRENT TRANSFORM UNIT — S145

WHEN IT IS DETERMINED TO PERFORM INVERSE TRANSFORMATION ON ONLY ONE SUB-BLOCK, SCAN INFORMATION ABOUT AT LEAST ONE TRANSFORM COEFFICIENT WITH RESPECT TO ONLY AREA INCLUDED IN ONE SUB-BLOCK FROM BITSTREAM BEFORE INVERSE TRANSFORMATION — S150

GENERATE AT LEAST ONE COEFFICIENT BY PERFOMRING INVERSE TRANSFORMATION BASED ON SCANNED INFORMATION ABOUT AT LEAST ONE TRANSFORM COEFFICIENT — S155

GENERATE RECONSTRUCTION BLOCK INCLUDING AT LEAST ONE TRANSFORM UNIT INCLUDED IN CURRENT CODING UNIT BASED ON AT LEAST ONE COEFFICIENT — S160

END

FIG. 1E

FIG. 4
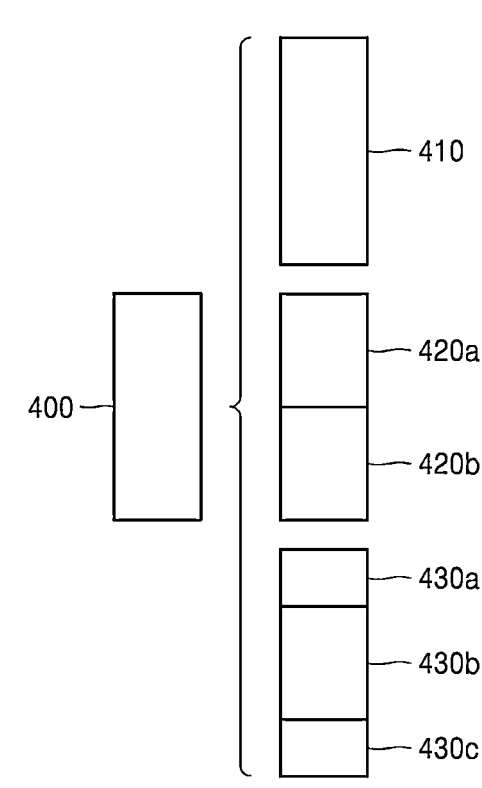
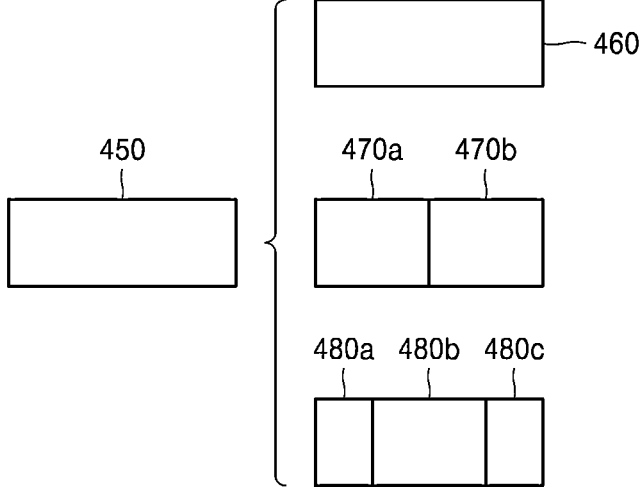

FIG. 6
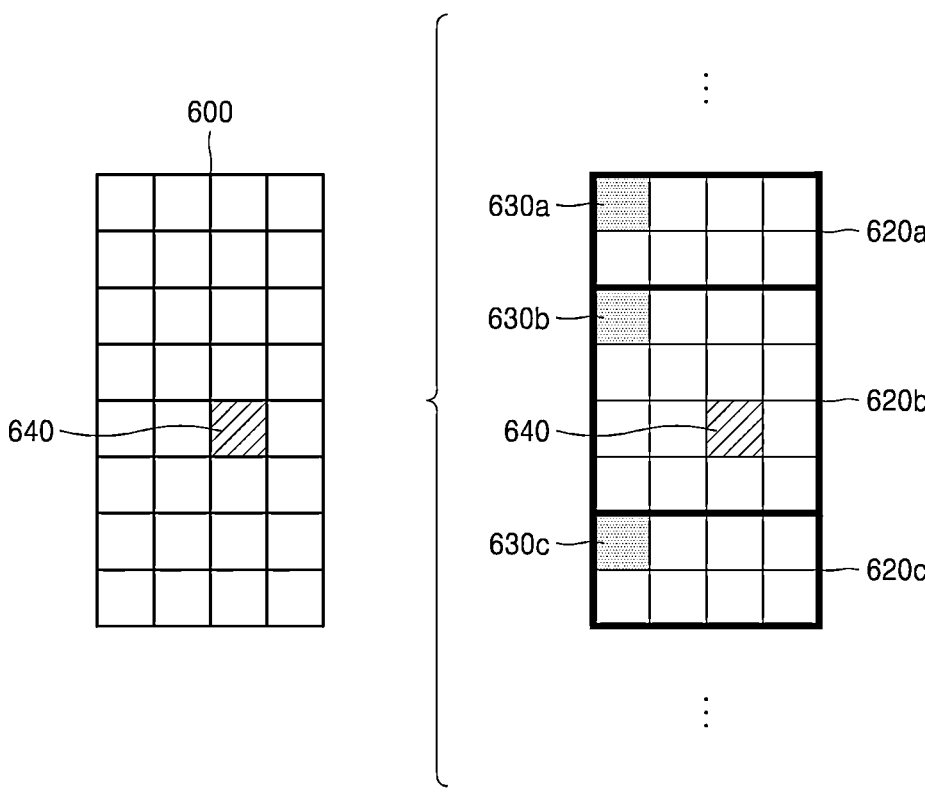
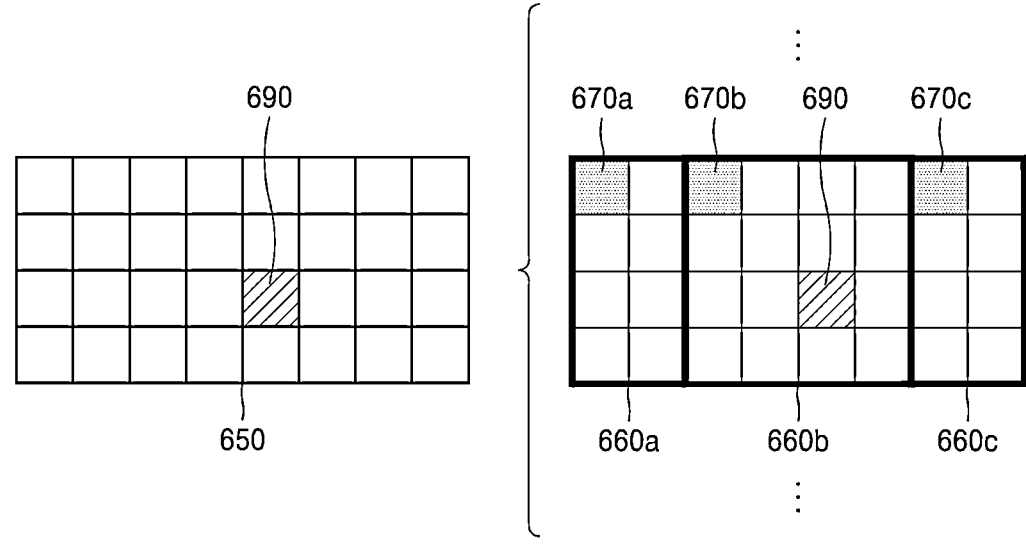

FIG. 13

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

| | Descriptor |
|---|---|
| transform_unit( x0, y0, tbWidth, tbHeight, treeType ) { | |
| if( treeType = = SINGLE_TREE \| \| treeType = = DUAL_TREE_LUMA ) | |
|   tu_cbf_luma[ x0 ][ y0 ] | ae(v) |
| if( treeType = = SINGLE_TREE \| \| treeType = = DUAL_TREE_CHROMA ) { | |
|   tu_cbf_cb [ x0 ][ y0 ] | ae(v) |
|   tu_cbf_cr [ x0 ][ y0 ] | ae(v) |
| } | |
| if( ( tu_cbf_luma[ x0 ][ y0 ] \| \| tu_cbf_cb[ x0 ][ y0 ] \| \| tu_cbf_cr[ x0 ][ y0 ] ) && | |
|   treeType != DUAL_TREE_CHROMA ) { | |
| if( cu_qp_delta_enabled_flag && !IsCuQpDeltaCoded ) { | |
|   cu_qp_delta_abs | ae(v) |
|   if( cu_qp_delta_abs ) | |
|     cu_qp_delta_sign_flag | ae(v) |
| } | |
| if( ( ( ( CuPredMode[ x0 ][ y0 ]  = =  MODE_INTRA )  &&  sps_mts_intra_enabled_flag ) \| \| | |
|   ( ( CuPredMode[ x0 ][ y0 ]  = =  MODE_INTER )  &&  sps_mts_inter_enabled_flag ) ) | |
| &&  tu_cbf_luma[ x0 ][ y0 ]  &&  treeType != DUAL_TREE_CHROMA | |
| &&  ( tbWidth  <= 32 )  &&  ( tbHeight  <= 32 ) ) | |
|   tu_mts_flag[ x0 ][ y0 ] | ae(v) |
| if( tu_cbf_luma[ x0 ][ y0 ] ) | |
|   residual_coding( x0, y0, Log2( tbWidth ), Log2( tbHeight ), 0 ) | |
| if( tu_cbf_cb[ x0 ][ y0 ] ) | |
|   residual_coding( x0, y0, Log2( tbWidth / 2 ), Log2( tbHeight / 2 ), 1 ) | |
| if( tu_cbf_cr[ x0 ][ y0 ] ) | |
|   residual_coding( x0, y0, Log2( tbWidth / 2 ), Log2( tbHeight / 2 ), 2 ) | |
| } | |

1700    1705    1710

| | Descriptor |
|---|---|
| residual_coding( x0, y0, log2TbWidth, log2TbHeight, cIdx ) { | |
| if( tu_mts_flag[ x0 ][ y0 ]  &&  ( cIdx  = = 0 ) ) | |
|   mts_idx [ x0 ][ y0 ][ cIdx ] | ae(v) |

| | Descriptor |
|---|---|
| transform_unit( x0, y0, tbWidth, tbHeight, treeType ) { | |
|   if( treeType = = SINGLE_TREE \| \| treeType = = DUAL_TREE_LUMA ) | |
|     tu_cbf_luma[ x0 ][ y0 ] | ae(v) |
|   if( treeType = = SINGLE_TREE \| \| treeType = = DUAL_TREE_CHROMA ) { | |
|     tu_cbf_cb[ x0 ][ y0 ] | ae(v) |
|     tu_cbf_cr[ x0 ][ y0 ] | ae(v) |
|   } | |
|   if( ( tu_cbf_luma[ x0 ][ y0 ] \| \| tu_cbf_cb[ x0 ][ y0 ] \| \| tu_cbf_cr[ x0 ][ y0 ] ) &&<br>    treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   if( ( ( ( CuPredMode[ x0 ][ y0 ]  = =  MODE_INTRA )  &&  sps_mts_intra_enabled_flag )  \| \|<br>    ( ( CuPredMode[ x0 ][ y0 ]  = =  MODE_INTER )  &&  sps_mts_inter_enabled_flag ) )<br>    &&  tu_cbf_luma[ x0 ][ y0 ]  &&  treeType != DUAL_TREE_CHROMA<br>    &&  ( tbWidth  <=  32 )  &&  ( tbHeight  <=  32 ) ) | |
|     tu_mts_flag[ x0 ][ y0 ] | ae(v) |
|   if( tu_mts_flag[ x0 ][ y0 ] &&  ( cIdx = = 0 ) ) | |
|     mts_idx[ x0 ][ y0 ][ cIdx ] | ae(v) |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( x0, y0, Log2( tbWidth / 2 ), Log2( tbHeight / 2 ), 1 ) | |
|   if( tu_cbf_cr[ x0 ][ y0 ] ) | |
|     residual_coding( x0, y0, Log2( tbWidth / 2 ), Log2( tbHeight / 2 ), 2 ) | |
| } | |

1730 → (Descriptor column)

1735 → (tu_mts_flag row)

| | Descriptor |
|---|---|
| transform_unit( x0, y0, tbWidth, tbHeight, treeType ) { | |
|   if( treeType == SINGLE_TREE \|\| treeType == DUAL_TREE_LUMA ) | |
|     tu_cbf_luma[ x0 ][ y0 ] | ae(v) |
|   if( treeType == SINGLE_TREE \|\| treeType == DUAL_TREE_CHROMA ) { | |
|     tu_cbf_cb [ x0 ][ y0 ] | ae(v) |
|     tu_cbf_cr [ x0 ][ y0 ] | ae(v) |
|   } | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   if( ( ( ( CuPredMode[ x0 ][ y0 ] == MODE_INTRA ) && sps_mts_intra_enabled_flag ) \|\| | |
|     ( ( CuPredMode[ x0 ][ y0 ] == MODE_INTER ) && sps_mts_inter_enabled_flag ) ) | |
|     && tu_cbf_luma[ x0 ][ y0 ] && treeType != DUAL_TREE_CHROMA | |
|     && ( tbWidth <= 32 ) && ( tbHeight <= 32 ) ) | |
|     tu_mts_flag[ x0 ][ y0 ] | ae(v) |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( x0, y0, Log2( tbWidth / 2 ), Log2( tbHeight / 2 ), 1 ) | |
|   if( tu_cbf_cr[ x0 ][ y0 ] ) | |
|     residual_coding( x0, y0, Log2( tbWidth / 2 ), Log2( tbHeight / 2 ), 2 ) | |
| } | |

FIG. 17D

| coding_unit( x0, y0, cbWidth, cbHeight, cqtDepth, treeType, modeType ) { | Descriptor |
|---|---|
| if( treeType != DUAL_TREE_CHROMA && lfnstIdx == 0 &&<br>    transform_skip_flag[ x0 ][ y0 ][ 0 ] == 0 && Max( cbWidth, cbHeight ) <= 32 &&<br>    IntraSubPartitionsSplit[ x0 ][ y0 ] == ISP_NO_SPLIT && cu_sbt_flag == 0 &&<br>    MtsZeroOutSigCoeffFlag == 1 && tu_cbf_luma[ x0 ][ y0 ] ) { | |
|     if( ( ( CuPredMode[ chType ][ x0 ][ y0 ] == MODE_INTER &&<br>        sps_explicit_mts_inter_enabled_flag ) ‖<br>        ( CuPredMode[ chType ][ x0 ][ y0 ] == MODE_INTRA &&♂<br>        sps_explicit_mts_intra_enabled_flag ) ) ) | |
|       mts_idx | ae(v) |

FIG. 18A

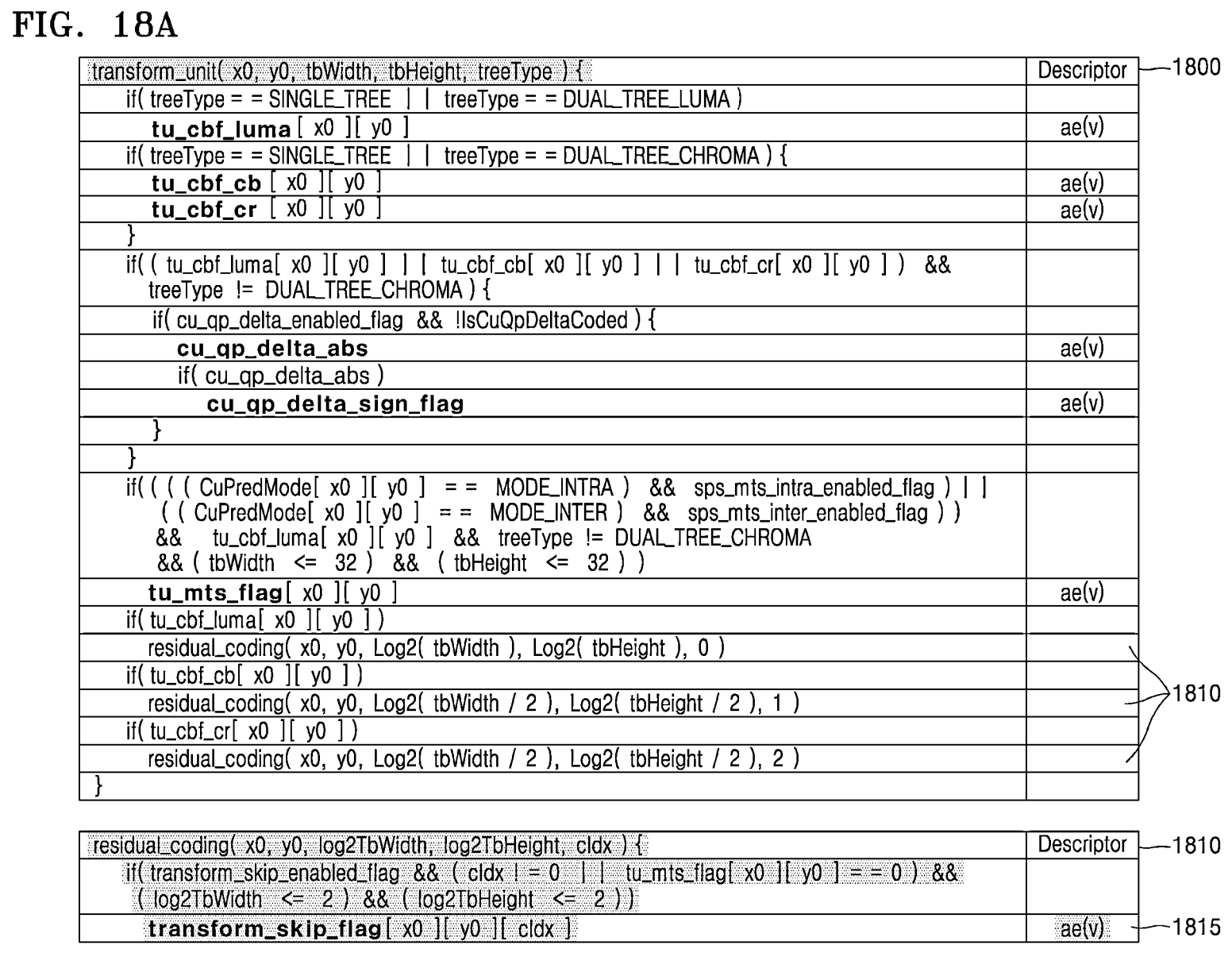

| | Descriptor |
|---|---|
| transform_unit( x0, y0, tbWidth, tbHeight, treeType ) { | |
|   if( treeType == SINGLE_TREE \|\| treeType == DUAL_TREE_LUMA ) | |
|     tu_cbf_luma [ x0 ][ y0 ] | ae(v) |
|   if( treeType == SINGLE_TREE \|\| treeType == DUAL_TREE_CHROMA ) { | |
|     tu_cbf_cb [ x0 ][ y0 ] | ae(v) |
|     tu_cbf_cr [ x0 ][ y0 ] | ae(v) |
|   } | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   if( ( ( ( CuPredMode[ x0 ][ y0 ] == MODE_INTRA ) && sps_mts_intra_enabled_flag ) \|\| | |
|     ( ( CuPredMode[ x0 ][ y0 ] == MODE_INTER ) && sps_mts_inter_enabled_flag ) ) | |
|     && tu_cbf_luma[ x0 ][ y0 ] && treeType != DUAL_TREE_CHROMA | |
|     && ( tbWidth <= 32 ) && ( tbHeight <= 32 ) ) | |
|     tu_mts_flag[ x0 ][ y0 ] | ae(v) |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( x0, y0, Log2( tbWidth / 2 ), Log2( tbHeight / 2 ), 1 ) | |
|   if( tu_cbf_cr[ x0 ][ y0 ] ) | |
|     residual_coding( x0, y0, Log2( tbWidth / 2 ), Log2( tbHeight / 2 ), 2 ) | |
| } | |

_(1800)_     _(1810)_

| | Descriptor |
|---|---|
| residual_coding( x0, y0, log2TbWidth, log2TbHeight, cIdx ) { | |
|   if( transform_skip_enabled_flag && ( cIdx != 0 \|\| tu_mts_flag[ x0 ][ y0 ] == 0 ) && | |
|     ( log2TbWidth <= 2 ) && ( log2TbHeight <= 2 ) ) | |
|     transform_skip_flag[ x0 ][ y0 ][ cIdx ] | ae(v) |

| | Descriptor |
|---|---|
| transform_unit( x0, y0, tbWidth, tbHeight, treeType, subTuIndex, chType ) { | —1820 |
| if( tu_cbf_luma[ x0 ][ y0 ] && treeType != DUAL_TREE_CHROMA ) { | |
| if( sps_transform_skip_enabled_flag && !BdpcmFlag[ x0 ][ y0 ][ 0 ] && | |
| tbWidth <= MaxTsSize && tbHeight <= MaxTsSize && | |
| ( IntraSubPartitionsSplit[ x0 ][ y0 ]  == ISP_NO_SPLIT )  && !cu_sbt_flag ) | |
| transform_skip_flag[ x0 ][ y0 ][ 0 ] | ae(v) —1825 |
| if( !transform_skip_flag[ x0 ][ y0 ][ 0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ xC ][ yC ] && treeType != DUAL_TREE_LUMA ) { | |
| if( sps_transform_skip_enabled_flag && !BdpcmFlag[ x0 ][ y0 ][ 1 ] && | |
| wC <= MaxTsSize && hC <= MaxTsSize && !cu_sbt_flag ) | |
| transform_skip_flag[ xC ][ yC ][ 1 ] | ae(v) —1830 |
| if( !transform_skip_flag[ xC ][ yC ][ 1 ] ) | |
| residual_coding( xC, yC, Log2( wC ), Log2( hC ), 1 ) | |
| else | |
| residual_ts_coding( xC, yC, Log2( wC ), Log2( hC ), 1 ) | |
| } | |
| if( tu_cbf_cr[ xC ][ yC ] && treeType != DUAL_TREE_LUMA && | |
| !( tu_cbf_cb[ xC ][ yC ] && tu_joint_cbcr_residual_flag[ xC ][ yC ] ) ) { | |
| if( sps_transform_skip_enabled_flag && !BdpcmFlag[ x0 ][ y0 ][ 2 ] && | |
| wC <= MaxTsSize && hC <= MaxTsSize && !cu_sbt_flag ) | |
| transform_skip_flag[ xC ][ yC ][ 2 ] | ae(v) —1835 |
| if( !transform_skip_flag[ xC ][ yC ][ 2 ] ) | |
| residual_coding( xC, yC, Log2( wC ), Log2( hC ), 2 ) | |
| else | |
| residual_ts_coding( xC, yC, Log2( wC ), Log2( hC ), 2 ) | |
| } | |

Figure 20A:
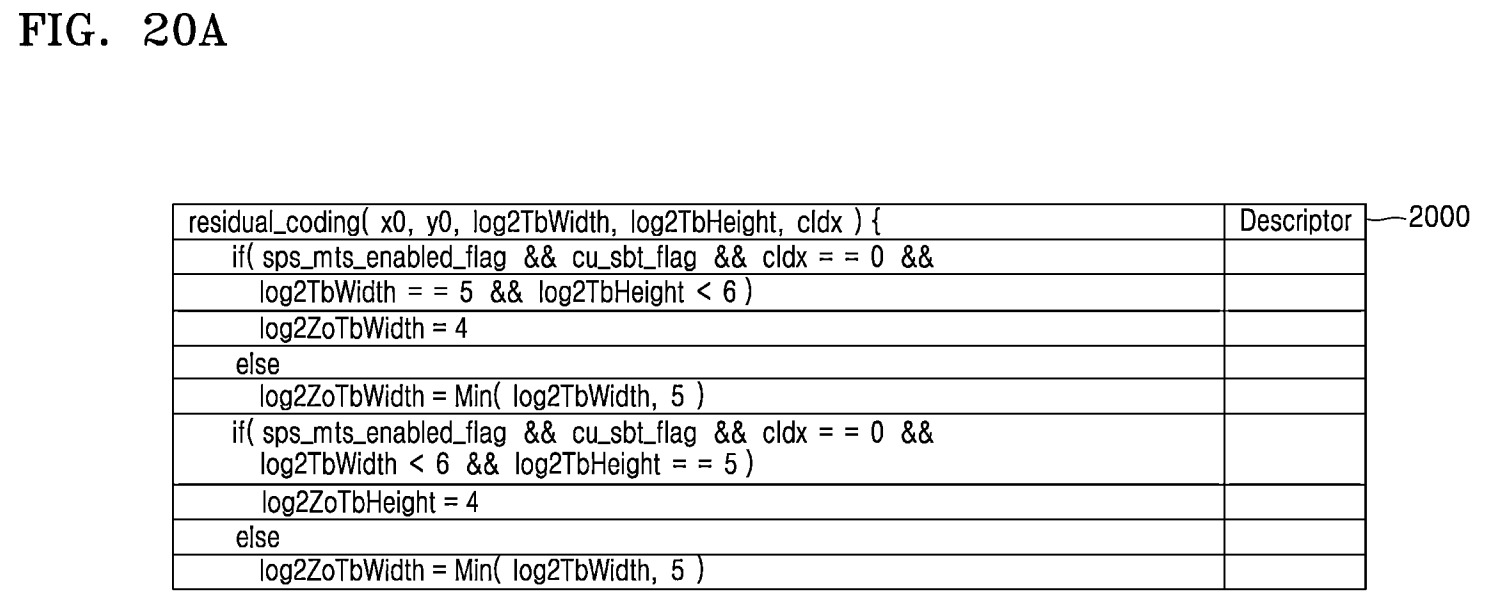

| | Descriptor |
|---|---|
| residual_coding( x0, y0, log2TbWidth, log2TbHeight, cldx ) { | |
| if( sps_mts_enabled_flag && cu_sbt_flag && cldx == 0 && | |
| log2TbWidth == 5 && log2TbHeight < 6 ) | |
| log2ZoTbWidth = 4 | |
| else | |
| log2ZoTbWidth = Min( log2TbWidth, 5 ) | |
| if( sps_mts_enabled_flag && cu_sbt_flag && cldx == 0 && | |
| log2TbWidth < 6 && log2TbHeight == 5 ) | |
| log2ZoTbHeight = 4 | |
| else | |
| log2ZoTbWidth = Min( log2TbWidth, 5 ) | |

Residual coding semantics last_sig_coeff_x_prefix specifies the prefix of the column position of the last significant coefficient in scanning order within a transform block. The values of last_sig_coeff_x_prefix shall be in the range of 0 to (log2ZoTbWidth << 1 ) − 1, inclusive.

Figure 20B:
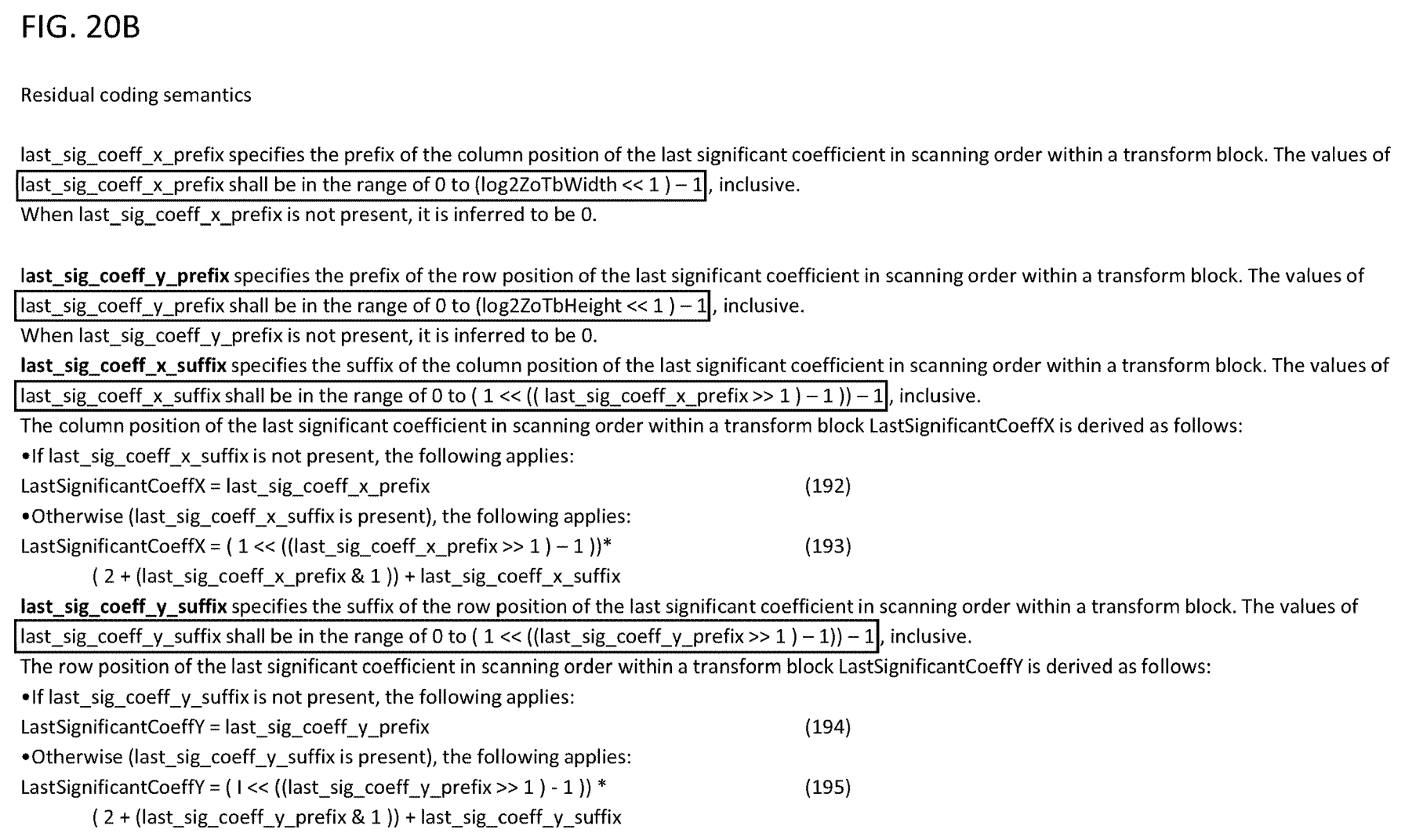

When last_sig_coeff_x_prefix is not present, it is inferred to be 0.

last_sig_coeff_y_prefix specifies the prefix of the row position of the last significant coefficient in scanning order within a transform block. The values of last_sig_coeff_y_prefix shall be in the range of 0 to (log2ZoTbHeight << 1 ) − 1, inclusive.

When last_sig_coeff_y_prefix is not present, it is inferred to be 0.

last_sig_coeff_x_suffix specifies the suffix of the column position of the last significant coefficient in scanning order within a transform block. The values of last_sig_coeff_x_suffix shall be in the range of 0 to ( 1 << ( ( last_sig_coeff_x_prefix >> 1 ) − 1 ) ) − 1, inclusive.

The column position of the last significant coefficient in scanning order within a transform block LastSignificantCoeffX is derived as follows:

• If last_sig_coeff_x_suffix is not present, the following applies:

LastSignificantCoeffX = last_sig_coeff_x_prefix

• Otherwise (last_sig_coeff_x_suffix is present), the following applies:

LastSignificantCoeffX = ( 1 << ( ( last_sig_coeff_x_prefix >> 1 ) − 1 ) )*      (192)

( 2 + (last_sig_coeff_x_prefix & 1 )) + last_sig_coeff_x_suffix      (193)

last_sig_coeff_y_suffix specifies the suffix of the row position of the last significant coefficient in scanning order within a transform block. The values of last_sig_coeff_y_suffix shall be in the range of 0 to ( 1 << ( ( last_sig_coeff_y_prefix >> 1 ) − 1 ) ) − 1, inclusive.

The row position of the last significant coefficient in scanning order within a transform block LastSignificantCoeffY is derived as follows:

• If last_sig_coeff_y_suffix is not present, the following applies:

LastSignificantCoeffY = last_sig_coeff_y_prefix

• Otherwise (last_sig_coeff_y_suffix is present), the following applies:

LastSignificantCoeffY = ( 1 << ( ( last_sig_coeff_y_prefix >> 1 ) - 1 ) )*      (194)

( 2 + (last_sig_coeff_y_prefix & 1 )) + last_sig_coeff_y_suffix      (195)

FIG. 20C

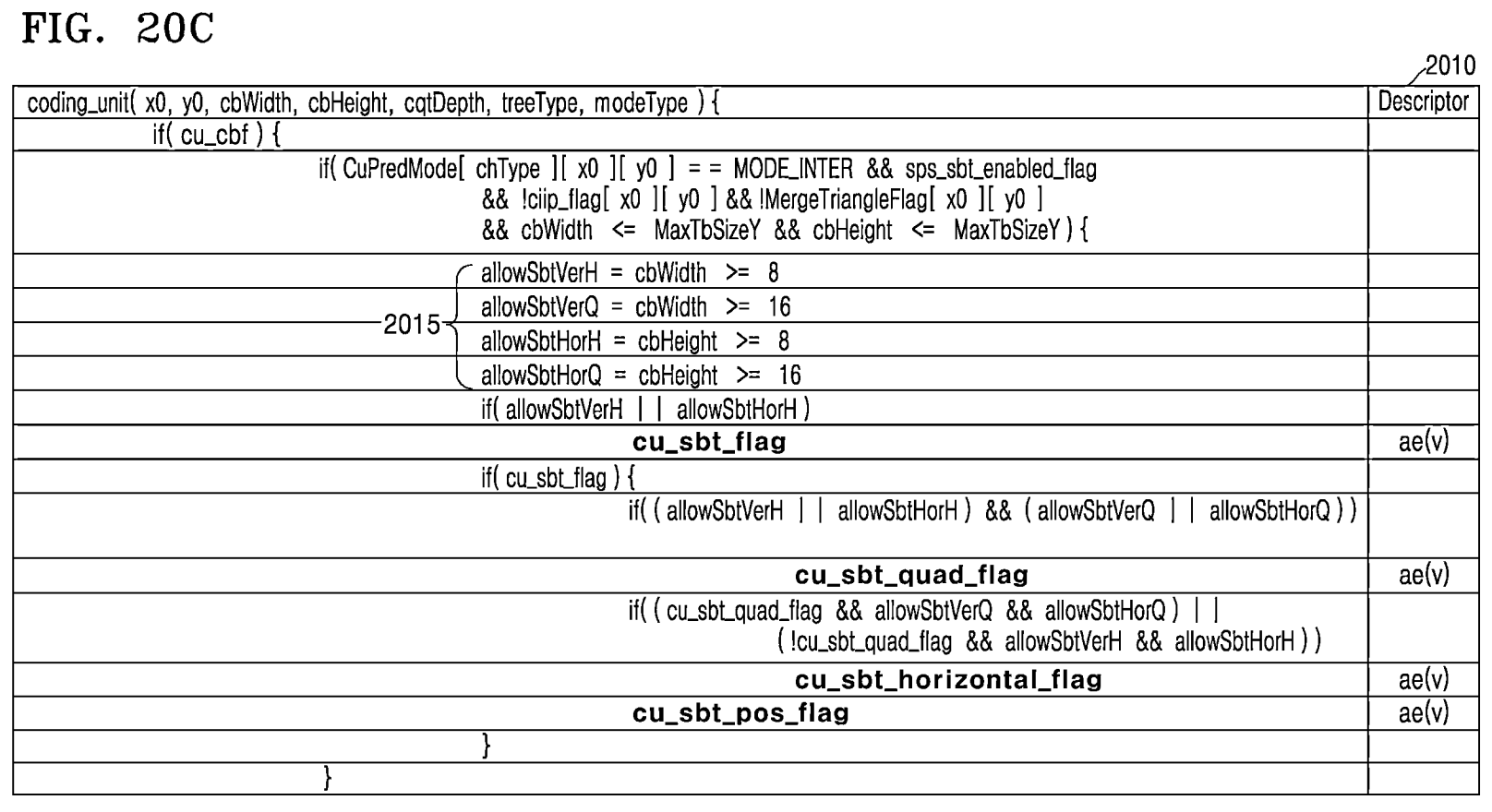

| | Descriptor |
|---|---|
| coding_unit( x0, y0, cbWidth, cbHeight, cqtDepth, treeType, modeType ) { | |
| if( cu_cbf ) { | |
| if( CuPredMode[ chType ][ x0 ][ y0 ] == MODE_INTER && sps_sbt_enabled_flag | |
| && !ciip_flag[ x0 ][ y0 ] && !MergeTriangleFlag[ x0 ][ y0 ] | |
| && cbWidth <= MaxTbSizeY && cbHeight <= MaxTbSizeY ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \|\| allowSbtHorH ) | |
| cu_sbt_flag | ae(v) |
| if( cu_sbt_flag ) { | |
| if( ( allowSbtVerH \|\| allowSbtHorH ) && ( allowSbtVerQ \|\| allowSbtHorQ ) ) | |
| cu_sbt_quad_flag | ae(v) |
| if( ( cu_sbt_quad_flag && allowSbtVerQ && allowSbtHorQ ) \|\| | |
| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |

2010

2015

VIDEO ENCODING METHOD AND DEVICE, AND VIDEO DECODING METHOD AND DEVICE

CROSS REFERENCE TO RELATED APPLICATIONS

This is a Continuation Application of U.S. application Ser. No. 17/416,987 filed Jun. 21, 2021, which is a National Stage of International Application No. PCT/KR2019/018244 filed Dec. 20, 2019, which claims benefit to U.S. Provisional No. 62/864,845 filed on Jun. 21, 2019, which claims benefit to U.S. Provisional No. 62/811,774 filed on Feb. 28, 2019, which claims benefit to U.S. Provisional No. 62/792,261 filed Jan. 14, 2019, and which claims benefit to U.S. Provisional No. 62/783,670 filed Dec. 21, 2018 in the United States Patent and Trademark Office.

TECHNICAL FIELD

A method and apparatus according to an embodiment are capable of encoding or decoding an image by using coding units, prediction units, or transform units, which have various shapes and are included in the image. A method and apparatus according to an embodiment are capable of encoding or decoding an image by performing transformation or inverse transformation on data units having various shapes.

BACKGROUND ART

As hardware capable of reproducing and storing high-resolution or high-quality image content has been developed and become widely popular, a codec capable of efficiently encoding or decoding high-resolution or high-quality image content is in high demand. Encoded image content may be decoded to be reproduced. Currently, methods of effectively compressing high-resolution or high-quality image content are implemented. For example, an efficient image compression method is implemented by a process of processing an image, which is to be encoded, in an arbitrary method.

Various data units may be used to compress an image, and there may be an inclusion relationship between the data units. A data unit to be used to compress an image may be split by various methods, and the image may be encoded or decoded by determining an optimized data unit according to characteristics of the image.

DESCRIPTION OF EMBODIMENTS

Solution to Problem

An image decoding method according to an embodiment of the present disclosure includes: obtaining, from a bitstream, a syntax element regarding multiple transform selection (MTS) with respect to a current coding unit or a current transform unit included in the current coding unit; determining a horizontal transform kernel or a vertical transform kernel with respect to the current transform unit based on the obtained syntax element; obtaining a residual signal by performing inverse transformation on the current transform unit, based on the determined horizontal transform kernel or vertical transform kernel with respect to the current transform unit; and generating a reconstruction block including the current coding unit or the current transform unit based on the residual signal with respect to the current transform unit.

The obtaining, from the bitstream, of the syntax element indicating whether or not to use the MTS may include obtaining the syntax element regarding the MTS from a syntax structure that is different from a residual coding syntax structure.

The obtaining, from the bitstream, of the syntax element indicating whether or not to use the MTS with respect to the current coding unit or the current transform unit may include obtaining, from the bitstream, the syntax element indicating at least one of whether or not to use the MTS with respect to the current coding unit or the current transform unit and one mode included in a plurality of modes according to the MTS.

When the obtained syntax element indicates not to use the MTS with respect to the current coding unit or the current transform unit, the method may further include determining a transform kernel with respect to the current transform unit as a discrete cosine transform (DCT)2.

When the obtained syntax element indicates one mode included in a plurality of modes according to the MTS with respect to the current coding unit or the current transform unit, the method may further include determining, based on the one mode indicated by the syntax element, the horizontal transform kernel or the vertical transform kernel with respect to the current coding unit or the current transform unit as one of a discrete sine transform (DST)7 and a discrete cosine transform (DCT)8.

The obtaining, from the bitstream, of the syntax element regarding the MTS with respect to the current coding unit or the current transform unit included in the current coding unit may include, when a tree type is not dual tree chroma, a size of the current coding unit is less than or equal to a predetermined size, and a coded block flag with respect to a luma component indicates that a luma transform block includes at least one transform coefficient level that is not 0, when a prediction mode of the current coding unit is an inter-mode, and a flag indicating whether or not to enable the MTS in the inter-mode, the flag being obtained from a sequence parameter set (SPS), indicates to enable the MTS, or when the prediction mode of the current coding unit is an intra-mode, and a flag indicating whether or not to enable the MTS in the intra-mode, the flag being obtained from the SPS, indicates to enable the MTS, obtaining the syntax element regarding the MTS with respect to the current coding unit or the current transform unit included in the current coding unit.

The syntax element regarding the MTS with respect to the current coding unit or the current transform unit included in the current coding unit may not be included in a residual coding syntax structure and may be included in a syntax structure of a coding unit or a syntax structure of a transform unit.

The method may further include: obtaining, from the bitstream, a flag indicating whether or not to use a transform skip mode with respect to the current transform unit based on a size of the current transform unit; determining, based on the obtained flag, whether or not to use the transform skip mode with respect to the current transform unit; skipping, based on the determination, an inverse transformation operation with respect to the current transform unit, and obtaining, from the bitstream, at least one coefficient included in the current transform unit; and generating, based on the obtained at least one coefficient, the reconstruction block including the current transform unit.

The obtaining, from the bitstream, of the flag indicating whether or not to use the transform skip mode with respect to the current transform unit based on the size of the current transform unit may include obtaining, from the bitstream, the flag before parsing a residual coding syntax structure.

The obtaining, from the bitstream, of the flag indicating whether or not to use the transform skip mode with respect to the current transform unit based on the size of the current transform unit may include, when a tree type is not dual tree chroma, a flag indicating whether or not to enable the transform skip mode, the flag being obtained from a sequence parameter set (SPS), indicates to enable the transform skip mode, and the size of the current transform unit is less than or equal to a predetermined size indicated by information about a size of a transform unit in a skip mode, the information being obtained from the bitstream, obtaining, from the bitstream, the flag indicating whether or not to use the transform skip mode with respect to the current transform unit based on the size of the current transform unit, when a coded block flag with respect to a luma component indicates that a luma transform block includes at least one transform coefficient level that is not 0.

The flag indicating whether or not to use the transform skip mode with respect to the current transform unit based on the size of the current transform unit may not be included in a residual coding syntax structure and may be included in a syntax structure of a transform unit.

When a prediction mode of the current coding unit is an inter-mode, the method may further include determining whether or not to perform inverse transformation on only one sub-block of two sub-blocks with respect to the current coding unit or the current transform unit. Also, when it is determined to perform the inverse transformation on the only one sub-block, the method may further include scanning information about at least one transform coefficient before the inverse transformation, with respect to only an area included in the only one sub-block.

When a prediction mode of the current coding unit is an inter-mode, the method may further include determining whether or not to perform inverse transformation on only one sub-block of two sub-blocks with respect to the current coding unit or the current transform unit. Also, when it is determined to perform the inverse transformation on the only one sub-block, the method may further include determining a split direction of the current coding unit or the current transform unit without parsing information about the split direction of the current coding unit or the current transform unit based on a relative relationship of a height and a width of the current coding unit or the current transform unit.

An image encoding apparatus according to an embodiment of the present disclosure includes at least one processor configured to: obtain, from a bitstream, a syntax element regarding multiple transform selection (MTS) with respect to a current coding unit or a current transform unit included in the current coding unit; determine a horizontal transform kernel or a vertical transform kernel with respect to the current transform unit based on the obtained syntax element; obtain a residual signal by performing inverse transformation on the current transform unit, based on the determined horizontal transform kernel or vertical transform kernel with respect to the current transform unit; and generate a reconstruction block including the current coding unit or the current transform unit based on the residual signal with respect to the current transform unit.

An image encoding method according to an embodiment of the present disclosure includes: determining a horizontal transform kernel or a vertical transform kernel with respect to a current transform unit by performing transformation on the current transform unit based on the horizontal transform kernel or the vertical transform kernel with respect to the current transform unit; and generating a syntax element regarding multiple transform selection (MTS) with respect to a current coding unit or the current transform unit included in the current coding unit based on the horizontal transform kernel or the vertical transform kernel with respect to the current transform unit; encoding a transform coefficient generated by performing transformation on the current transform unit; and generating a bitstream including the encoded transform coefficient with respect to the current transform unit and the syntax element regarding the MTS.

A computer program for the image decoding method according to an embodiment of the present disclosure may be recorded on a computer-readable recording medium.

BRIEF DESCRIPTION OF DRAWINGS

FIG. 1C is a flowchart of an image decoding method according to various embodiments.

FIG. 1D is a flowchart of an image decoding method according to various embodiments.

FIG. 1E is a block diagram of an image decoder according to various embodiments.

FIG. 4 illustrates a process, performed by an image decoding apparatus, of determining at least one coding unit by splitting a non-square coding unit, according to an embodiment.

FIG. 6 illustrates a method, performed by an image decoding apparatus, of determining a predetermined coding unit from among an odd number of coding units, according to an embodiment.

FIG. 13 illustrates a process of determining a depth of a coding unit when a shape and size of the coding unit change, when the coding unit is recursively split such that a plurality of coding units are determined, according to an embodiment.

FIG. 14 illustrates depths that are determinable based on shapes and sizes of coding units, and part indexes (PIDs) that are for distinguishing the coding units, according to an embodiment.

FIG. 17A illustrates a syntax structure of a transform unit including a syntax element of multiple transform selection (MTS) and a residual coding syntax structure, according to various embodiments.

FIG. 17B illustrates a syntax structure of a transform unit including a syntax element of transform selection, according to various embodiments.

FIG. 17C illustrates a syntax structure of a transform unit including a syntax element of transform selection, according to various embodiments.

FIG. 17D illustrates a syntax structure of a coding unit including a syntax element of MTS, according to various embodiments.

FIG. 18A illustrates a residual coding syntax structure including a transform unit syntax and a transform skip flag, according to various embodiments.

FIG. 18B illustrates a syntax structure of a transform unit including a transform skip flag, according to various embodiments.

FIG. 19A is a diagram for describing a sub-block transform (SBT) mode with respect to a block encoded in an inter-mode, according to an embodiment.

FIG. 19C is a diagram for describing a process of encoding and decoding a coefficient based on SBT with respect to a block encoded in an inter-mode, according to an embodiment.

FIG. 20A illustrates a residual coding syntax structure for determining a size of a scanned area, according to an embodiment.

FIG. 20B illustrates residual coding semantics of syntax elements indicating a location of a last significant coefficient in consideration of a size of a scanned area, according to an embodiment.

FIG. 20C illustrates a syntax structure of a coding unit for determining whether or not to allow a predetermined split direction and a predetermined split type based on a size (a height or a width) of a current coding unit, according to an embodiment.

BEST MODE

Figure 1A:
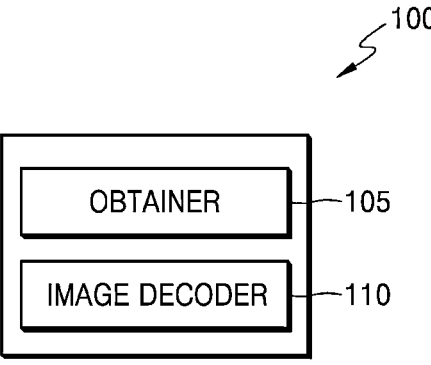
FIG. 1A is a block diagram of an image decoding apparatus, according to various embodiments.

An image decoding method according to an embodiment of the present disclosure includes: obtaining, from a bit-stream, a syntax element regarding multiple transform selection (MTS) with respect to a current coding unit or a current transform unit included in the current coding unit; determining a horizontal transform kernel or a vertical transform kernel with respect to the current transform unit based on the obtained syntax element; obtaining a residual signal by performing inverse transformation on the current transform unit, based on the determined horizontal transform kernel or vertical transform kernel with respect to the current transform unit; and generating a reconstruction block including the current coding unit or the current transform unit based on the residual signal with respect to the current transform unit.

An image encoding apparatus according to an embodiment of the present disclosure includes at least one processor configured to: obtain, from a bitstream, a syntax element regarding multiple transform selection (MTS) with respect to a current coding unit or a current transform unit included in the current coding unit; determine a horizontal transform kernel or a vertical transform kernel with respect to the current transform unit based on the obtained syntax element; obtain a residual signal by performing inverse transformation on the current transform unit, based on the determined horizontal transform kernel or vertical transform kernel with respect to the current transform unit; and generate a reconstruction block including the current coding unit or the current transform unit based on the residual signal with respect to the current transform unit.

An image encoding method according to an embodiment of the present disclosure includes: determining a horizontal transform kernel or a vertical transform kernel with respect to a current transform unit by performing transformation on the current transform unit based on the horizontal transform kernel or the vertical transform kernel with respect to the current transform unit; and generating a syntax element regarding multiple transform selection (MTS) with respect to a current coding unit or the current transform unit included in the current coding unit based on the horizontal transform kernel or the vertical transform kernel with respect to the current transform unit; encoding a transform coefficient generated by performing transformation on the current transform unit; and generating a bitstream including the encoded transform coefficient with respect to the current transform unit and the syntax element regarding the MTS.

A computer program for the image decoding method according to an embodiment of the present disclosure may be recorded on a computer-readable recording medium.

Mode of Disclosure

Advantages and features of embodiments of the disclosure set forth herein and methods of achieving them will be apparent from the following description of embodiments of the disclosure in conjunction with the accompanying drawings. However, the disclosure is not limited to embodiments of the disclosure set forth herein and may be embodied in many different forms. The embodiments of the disclosure are merely provided so that the disclosure will be thorough and complete and will fully convey the scope of the disclosure to those of ordinary skill in the art.

The terms used herein will be briefly described and then embodiments of the disclosure set forth herein will be described in detail.

In the present specification, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

As used herein, the singular forms "a", "an" and "the" are intended to include the plural forms as well, unless the context clearly indicates otherwise.

It will be understood that when an element is referred to as "including" another element, the element may further include other elements unless mentioned otherwise.

The term "unit" used herein should be understood as software or a hardware component which performs predetermined functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

According to an embodiment of the disclosure, the "unit" may be implemented with a processor and a memory. The term "processor" should be interpreted broadly to include a general-purpose processor, a central processing unit (CPU), a microprocessor, a digital signal processor (DSP), a controller, a microcontroller, a state machine, and the like. In some circumstances, a "processor" may refer to an application-specific integrated circuit (ASIC), a programmable logic device (PLD), a field programmable gate array (FPGA), and the like. The term "processor" may refer to a combination of processing devices, e.g., a combination of a DSP and a microprocessor, a combination of a plurality of microprocessors, a combination of one or more microprocessors in combination with a DSP core, or a combination of any other configurations.

The term "memory" should be interpreted broadly to include any electronic component capable of storing electronic information. The term "memory" may refer to various types of processor-readable media such as random access memory (RAM), read-only memory (ROM), non-volatile RAM (NVRAM), programmable ROM (PROM), erase-programmable ROM (EPROM), electrical erasable PROM (EEPROM), flash memory, a magnetic or optical data storage device, registers, and the like. When a processor is capable of reading information from and/or writing information to a memory, the memory may be referred to as being in electronic communication with the processor. A memory integrated in a processor is in electronic communication with the processor.

The term "image", when used herein, should be understood to include a static image such as a still image of a video, and a moving picture, i.e., a dynamic image, which is a video.

The term "sample", when used herein, refers to data allocated to a sampling position of an image, i.e., data to be processed. For example, samples may be pixel values in a spatial domain, and transform coefficients in a transform domain. A unit including at least one such sample may be defined as a block.

Hereinafter, embodiments of the disclosure will be described in detail with reference to the accompanying drawings, so that the embodiments of the disclosure may be easily implemented by those of ordinary skill in the art. Also, parts not related to the descriptions will be omitted to clearly describe the disclosure.

Hereinafter, an image encoding apparatus and an image decoding apparatus, and an image encoding method and an image decoding method according to various embodiments will be described with reference to FIGS. 1A to 20C. With reference to FIGS. 3 to 16, a method of determining a data unit of an image according to various embodiments will be described, and with reference to FIGS. 1A to 1E, FIGS. 2A to 2E, and FIGS. 17A to 20C, an image encoding apparatus and an image decoding apparatus, and an image encoding method and an image decoding method for performing transformation or inverse transformation on data units determined in various shapes according to various embodiments will be described.

Hereinafter, an encoding or decoding method and apparatus for encoding or decoding an image based on various-shape data units according to an embodiment of the disclosure will now be described with reference to FIGS. 1 and 2.

FIG. 1A is a block diagram of an image decoding apparatus, according to various embodiments.

An image decoding apparatus 100 according to various embodiments may include an obtainer 105 and an image decoder 110. The obtainer 105 and the image decoder 110 may include at least one processor. Also, the obtainer 105 and the image decoder 110 may include a memory in which instructions to be executed by the at least one processor are stored. The image decoder 110 may be implemented as hardware separate from the obtainer 105, or the image decoder 110 may include the obtainer 105.

Hereinafter, an operation in which the image decoding apparatus 100 performs inverse transformation on a current block based on a syntax element regarding multiple transform selection is described.

The obtainer 105 may obtain, from a bitstream, a syntax element regarding multiple transform selection, with respect to a current coding unit or a current transform unit included in the current coding unit.

Here, the multiple transform selection refers to a method of performing inverse transformation by determining one of various candidate transform kernels as a horizontal transform kernel or a vertical transform kernel, according to a size of the current transform unit (or the current coding unit), and using the determined horizontal transform kernel and the vertical transform kernel, rather than using a single transform kernel, such as a discrete cosine transform (DCT)2 for inverse transformation.

For example, the obtainer 105 may obtain, from the bitstream, the syntax element regarding the multiple transform selection included in a syntax structure of the current coding unit or a syntax structure of the current transform unit.

Here, the syntax element may denote an element of data indicated by the bitstream, and the syntax structure may denote (a set of) one or more elements also included in the bitstream according to a specific order. Here, a parameter may denote the syntax element included in a sequence parameter set (SPS), a picture parameter set (PPS), an adaptation parameter set (APS), etc.

The obtainer 105 may obtain, from the bitstream, the syntax element regarding the multiple transform selection included in a syntax structure other than a residual coding syntax structure. Here, the syntax element regarding the multiple transform selection may be a syntax element indicating at least one of whether or not to use the multiple transform selection with respect to the current coding unit or the current transform unit and one mode included in a plurality of modes according to the multiple transform selection. For example, the syntax element may include a multiple transform selection flag mts_flag indicating whether or not to use multiple transform selection and a multiple transform selection index mts_idx indicating one of the plurality of modes according to the multiple transform selection. According to each mode, the image decoding apparatus 100 may determine a horizontal transform kernel and a vertical transform kernel corresponding to each mode.

Alternatively, the syntax element may be index information indicating one of the plurality of modes according to the multiple transform selection, along with whether or not to use the multiple transform selection.

The syntax element regarding the multiple transform selection with respect to the current coding unit or the current transform unit included in the current coding unit may not be included in the residual coding syntax structure and may be included in the syntax structure of the coding unit or the syntax structure of the transform unit.

Thus, according to an embodiment, the image decoding apparatus 100 may parse a syntax element regarding (inverse) transform including the syntax element regarding the multiple transform selection at once, and a parsing delay until parsing of the residual coding syntax structure may not occur. Also, the image decoding apparatus 100 may independently perform parsing with respect to (inverse) transform, and thus, may perform parallel processing.

When the syntax element regarding the multiple transform selection indicates not to use the multiple transform selection with respect to the current coding unit or the current transform unit, the image decoder 110 may determine a transform kernel with respect to the current transform unit as the DCT2.

When the syntax element regarding the multiple transform selection indicates one of the plurality of modes according to the multiple transform selection with respect to the current coding unit or the current transform unit, the image decoder 110 may determine a transform kernel in a horizontal direction or a vertical direction with respect to the current coding unit or the current transform unit as one of a discrete sign transform (DST)7 and a DST8 based on the one mode indicated by the syntax element. When a size of the current coding unit is greater than or equal to a predetermined first size or less than or equal to a predetermined second size, the image decoder 110 may determine the transform kernel in the horizontal direction or the vertical direction as the DCT2.

When a tree type is not dual tree chroma, the size of the current coding unit is less than or equal to a predetermined size, and a coded block flag with respect to a luma component indicates that a luma transform block includes at least one transform coefficient level that is not 0, the obtainer 105 may obtain, from a bitstream, the syntax element regarding the multiple transform selection with respect to the current transform unit included in the current coding unit. Here, the tree type refers to a type indicating a relationship between a block partition tree structure of an image of a luma component and one partition tree structure of an image of a chroma component, wherein, when the tree type is a single tree, the partition tree structure of the image of the chroma component shares the partition tree structure of the image of the luma component, and when the tree type is a single tree, it may be indicated that a current block is included in the partition tree structure of one image, and because the partition tree structure is shared by all color components, the partition tree structure is not relevant to a color component of the current block.

When the tree type is a dual tree, the partition tree structure of the image of the chroma component may be separate from the partition tree structure of the image of the luma component. In detail, when the tree type is dual tree chroma, it may be indicated that the current block is included in the partition tree structure of the image of the chroma component, and when the tree type is dual tree luma, it may be indicated that the current block is included in the partition tree structure of the image of the luma component. Accordingly, when a tree type is not dual tree chroma, the current tree type may be single tree or dual tree luma.

When the tree type is not dual tree chroma, the size of the current coding unit is less than or equal to a predetermined size, and the coded block flag with respect to the luma component indicates that the luma transform block includes at least one transform coefficient level that is not 0, and when a prediction mode of the current coding unit is an inter-mode and a flag indicating whether or not to enable the multiple transform selection in the intra-mode, the flag being obtained from a sequence parameter set (SPS), indicates to enable the multiple transform selection, or when the prediction mode of the current coding unit is an intra-mode and a flag indicating whether or not to enable the multiple transform selection in the intra-mode, the flag being obtained from the SPS, indicates to enable the multiple transform selection, the obtainer 105 may obtain the syntax element regarding the multiple transform selection with respect to the current coding unit or the current transform unit included in the current coding unit.

Based on the syntax element regarding the multiple transform selection, the image decoder 110 may determine the horizontal transform kernel or the vertical transform kernel with respect to the current transform unit. The image decoder 110 may determine one of various candidate transform kernels as the horizontal transform kernel or the vertical transform kernel. Here, various candidate transform kernels may include the DCT2, the DCT8, and the DST7. However, it would be understood to one of ordinary skill in the art that the candidate transform kernels are not limited thereto and may include various transform kernels (a DST4, a DCT4, etc.)

The image decoder 110 may obtain a residual signal (for example, a residual block) by performing inverse-transform on the current transform unit based on the horizontal or vertical transform kernel determined with respect to the current transform unit. The image decoder 110 may obtain information about at least one transform coefficient included in the current transform unit and may obtain the at least one transform coefficient based on the information about the at least one transform coefficient. The image decoder 110 may obtain a residual signal by performing inverse-transform on the at least one transform coefficient included in the current transform unit, based on the horizontal or vertical transform kernel determined with respect to the current transform unit.

The image decoder 110 may generate a reconstruction block including the current coding unit or the current transform unit based on the residual signal with respect to the current transform unit. The image decoder 110 may generate a prediction block with respect to the current coding unit or the current transform unit by performing inter-prediction, inter-prediction, or the like. The image decoder 110 may generate a reconstruction block with respect to the current coding unit or the current transform unit by combining a residual block including a residual signal with respect to the current transform unit and a prediction block with respect to the current coding unit or the current transform unit.

Hereinafter, a configuration in which the image decoding apparatus 100 skips inverse transformation and reconstructs a current block, based on a syntax element indicating whether or not to use a transform skip mode is described.

The obtainer 105 may obtain, from a bitstream, a flag (hereinafter, a transform skip flag) indicating whether or not to use a transform skip mode with respect to the current transform unit, based on a size of the current transform unit. The obtainer 105 may obtain the transform skip flag from the bitstream before parsing of the residual coding syntax structure. The transform skip flag may not be included in the residual coding syntax structure and may be included in the syntax structure of the transform unit.

When the tree type is not dual tree chroma and a flag indicating whether or not to enable the transform skip mode, the flag being obtained from an SPS, indicates to enable the transform skip mode, the obtainer 105 may obtain the transform skip flag from the bitstream. When the tree type is not dual tree chroma, the flag indicating whether or not to enable the transform skip mode, the flag being obtained from the SPS, indicates to enable the transform skip mode, and a coded block flag (referred to as cbf) with respect to a luma component indicates that a luma transform block includes at least one transform coefficient level that is not 0, the obtainer 105 may obtain the transform skip flag from the bitstream. The coded block flag indicates whether or not a corresponding transform block includes at least one transform coefficient level that is not 0.

When the tree type is not dual tree chroma, the flag indicating whether or not to enable the transform skip mode, the flag being obtained from the SPS, indicates to enable the transform skip mode, and a size of the current transform unit is less than or equal to a predetermined size indicated by transform unit size information of the transform skip mode obtained from the bitstream, and when the coded block flag with respect to the luma component indicates that the luma transform block includes at least one transform coefficient level that is not 0, the obtainer 105 may obtain the transform skip flag from the bitstream.

When the conditions mentioned above are met, and when it is additionally determined to use the multiple transform selection, the obtainer 105 may obtain the transform skip flag from the bitstream. It is not limited thereto. In contrast, when it is determined not to use the multiple transform selection, the obtainer 105 may obtain the transform skip flag from the bitstream. Alternatively, the obtainer 105 may obtain the transform skip flag from the bitstream, and when a value thereof is 0, may obtain the syntax element regarding the multiple transform selection (MTS) from the bitstream.

Based on the transform skip flag, the image decoder 110 may determine whether or not to use the transform skip mode with respect to the current transform unit.

Based on a result of determining whether or not to use the transform skip mode with respect to the current transform unit, the image decoder 110 may skip inverse transformation on the current transform unit and may obtain at least one coefficient included in the current transform unit, from the bitstream. Based on the result of determining whether or not to use the transform skip mode with respect to the current transform unit, the image decoder 110 may skip inverse transformation on the current transform unit, obtain, from the bitstream, information about the at least one coefficient included in the current transform unit, and obtain, based on the information about the at least one coefficient, the at least one coefficient included in the current transform unit.

The image decoder 110 may generate a reconstruction block including the current transform unit based on the at least one coefficient. The image decoder 110 may generate a prediction block with respect to the current transform unit or the current coding unit including the current transform unit by performing inter-prediction, inter-prediction, or the like. The image decoder 110 may generate the reconstruction block with respect to the current transform unit or the current coding unit by combining a residual block including at least one coefficient with respect to the current transform unit and the prediction block with respect to the current coding unit or the current transform unit.

Hereinafter, a configuration in which the image decoding apparatus 100 performs sub-block transform (SBT), in which inverse transformation is performed on only an area (a sub-block) of an inter-residual block, is described.

When a prediction mode of the current coding unit is an inter-mode, the image decoder 110 may determine whether or not to perform inverse transformation on only one sub-block of two sub-blocks, with respect to the current coding unit or the current transform unit. Here, when a current block is a coding unit, the sub-block may be a transform unit. That is, the current coding unit may include two transform units. When a current block is a transform unit, the sub-block may be a sub-transform unit.

When the prediction mode of the current coding unit is the inter-mode, the obtainer 105 may obtain a flag sbt_flag indicating whether or not to perform inverse transformation on only one sub-block of two sub-blocks of the current coding unit or the current transform unit, and the image decoder 110 may determine, based on the flag sbt_flag, whether or not to perform inverse transformation on only one sub-block of the two sub-blocks with respect to the current coding unit or the current transform unit.

When it is determined to perform the inverse transformation on only one sub-block of the two sub-blocks with respect to the current coding unit or the current transform unit, the obtainer 105 may obtain, from a bitstream, a flag cu_sbt_quad_flag or tu_sbt_quad_flag indicating to split the current coding unit or the current transform unit into sub-blocks including sub-blocks having a ½ size or a ¼ size. The image decoder 110 may determine whether or not to split the current coding unit or the current transform unit into the sub-blocks including the sub-blocks having the ½ or ¼ size, based on the flag cu_sbt_quad_flag or tu_sbt_quad_flat.

The obtainer 105 may obtain, from the bitstream, a flag cu_sbt_horizontal_flag or tu_sbt_horizontal_flag indicating whether or not to split the current coding unit or the current transform unit in a horizontal direction or a vertical direction. The image decoder 110 may determine whether or not to split the current coding unit or the current transform unit in the horizontal direction or the vertical direction, based on the flag cu_sbt_horizontal_flag or tu_sbt_horizontal_flag.

The obtainer 105 may obtain, from the bitstream, a flag cu_sbt_pos_flag or tu_sbt_pos_flag indicating a location of one block on which the inverse transformation is performed, of the two sub-blocks included in the current coding unit or the current transform unit. The image decoder 110 may determine, based on the flag cu_sbt_pos_flag or tu_sbt_pos_flag, the one block, on which the inverse transformation is performed, of the two sub-blocks included in the current coding unit or the current transform unit.

When it is determined to perform the inverse transformation on only one sub-block of the current coding unit or the current transform unit, the image decoder 110 may obtain, with respect to only an area included in the sub-block on which the inverse transformation is performed, at least one transform coefficient based on information about the at least one transform coefficient, the information being entropy-decoded and scanned before inverse transformation. Here, the scanning refers to a method of transforming one-dimensionally arranged information into two-dimensionally arranged information according to a scan order.

The image decoder 110 may scan the information about the at least one transform coefficient with respect to only an area (hereinafter, a scan area) included in one sub-block according to a size of a current block. At least one of a height and a width of the scan area may be ½ of the sub-block. In this case, a location of a last significant coefficient may be determined within a range of x locations and y locations from a pixel at a left upper edge of the scan area to a pixel at a right lower end of the scan area.

When a prediction mode of the current coding unit is an inter-mode, the image decoder 110 may determine whether or not to perform inverse transformation on only one sub-block of two sub-blocks with respect to the current coding unit or the current transform unit.

When it is determined to perform the inverse transformation on only one sub-block, the image decoder 110 may determine a split direction of the current coding unit or the current transform unit without parsing information about the split direction of the current coding unit or the current transform unit. When it is determined to perform the inverse transformation on only one sub-block, the image decoder 110 may determine a split direction of the current coding unit or the current transform unit without parsing information about a split direction of the current coding unit or the current transform unit based on at least one of a height and a width of the current coding unit or the current transform unit. When it is determined to perform the inverse transformation on only one sub-block, the image decoder 110 may determine a split direction of the current coding unit or the current transform unit without parsing information about a split direction of the current coding unit or the current transform unit based on a relative relationship between a height and a width of the current coding unit or the current transform unit. For example, when the height or the width of the current coding unit or the current transform unit is greater than a predetermined height or a predetermined width, the image decoder 110 may determine to allow a vertical split or a horizontal split of the height or the width of the current coding unit or the current transform unit. When the image decoder 110 does not obtain the information about the split direction with respect to the current coding unit or the current transform unit from the bitstream, and when the flag cu_sbt_quad_flag is 1 (that is, when the current coding unit or the current transform unit is split into sub-blocks including sub-blocks having a ¼ size), the image decoder 110 may determine the split direction as a horizontal split, based on whether or not to allow the height of the current coding unit or the current transform unit to be horizontally split into the sub-blocks including the sub-blocks having the ¼ size (whether or not allowSbtHorQ is 1).

When the image decoder 110 does not obtain the information about the split direction with respect to the current coding unit or the current transform unit from the bitstream, and when the flag cu_sbt_quad_flag is 0 (that is, when the current coding unit or the current transform unit is split into sub-blocks including sub-blocks having a ½ size), the image decoder 110 may determine the split direction as a horizontal split, based on whether or not to allow the height of the current coding unit or the current transform unit into horizontally split into the sub-blocks including the sub-blocks having the ½ size (whether or not allowSbtHorH is 1).

Above, the configurations in which the image decoding apparatus 100 performs decoding according to the MTS, the transform skip mode, and the SBT, respectively, are described separately. However, it is not limited thereto. It would be understood by one of ordinary skill in the art that the image decoding apparatus 100 may perform the decoding operation by combining at least a portion of each configuration, unless there is any incompatibility therebetween.

The image decoder 110 may determine a coding unit or a transform unit in the decoding operation as described below.

The image decoder 110 may determine a plurality of luma/chroma coding units in a current luma/chroma image by hierarchically splitting the current luma/chroma image, based on a split shape mode of the current luma/chroma image. The split shape mode of the current luma/chroma image may exist for each coding unit. That is, after a current block is split into a plurality of coding units according to a split shape mode of the current block, a corresponding coding unit may be additionally split according to a split shape mode of the split block. The split shape mode of the current luma image may be determined by obtaining information regarding the split shape mode thereof from a bitstream. The split shape mode may be a mode based on a split shape mode including one of quad split, binary split, and tri-split. The transform unit may be determined based on the coding unit and may have the same size as the coding unit. However, the transform unit is not limited thereto. When a size of the coding unit is greater than a size of a largest transform unit, the coding unit may be split. Thus, the coding unit may include at least one transform unit.

Figure 1B:
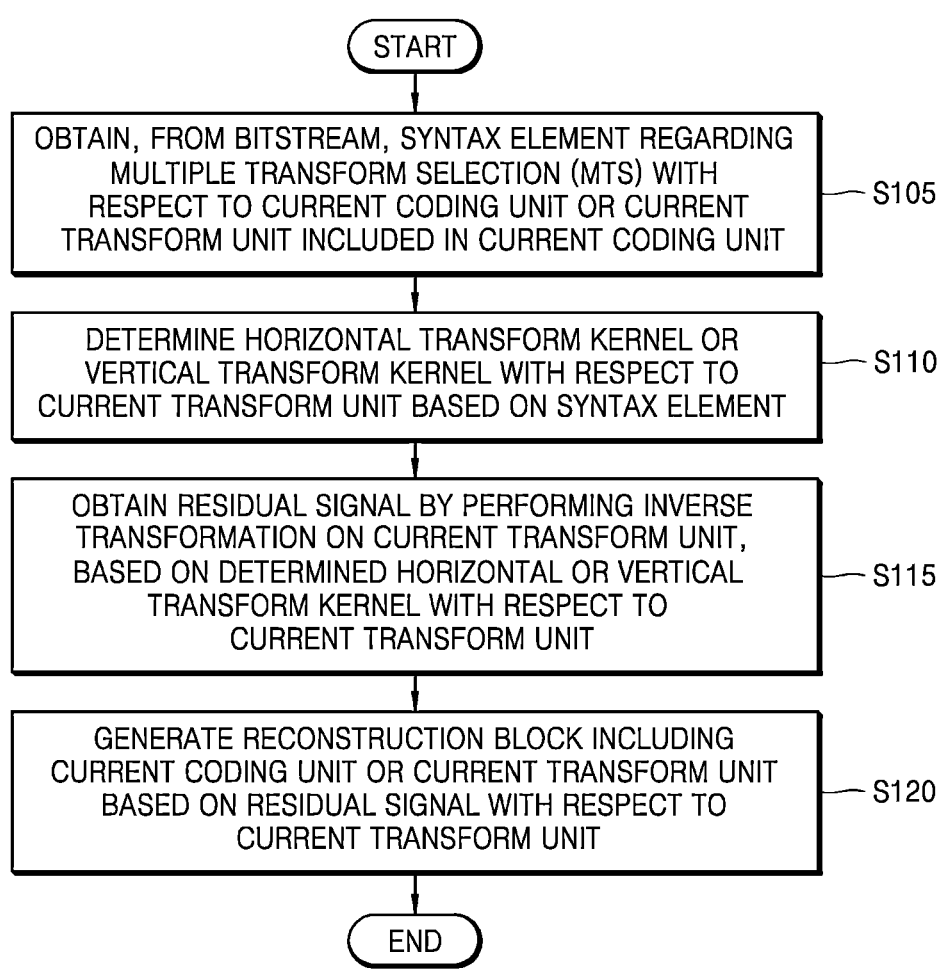
FIG. 1B is a flowchart of an image decoding method according to various embodiments.

FIG. 1B is a flowchart of an image decoding method according to various embodiments.

In operation S105, the image decoding apparatus 100 may obtain, from a bitstream, a syntax element regarding the MTS, with respect to a current coding unit or a current transform unit included in the current coding unit. Here, the syntax element may be included in a syntax structure of the coding unit or the transform unit and may not be included in a residual coding syntax structure.

In operation S110, the image decoding apparatus 100 may determine, based on the syntax element, a transform kernel in a horizontal direction or a vertical direction with respect to the current transform unit.

In operation S115, the image decoding apparatus 100 may obtain a residual signal by performing inverse transformation on the current transform unit based on the transform kernel in the horizontal direction or the vertical direction determined with respect to the current transform unit.

In operation S120, a reconstruction block including the current coding unit or the current transform unit may be generated based on the residual signal with respect to the current transform unit.

FIG. 1C is a flowchart of an image decoding method according to various embodiments.

In operation S125, the image decoding apparatus 100 may obtain, from a bitstream, a flag indicating whether or not to use a transform skip mode with respect to the current transform unit, based on a size of the current transform unit. For example, the image decoding apparatus 100 may obtain, from the bit stream, information indicating a maximum size of a block to which a transform skip is applied and may determine, based on the information, the maximum size of the block to which the transform skip is applied. When the size of the current transform unit is less than or equal to the maximum size of the block to which the transform skip is applied, the image decoding apparatus 100 may obtain, from the bitstream, the flag indicating whether or not to use the transform skip mode with respect to the current transform unit.

The flag indicating whether or not to use the transform skip mode may be included in a syntax structure of a transform unit and may not be included in a residual coding syntax structure.

In operation S130, the image decoding apparatus 100 may determine, based on the obtained flag, whether or not use the transform skip mode with respect to the current transform unit.

In operation S135, the image decoding apparatus 100 may skip an inverse transformation operation with respect to the current transform unit and may obtain, from the bitstream, at least one coefficient included in the current transform unit. The image decoding apparatus 100 may obtain, from the bitstream, information about the at least one coefficient included in the current transform unit, may skip the inverse operation with respect to the current transform unit, and may obtain the at least one coefficient based on the information about the at least one coefficient included in the current transform unit. Here, the at least one coefficient may be inversely quantized.

In operation S140, the image decoding apparatus 100 may generate, based on the obtained at least one coefficient, a reconstruction block including the current transform unit.

FIG. 1D is a flowchart of an image decoding method according to various embodiments.

In operation S145, when a prediction mode of a current coding unit is an inter-mode, the image decoding apparatus 100 may determine whether or not to perform inverse transformation on only one sub-block of two sub-blocks with respect to the current coding unit or a current transform unit. The image decoding apparatus 100 may obtain, from a bitstream, a flag indicating whether or not to perform inverse transformation on only one sub-block of two sub-blocks of the current coding unit or the current transform unit and may determine, based on the flag, whether or not to perform the inverse transformation on only one sub-block of the two sub-blocks of the current coding unit or the current transform unit.

In operation S150, when the image decoding apparatus 100 determines to perform the inverse transformation on only one sub-block, the image decoding apparatus 100 may scan, from the bitstream, information about at least one transform coefficient, with respect to only an area included in the one sub-block before the inverse transformation. However, it is not limited thereto. The image decoding apparatus 100 may scan the information about the at least one transform coefficient with respect to only some areas (hereinafter, scan areas) included in the one sub-block according to a size of a current block. At least one of a height and a width of the scan area may be ½ of the sub-block. In this case, a location of a last significant coefficient may be determined within a range of x locations and y locations from a pixel at a left upper edge of the scan area to a pixel at a right lower end of the scan area. Parsing of a significant coefficient flag at the location of the last significant coefficient may be omitted.

In operation S155, the image decoding apparatus 100 may generate at least one coefficient by inverse-transforming the at least one transform coefficient based on the scanned information about the at least one transform coefficient. The image decoding apparatus 100 may obtain the at least one transform coefficient based on the scanned information about the at least one transform coefficient and may generate the at least one coefficient by inverse-transforming the at least one transform coefficient.

In operation S160, the image decoding apparatus 100 may generate, based on the at least one coefficient, a reconstruction block including at least one transform unit included in the current coding unit.

Above, the methods, performed by the image decoding apparatus 100, of decoding the image according to the MTS, the transform skip mode, and the sub-block transform, respectively, are described according to various embodiments by referring to FIGS. 1B through 1D. Above, the methods, performed by the image decoding apparatus 100, of decoding the image are described separately with respect to each drawing. However, it may be understood by one of ordinary skill in the art that unless there is an incompatibility between each decoding method, at least a portion of each decoding method illustrated in the drawing may be combined with each other to perform a decoding operation in a logical order.

Figure 1E:
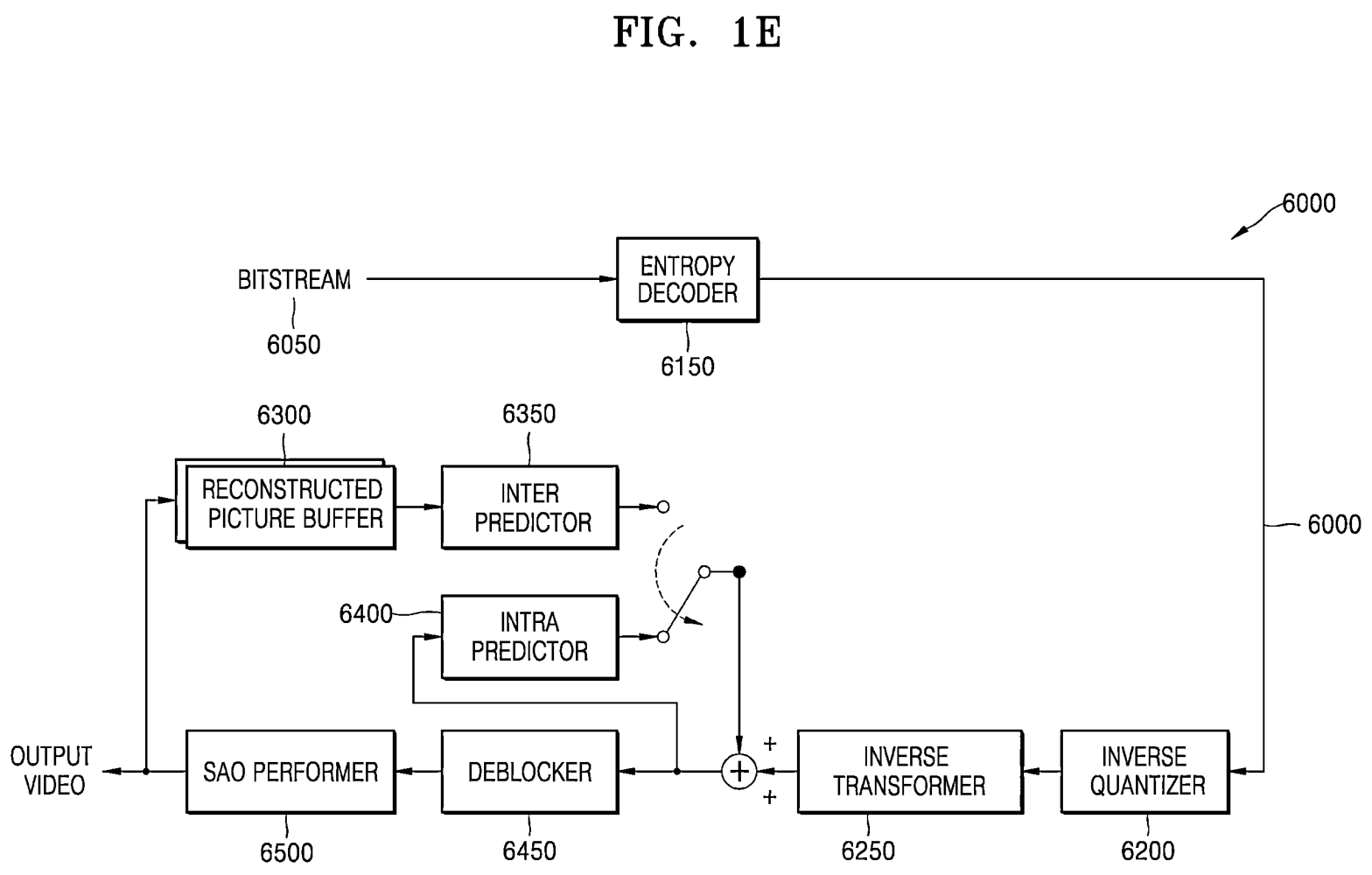

FIG. 1E is a block diagram of an image decoder 6000 according to various embodiments.

The image decoder 6000 according to various embodiments performs operations necessary for the image decoder 110 of the image decoding apparatus 100 to decode image data.

Referring to FIG. 1D, an entropy decoder 6150 parses, from a bitstream 6050, encoded image data to be decoded, and encoding information necessary for decoding. The encoded image data is a quantized transform coefficient, and an inverse quantizer 6200 and an inverse transformer 6250 reconstruct residue data from the quantized transform coefficient.

An intra predictor 6400 performs intra prediction on each of blocks. An inter predictor 6350 performs inter prediction on each block by using a reference image obtained from a reconstructed picture buffer 6300. Data of a spatial domain for a block of a current image included in the bitstream 6050 may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image may be output. Reconstructed images stored in the reconstructed picture buffer 6300 may be output as a reference image. In order for the image decoding apparatus 100 to encode the image data, the image decoder 6000 according to various embodiments may perform operations of each stage on each block.

Figure 2A:
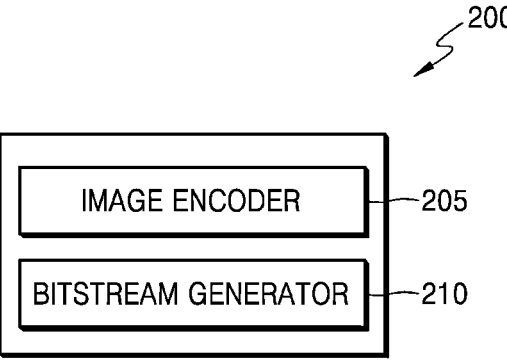
FIG. 2A is a block diagram of an image encoding apparatus according to various embodiments.

FIG. 2A is a block diagram of an image encoding apparatus according to various embodiments.

An image encoding apparatus 200 according to various embodiments may include an image encoder 205 and a bitstream generator 210.

The image encoder 205 and the bitstream generator 210 may include at least one processor. In addition, the image encoder 205 and the bitstream generator 210 may include a memory storing instructions to be executed by the at least one processor. The image encoder 205 may be implemented as separate hardware from the bitstream generator 210 or may include the bitstream generator 210.

Hereinafter, an operation in which the image encoding apparatus 200 performs transform on a current block according to the MTS and generates a syntax element regarding the MTS will be described.

The image encoder 205 may perform transform on a current transform unit, based on a horizontal transform or vertical transform kernel with respect to the current transform unit, to determine the horizontal transform or vertical transform kernel with respect to the current transform unit. The image encoder 205 may generate a prediction block with respect to a current coding unit or the current transform unit by performing inter-prediction, inter-prediction, or the like. The image encoder 205 may generate at least one coefficient included in the current transform unit based on a prediction block and an original block with respect to the current coding unit or the current transform unit, and may perform transform on the at least one coefficient included in the current transform unit.

The image encoder 205 may generate the syntax element regarding the MTS with respect to the current coding unit or the current transform unit included in the current coding unit based on the horizontal transform or vertical transform kernel with respect to the current transform unit.

The image encoder 205 may encode the at least one transform coefficient generated by performing transformation on the current transform unit. That is, the image encoder 205 may quantize and entropy encode the at least one transform coefficient generated by performing transformation on the current transform unit and may generate information about the encoded at least one transform coefficient with respect to the current transform unit. The image encoder 205 may determine one of various candidate transform kernels as the horizontal or vertical transform kernel. Here, various candidate transform kernels may include a DCT2, a DCT8, and a DST7. However, it would be understood by one of ordinary skill in the art that the candidate transform kernels are not limited thereto and may include various transform kernels, such as a DST4, a DCT4, etc.

The bitstream generator 210 may generate a bitstream including the information about the encoded at least one transform coefficient with respect to the current coding unit and the syntax element regarding the MTS.

For example, the bitstream generator 210 may generate the bitstream including the syntax element regarding the MTS in a syntax structure of the current coding unit or a syntax structure of the current transform unit. That is, the bitstream generator 210 may generate a syntax structure including the syntax element regarding the MTS, separately from a residual coding syntax structure, and may generate the bitstream including the generated syntax structure. Here, the syntax element regarding the MTS may be a syntax element indicating at least one of whether or not to use the MTS with respect to the current coding unit or the current transform unit and one mode included in a plurality of modes according to the MTS. For example, the syntax element may include a flag indicating whether or not to use the MTS and an MTS index indicating one of the plurality of modes according to the MTS. Alternatively, the syntax element may be index information indicating one of the plurality of modes according to the MTS along with whether or not to use the MTS.

The syntax element regarding the MTS may not be included in the residual coding syntax structure and may be included in the syntax structure of the coding unit or the syntax structure of the transform unit.

When a transform kernel with respect to the current transform unit is determined as the DCT2, the image encoder 205 may generate a syntax element indicating not to use the MTS with respect to the current coding unit or the current transform unit.

When the horizontal or vertical transform kernel with respect to the current coding unit or the current transform unit is determined as one of the DST7 and the DST8, the image encoder 205 may generate the syntax element regarding the MTS indicating one of the plurality of modes according to the MTS with respect to the current coding unit or the current transform unit. Here, the syntax element may also indicate to use the MTS with respect to the current coding unit or the current transform unit. It is not limited thereto. The image encoder 205 may generate a flag indicating to use the MTS with respect to the current coding unit or the current transform unit.

When a tree type is not dual tree chroma, a size of the current coding unit is less than or equal to a predetermined size, and a luma transform block includes at least one transform coefficient level that is not 0, the image encoder 205 may generate the syntax element regarding the MTS with respect to the current transform unit included in the current coding unit.

When the tree type is not dual tree chroma, the size of the current coding unit is less than or equal to a predetermined size, and the luma transform block includes the at least one transform coefficient level that is not 0, the image encoder 205 may generate the syntax element regarding the MTS with respect to the current coding unit or the current transform unit included in the current coding unit, when a prediction mode of the current coding unit is an inter-mode and it is indicated that the MTS is enabled in the inter-mode, or when the prediction mode of the current coding unit is an intra-mode and it is indicated that the MTS is enabled in the intra-mode. Here, whether or not to enable the MTS may be determined for each sequence.

Hereinafter, an operation in which the image encoding apparatus 200 skips an inverse transformation operation and encodes a coefficient of a current block to generate a syntax element indicating whether or not to use a transform skip mode will be described.

The image encoder 205 may skip a transform operation on the current transform unit based on a size of the current transform unit and may encode at least one coefficient included in the current transform unit. The image encoder 205 may skip the transform operation on the current transform unit and may quantize and entropy-encode the at least one coefficient included in the current transform unit.

The image encoder 205 may encode a flag indicating whether or not to use the transform skip mode with respect to the current transform unit.

The bitstream generator 210 may generate a bitstream including information about the encoded at least one transform coefficient with respect to the current transform unit and the syntax element regarding the MTS. The bitstream generator 210 may generate the bitstream such that a transform skip flag is included in a syntax structure that is different from a residual coding syntax structure. That is, the transform skip flag may not be included in the residual coding syntax structure and may be included in a syntax structure of the transform unit.

When a tree type is not dual tree chroma and the transform skip mode is enabled, the image encoder 205 may determine whether or not to perform encoding according to the transform skip mode and may encode the transform skip flag based on a result of the determination.

When the tree type is not dual tree chroma, and the transform skip mode is enabled, and when a luma transform block includes at least one transform coefficient level that is not 0, the image encoder 205 may determine whether or not to perform encoding according to the transform skip mode and may encode the transform skip flag based on the result of the determination.

When the tree type is not dual tree chroma, and the transform skip mode is enabled, and when a size of the current transform unit is less than or equal to a predetermined size, which is the size of a largest transform unit of the transform skip mode, and the luma transform block includes at least one transform coefficient level that is not 0, the image encoder 205 may determine whether or not to perform encoding according to the transform skip mode and may encode the transform skip flag based on the result of the determination.

When the conditions mentioned above are met, and when it is additionally determined to use the MTS, the image encoder 205 may encode the transform skip flag. It is not limited thereto. In contrast, when it is determined not to use the MTS, the image encoder 205 may encode the transform skip flag.

Hereinafter, SBT, in which the image encoding apparatus 200 performs transform on only a partial area (a sub-block) of an inter-residual block, is described.

When a prediction mode of the current coding unit is an inter-mode, the image encoder 205 may determine whether or not to perform transform on only one sub-block of two sub-blocks with respect to the current coding unit or the current transform unit.

In order to determine whether or not to perform transform on only one sub-block, the image encoder 205 may generate at least one transform coefficient by performing transformation on only one sub-block of the two sub-blocks of the current coding unit or the current transform unit, scan only an area included in the one sub-block, and entropy-encode information about the at least one transform coefficient included in the scanned one sub-block. Here, the scanning denotes a method of transforming a two-dimensional arrangement into a one-dimensional arrangement.

Based on the determination, the image encoder 205 may encode a flag indicating whether or not to perform transform on only one sub-block of the two sub-blocks generated by splitting a transform unit with respect to the current coding unit.

The image encoder 205 may generate a bitstream including the encoded flag and the entropy-encoded information about the at least one transform coefficient.

However, it is not limited thereto. The image encoder 205 may scan the at least one transform coefficient with respect to only some areas (hereinafter, scan areas) included in the one sub-block according to a size of a current block. At least one of a height and a width of the scan area may be ½ of the sub-block. In this case, a location of a last significant coefficient may be determined within a range of x locations and y locations from a pixel at a left upper edge of the scanned area to a pixel at a right lower end of the scanned area, and information about the location of the last significant coefficient within the range may be encoded.

The image encoder 205 may encode a flag cu_sbt_quad_flag indicating to split the current coding unit or the current transform unit into sub-blocks including a sub-block having a ½ or ¼ size.

The image encoder 205 may encode a flag cu_sbt_horizontal_flag indicating whether or not to split the current coding unit or the current transform unit in a horizontal direction or a vertical direction.

The image encoder 205 may encode a flag cu_sbt_pos_flag indicating a location of one block on which inverse transformation is to be performed, of the two sub-blocks included in the current coding unit or the current transform unit.

The image encoder 205 may not encode information about a split direction of the current coding unit or the current transform unit. For example, when a height or a width of the current coding unit or the current transform unit is greater than a predetermined height or a predetermined width, the image encoder 205 may determine to allow a vertical split or a horizontal split of the height or the width of the current coding unit or the current transform unit.

When the current coding unit or the current transform unit is split into sub-blocks including a sub-block having a ¼ size, the image encoder 205 may determine a split direction as a horizontal split based on whether or not to allow the height of current coding unit or the current transform unit to be horizontally split into the sub-blocks including the sub-block having the ¼ size, and thus, the image encoder 205 may not encode the information about the split direction of the current coding unit or the current transform unit.

When the current coding unit or the current transform unit is split into sub-blocks including a sub-block having a ½ size, the image encoder 205 may determine a split direction as a horizontal split based on whether or not to allow the height of the current coding unit or the current transform unit to be horizontally split into the sub-blocks including the sub-block having the ½ size, and thus, the image encoder 205 may not encode the information about the split direction of the current coding unit or the current transform unit.

Above, the encoding operations of the image encoding apparatus 200 according to the MTS, the transform skip mode, and the sub-block transform, respectively, are separately described. However, the disclosure is not limited thereto. It would be understood by one of ordinary skill in the art that the image encoding apparatus 200 may perform an encoding operation by combining at least a portion of each operation unless there is an incompatibility between each operation.

Figure 2B:
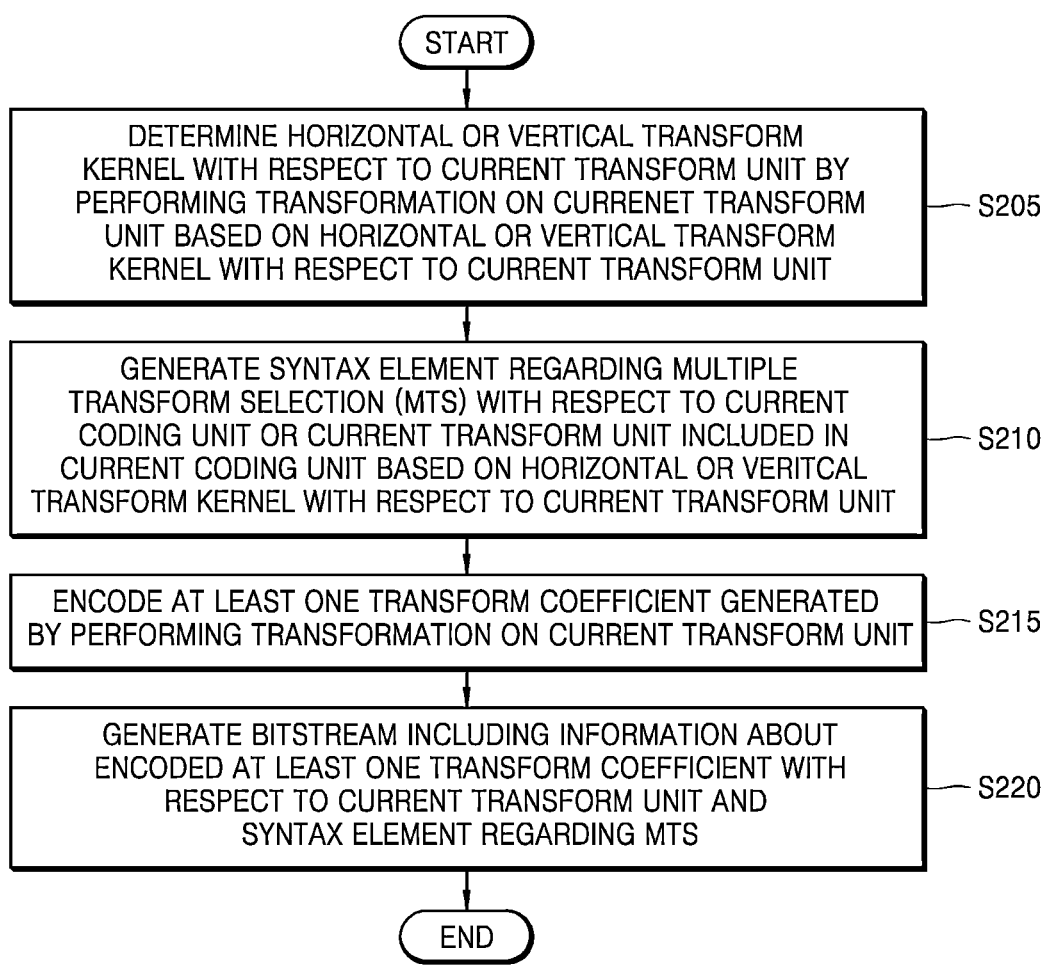
FIG. 2B is a flowchart of an image encoding method according to various embodiments.

FIG. 2B is a flowchart of an image encoding method according to various embodiments.

In operation S205, the image encoding apparatus 200 may determine a horizontal or vertical transform kernel with respect to a current transform unit by performing transformation on the current transform unit based on the horizontal or vertical transform kernel with respect to the current transform unit. The image encoding apparatus 200 may perform the operation described above on at least a portion of an image, in order to determine whether or not to perform transform on the current transform unit based on the horizontal or vertical transform kernel with respect to the current transform unit. As a result, the image encoding apparatus 200 may determine to perform the transform on the current transform unit based on the horizontal transform or vertical transform kernel with respect to the current transform unit.

That is, the image encoding apparatus 200 may determine to perform the transform on the current transform unit according to the MTS.

In operation S210, the image encoding apparatus 200 may generate a syntax element regarding the MTS with respect to a current coding unit or the current transform unit included in the current coding unit based on the horizontal or vertical transform kernel with respect to the current transform unit.

In operation S215, the image encoding apparatus 200 may encode at least one transform coefficient generated by performing the transform on the current transform unit.

In operation S220, the image encoding apparatus 200 may generate a bitstream including information about the encoded at least one transform coefficient with respect to the current transform unit and the syntax element regarding the MTS. Here, the syntax element regarding the MTS may be included in a syntax structure of a transform unit or a syntax structure of a coding unit and may not be included in a residual coding structure.

Figure 2C:
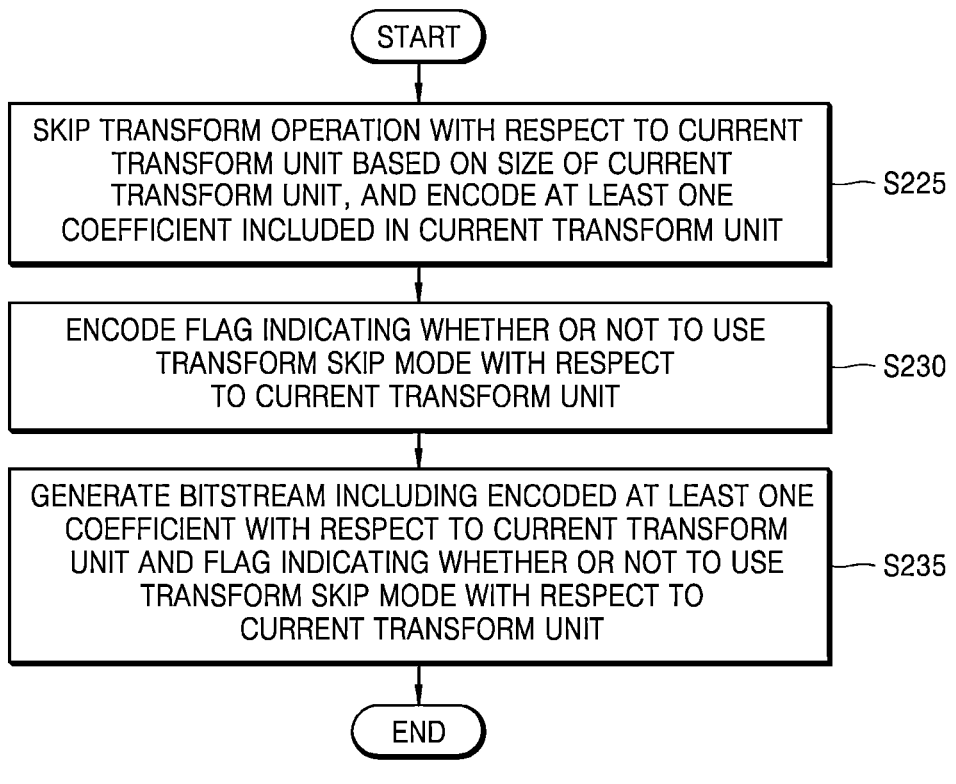
FIG. 2C is a flowchart of an image encoding method according to various embodiments.

FIG. 2C is a flowchart of an image encoding method according to various embodiments.

In operation S225, the image encoding apparatus 200 may skip a transform operation on the current transform unit based on a size of the current transform unit and may encode at least one coefficient included in the current transform unit. For example, when the size of the current transform unit is less than or equal to a maximum size of a transform skip block, the image encoding apparatus 200 may skip the transform operation on the current transform unit and may encode the at least one coefficient included in the current transform unit.

In order to determine whether or not to skip the transform operation on the current transform unit based on the size of the current transform unit and encode the at least one coefficient included in the current transform unit, the image encoding apparatus 200 may perform the operation described above on at least a portion of an image. As a result, the image encoding apparatus 200 may determine whether or not to use a transform skip mode with respect to the current transform unit. In operation S230, the image encoding apparatus 200 may encode a flag indicating whether or not to use the transform skip mode with respect to the current transform unit.

In operation S235, the image encoding apparatus 200 may generate a bitstream including the encoded at least one coefficient with respect to the current transform unit and the flag indicating whether or not to use the transform skip mode with respect to the current transform unit. Here, the flag indicating whether or not to use the transform skip mode may be included in the syntax structure of the transform unit and may not be included in the residual coding syntax structure.

Figure 2D:
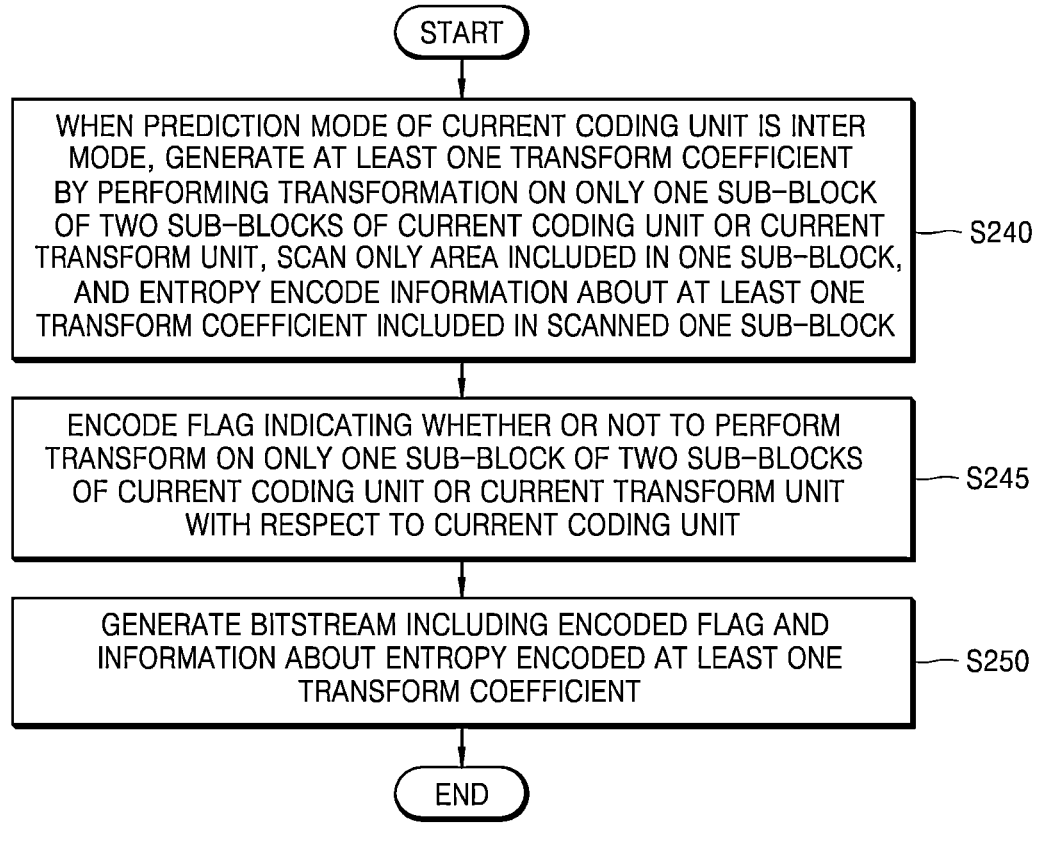
FIG. 2D is a flowchart of an image encoding method according to various embodiments.

FIG. 2D is a flowchart of an image encoding method according to various embodiments.

In operation S240, when a prediction mode of the current coding unit is an inter-mode, the image encoding apparatus 200 may perform transform on only one sub-block of two sub-blocks of the current coding unit or the current transform unit to generate at least one transform coefficient, scan only an area included in the one sub-block on which the transform is performed, and entropy-encode information about the at least one transform coefficient included in the scanned one sub-block. However, it is not limited thereto. The image encoder 205 may scan the at least one transform coefficient with respect to only some areas (hereinafter, scan areas) included in the one sub-block according to a size of a current block. At least one of a height and a width of the scan area may be ½ of the sub-block. In this case, a location of a last significant coefficient may be determined within a range of x locations and y locations from a pixel at a left upper edge of the scanned area to a pixel at a right lower end of the scanned area, and information about the location of the last significant coefficient within the range may be encoded.

In order to determine whether or not to perform the transform on only one sub-block of the two sub-blocks of the current coding unit or the current transform unit, the image encoding apparatus 200 may perform at least a portion of the operation described above, with respect to at least a portion of an image. As a result, the image encoding apparatus 200 may determine to perform the transform on only one sub-block of the two sub-blocks of the current coding unit or the current transform unit with respect to the current coding unit.

In operation S245, the image encoding apparatus 200 may encode a flag indicating whether or not to perform transform on only one sub-block of the two sub-blocks of the current coding unit or the current transform unit with respect to the current coding unit.

In operation S250, the image encoding apparatus 200 may generate a bitstream including the encoded flag and the entropy-encoded information about the at least one transform coefficient.

Above, the methods, performed by the image encoding apparatus 200, of encoding an image according to the MTS, the transform skip mode, and the sub-block transform, respectively, are described according to various embodiments by referring to FIGS. 2B through 2D. Above, the methods, performed by the image encoding apparatus 200, of encoding the image are described separately with respect to each drawing. However, it may be understood by one of ordinary skill in the art that unless there is an incompatibility between each encoding method, at least a portion of each encoding method illustrated in the drawing may be combined with each other to perform an encoding operation in a logical order.

Figure 2E:
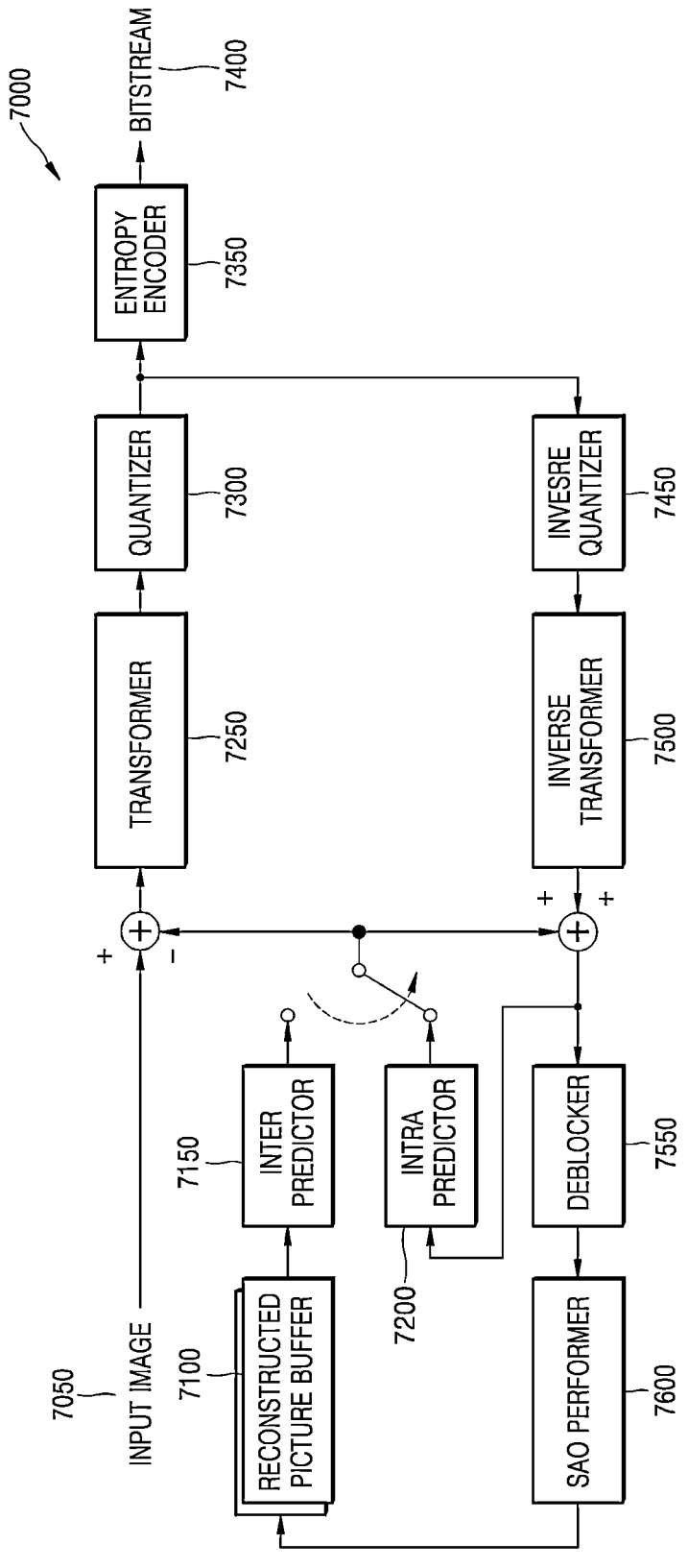
FIG. 2E is a block diagram of an image encoder according to various embodiments.

FIG. 2E is a block diagram of an image encoder according to various embodiments.

An image encoder 7000 according to various embodiments performs operations necessary for the image encoder 205 of the image encoding apparatus 200 to encode image data.

That is, an intra predictor 7200 performs intra prediction on each of blocks of a current image 7050, and an inter predictor 7200 performs inter prediction on each of the blocks by using the current image 7050 and a reference image obtained from a reconstructed picture buffer 7100.

Prediction data is subtracted from data of a block to be encoded in the current image 7050, wherein the prediction data is related to each block and is output from the intra predictor 7200 or the inter predictor 7200, and the transformer 7250 and the quantizer 7300 may output a quantized transform coefficient of each block by performing transformation and quantization on the residue data. An inverse quantizer 7450 and an inverse transformer 7500 may reconstruct residue data of a spatial domain by performing dequantization and inverse transformation on the quantized transform coefficient. The reconstructed residue data of the spatial domain may be added to the prediction data that is related to each block and is output from the intra predictor 7200 or the inter predictor 7200, and thus may be reconstructed as data of a spatial domain with respect to a block of the current image 7050. A deblocker 7550 and a SAO performer generate a filtered reconstructed image by performing inloop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 200, the image encoder 7000 according to various embodiments may perform operations of each stage on each block.

Hereinafter, splitting of a coding unit will be described in detail according to an embodiment of the present disclosure.

An image may be split into largest coding units. A size of each largest coding unit may be determined based on information obtained from a bitstream. A shape of each largest coding unit may be a square shape of the same size. However, an embodiment is not limited thereto. Also, a largest coding unit may be hierarchically split into coding units based on split shape mode information obtained from the bitstream. The split shape mode information may include at least one of information indicating whether splitting is to be performed, split direction information, and split type information. The information indicating whether splitting is to be performed indicates whether a coding unit is to be split. The split direction information indicates that splitting is to be performed in one of a horizontal direction or a vertical direction. The split type information indicates that a coding unit is to be split by using one of binary split, tri split (also referred to as triple split), or quad split.

For convenience of description, in the disclosure, it is assumed that the split shape mode information includes the information indicating whether splitting is to be performed, the split direction information, and the split type information, but the disclosure is not limited thereto. The image decoding apparatus 100 may obtain, from a bitstream, the split shape mode information as one bin string. The image decoding apparatus 100 may determine whether to split a coding unit, a split direction, and a split type, based on the one bin string.

The coding unit may be smaller than or same as the largest coding unit. For example, when the split shape mode information indicates that splitting is not to be performed, the coding unit has a same size as the largest coding unit. When the split shape mode information indicates that splitting is to be performed, the largest coding unit may be split into lower-depth coding units. When split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in detail with reference to FIGS. 3 through 16.

Also, the coding unit may be split into prediction units for prediction of the image. The prediction units may each be equal to or smaller than the coding unit. Also, the coding unit may be split into transform units for transformation of the image. The transform units may each be equal to or smaller than the coding unit. Shapes and sizes of the transform unit and the prediction unit may not be related to each other. The coding unit may be distinguished from the prediction unit and the transform unit, or the coding unit, the prediction unit, and the transform unit may be equal to each other. Splitting of the prediction unit and the transform unit may be performed in a same manner as splitting of the coding unit.

The splitting of the coding unit will be described in detail with reference to FIGS. 3 through 16. A current block and a neighboring block of the disclosure may indicate one of the largest coding unit, the coding unit, the prediction unit, and the transform unit. Also, the current block of the current coding unit is a block that is currently being decoded or encoded or a block that is currently being split. The neighboring block may be a block reconstructed prior to the current block. The neighboring block may be adjacent to the current block spatially or temporally. The neighboring block may be located at one of the lower left, left, upper left, top, upper right, right, lower right of the current block.

Figure 3:
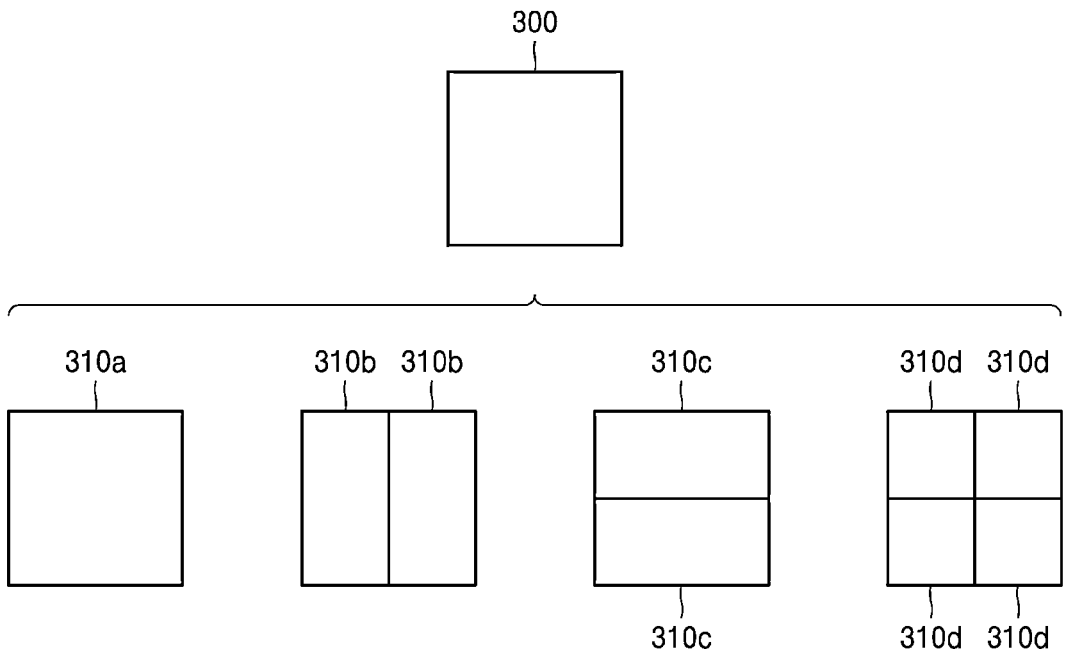
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may obtain pre-agreed split shape mode information, based on the block shape information. The image decoding apparatus 100 may obtain the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, an image decoder 110 may not split a coding unit 310*a* having the same size as the current coding unit 300, based on the split shape mode information indicating not to perform splitting, or may determine coding units 310*b*, 310*c*, or 310*d* split based on the split shape mode information indicating a predetermined splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predetermined splitting methods of splitting the square coding unit will be described in detail below in relation to various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420*a* and 420*b*, 430*a* to 430*c*, 470*a* and 470*b*, or 480*a* to 480*c* split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (tri-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a predetermined number of times, unlike the other coding units 430a and 430c, or 480a and 480c.

Figure 5:
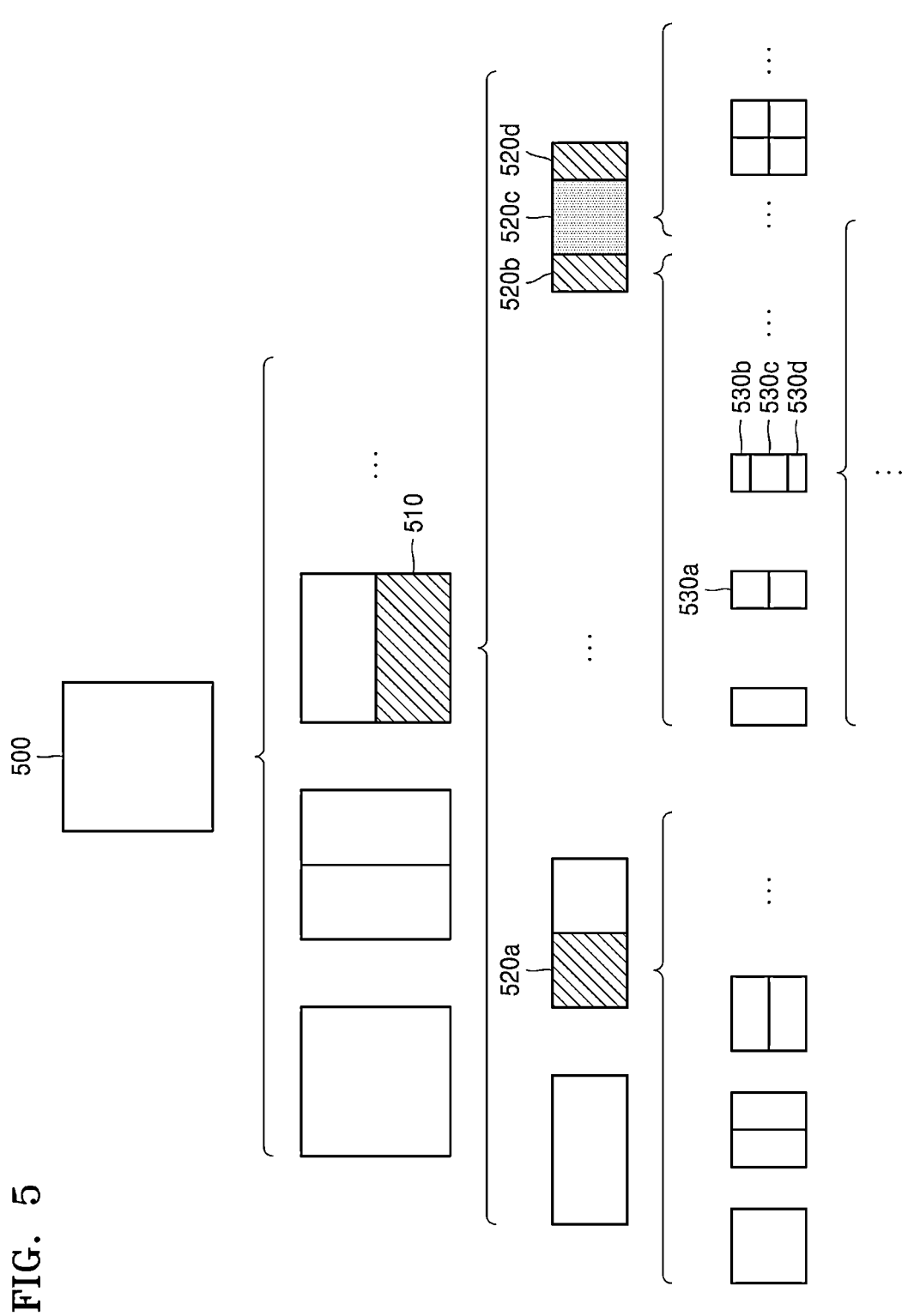
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split a square first coding unit 500 into coding units, based on at least one of the block shape information and the split shape mode information, or may determine to not split the square first coding unit 500. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520a, or 520b, 520c, and 520d at least one of the block shape information and the split shape mode information, or may not split the non-square second coding unit 510. The image decoding apparatus 100 may obtain at least one of the block shape information and the split shape mode information, and may obtain (split→obtain 으로 수정했습니다) a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520a, or 520b, 520c, and 520d based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 5, a predetermined coding unit from among the odd number of third coding units 520b, 520c, and 520d determined by splitting the non-square second coding unit 510 (e.g., a coding unit at a center location or a square coding unit) may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on at least one of block shape information and split shape mode information. Also, the image decoding apparatus 100 may determine to not split the second coding unit 510 based on at least one of block shape information and split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of block shape information and split shape mode information, which is used to split a current coding unit, from a predetermined location in the current coding unit.

FIG. 6 illustrates a method, performed by the image decoding apparatus 100, of determining a predetermined coding unit from among an odd number of coding units, according to an embodiment.

Referring to FIG. 6, at least one of block shape information and split shape mode information about a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the block shape information and the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a,

620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, based on the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (bi split; binary split) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of block shape information and split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use at least one of the block shape information and the split shape mode information, which is obtained from a sample at a predetermined location in the current coding unit 600 (e.g., a sample at a center location of the current coding unit 600), to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location based on a block shape of the current coding unit 600, may determine the coding unit 620b including a sample, from which predetermined information (e.g., at least one of the block shape information and the split shape mode information) is obtainable, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use at least one of the block shape information and the split shape mode information so as to determine a coding unit at a predetermined location from among the plurality of coding units. According to an embodiment, the image decoding apparatus 100 may obtain at least one of the block shape information and the split shape mode information from a sample at a predetermined location in a coding unit, and may split the plurality of coding units, which are generated by splitting the current coding unit, by using at least one of the block shape information and the split shape mode information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
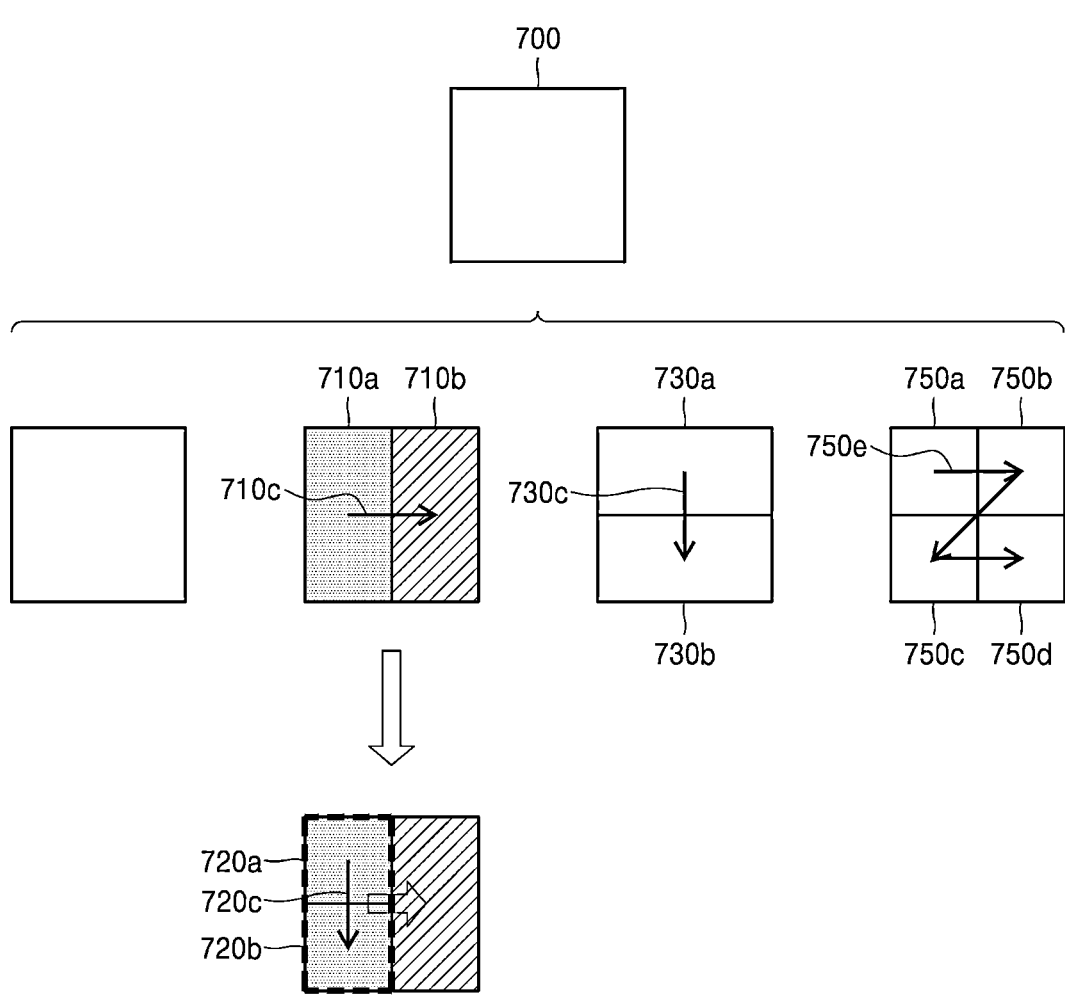
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on at least one of block shape information and split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750c).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
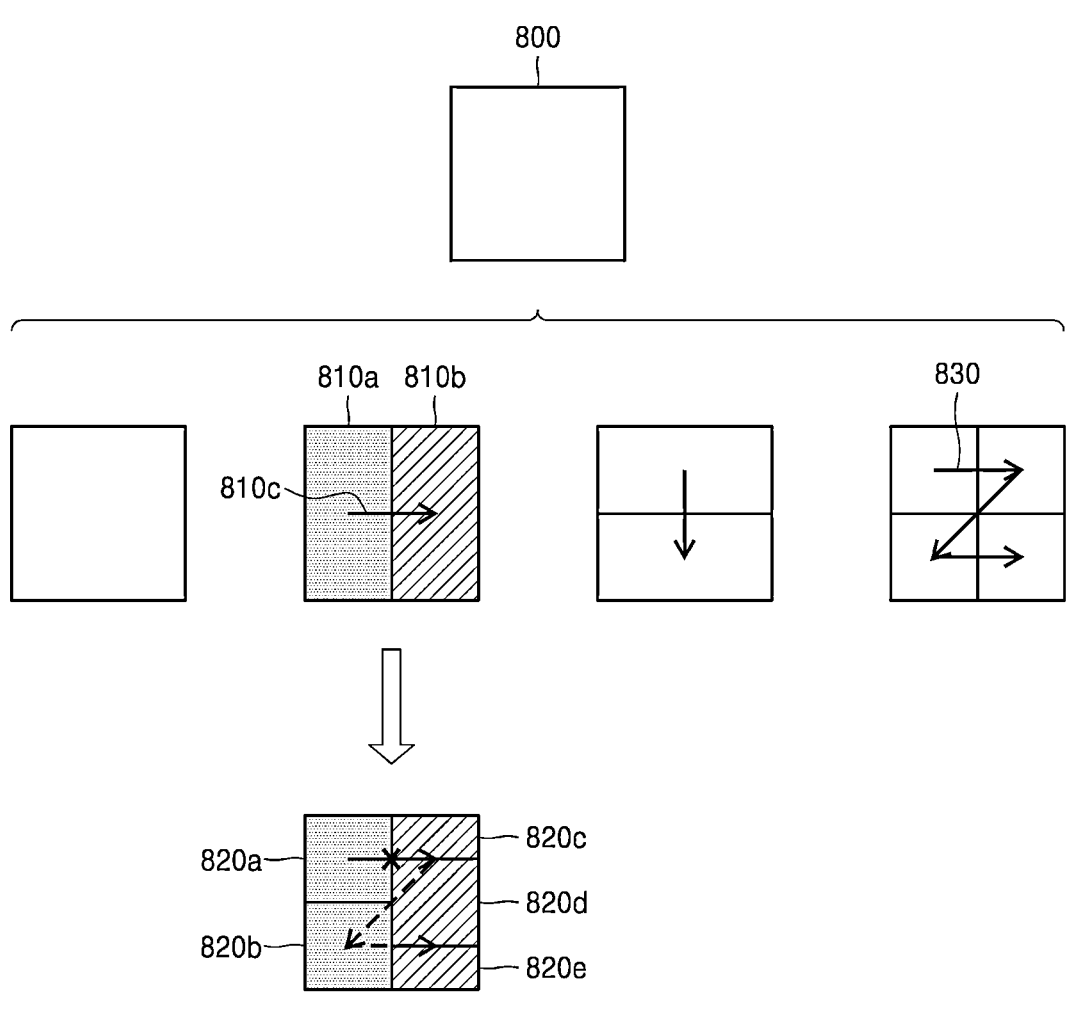
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained block shape information and split shape mode information. Referring to FIG. 8, a square first coding unit 800 may be split into non-square second coding units 810a and 810b, and the second coding units 810a and 810b may be independently split into third coding units 820a and 820b, and 820c to 820c. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820c.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the right second coding unit 810b among the second coding units 810a and 810b may be split into an odd number of third coding units 820c, 820d, and 820c. A processing order of a plurality of coding units included in the first coding unit 800 may be a predetermined order (e.g., a Z-scan order 830), and the image decoding apparatus 100 may determine whether the third coding units 820c, 820d, and 820c, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c to 820e included in the first coding unit 800 satisfy the condition for processing in the predetermined order, and the condition relates to whether at least one of a width and height of the second coding units 810a and 810b is split in half along a boundary of the third coding units 820a and 820b, and 820c to 820c. For example, the third coding units 820a and 820b determined when the height of the left second coding unit 810a of the non-square shape is split in half may satisfy the condition. It may be determined that the third coding units 820c to 820c do not satisfy the condition because the boundaries of the third coding units 820c to 820c determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
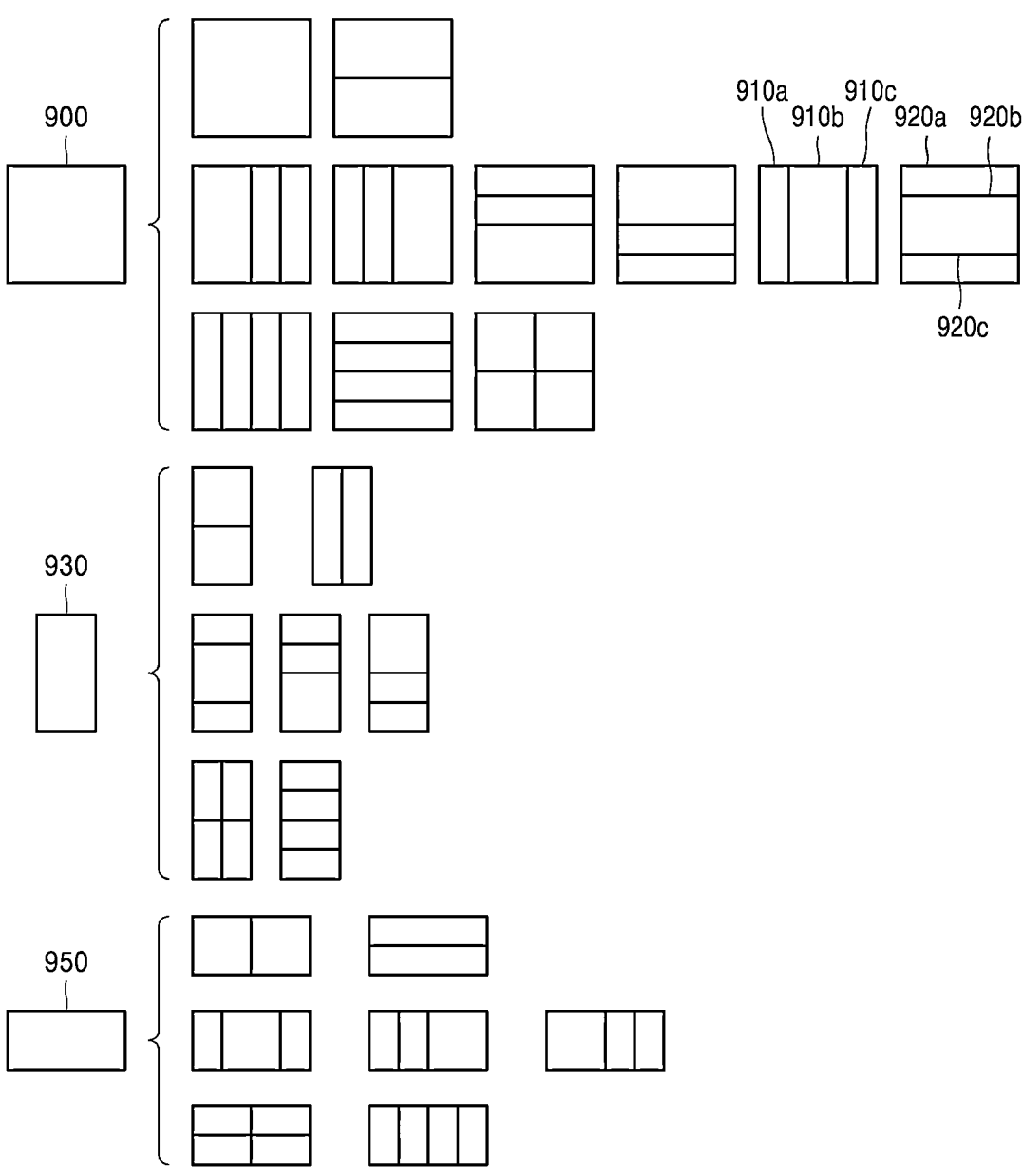
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through a receiver (not shown). The square first coding unit 900 may be split into four square coding units, or may be split into a plurality of non-square coding units. For example, referring to FIG. 9, when the block shape information indicates that the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
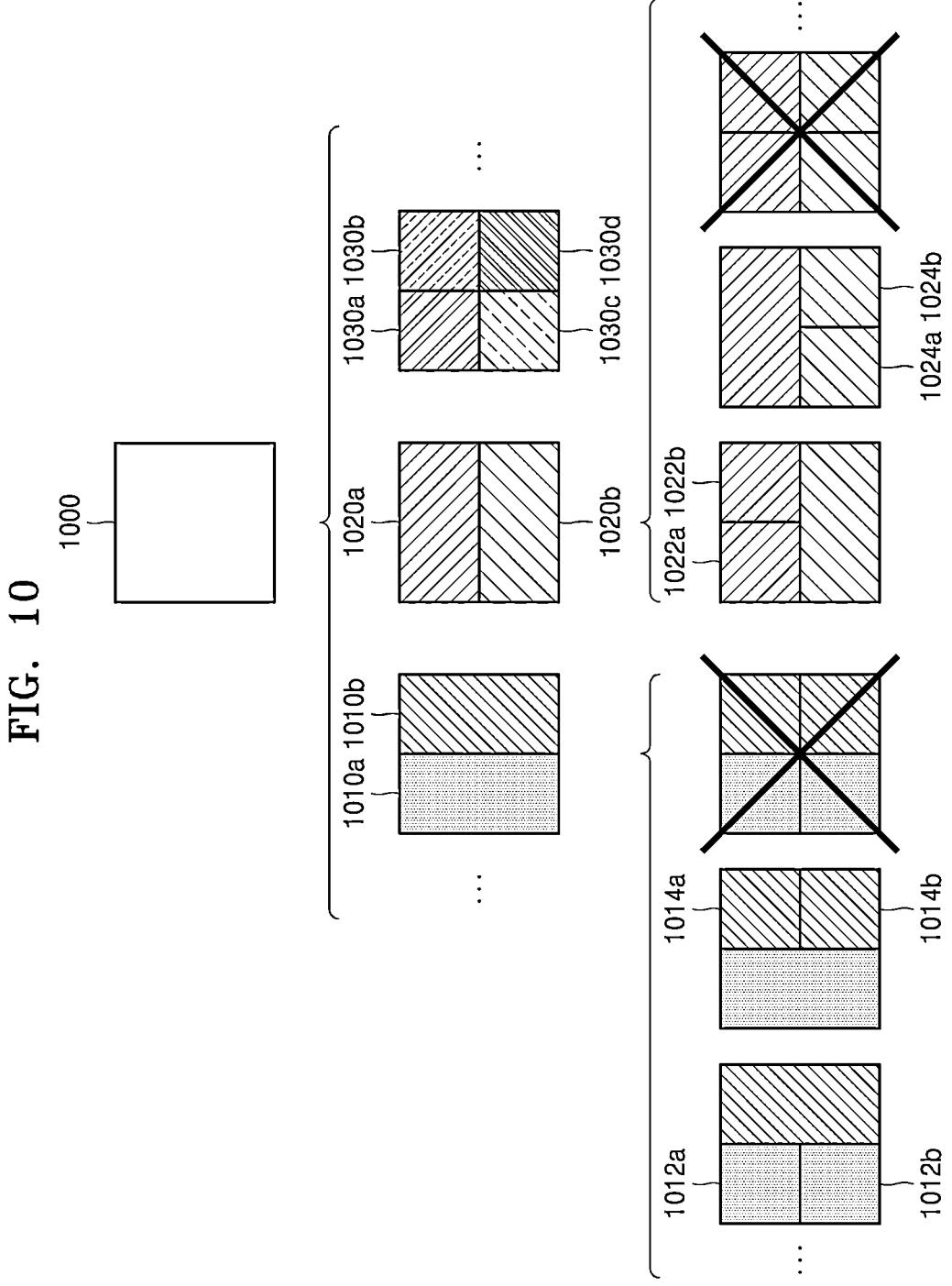
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the receiver (not shown). The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
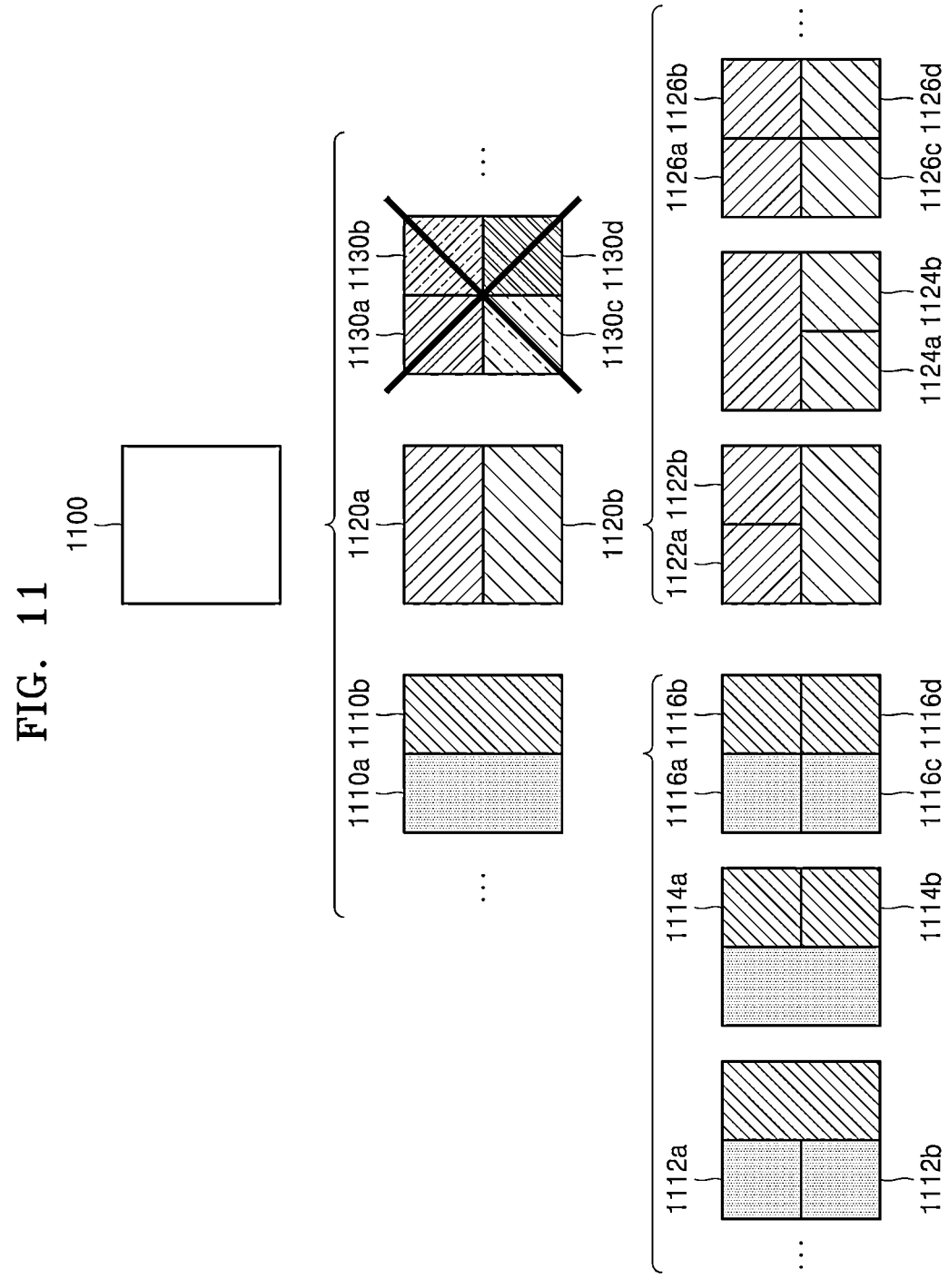
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130*a*, 1130*b*, 1130*c*, and 1130*d* split from the first coding unit 1100 may be determined.

Figure 12:
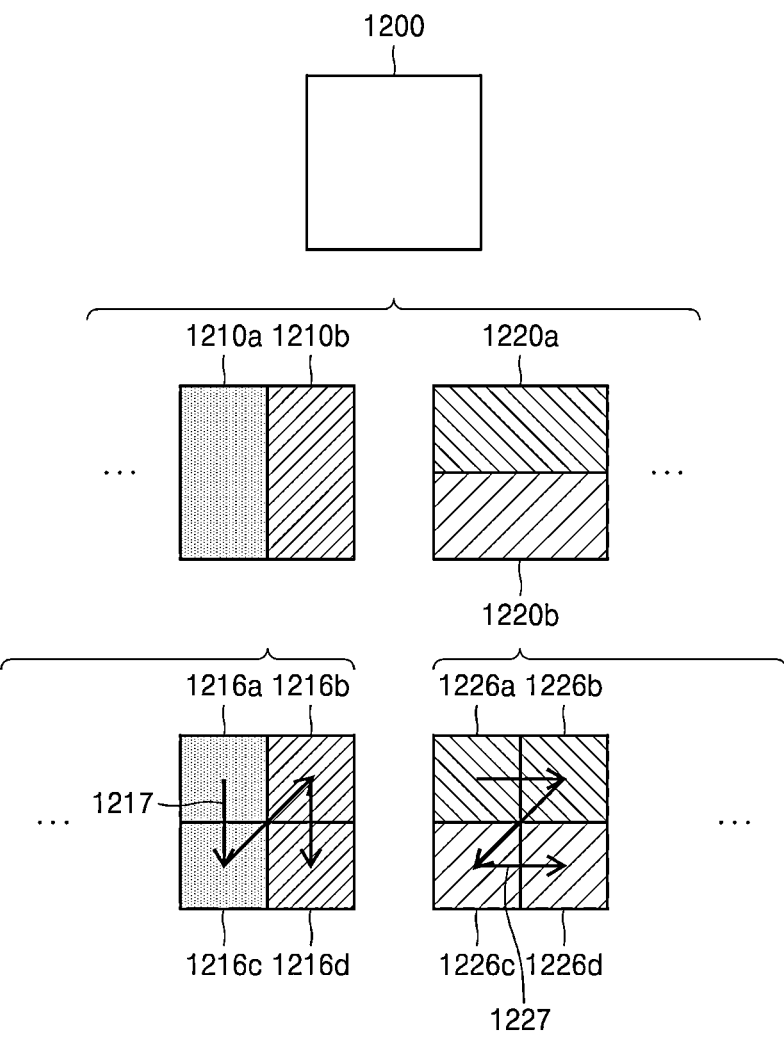
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on at least one of block shape information and split shape mode information about each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1920*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders even when the coding units are eventually determined to have the same shape.

FIG. 13 illustrates a process of determining a depth of a coding unit when a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
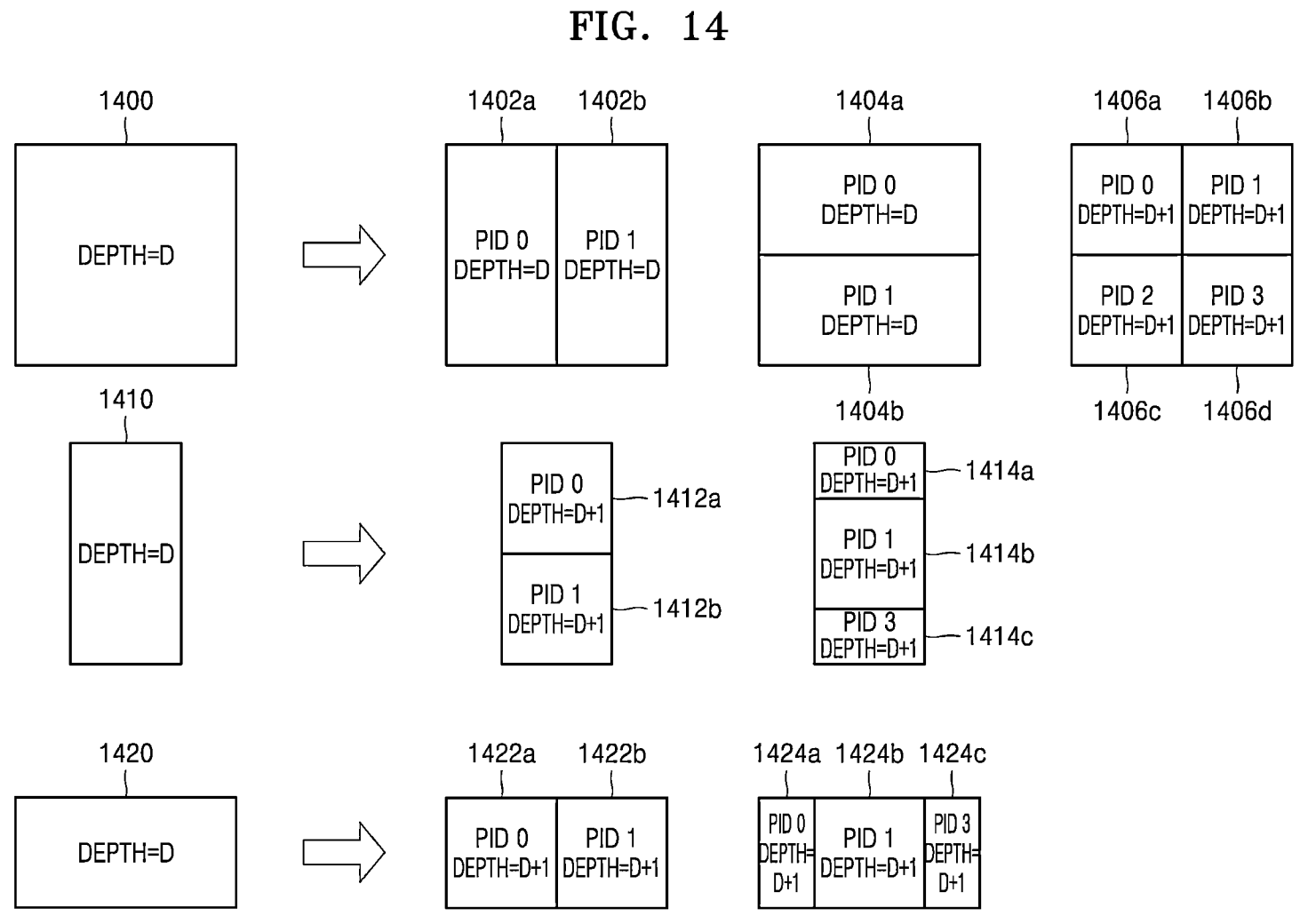

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414a, 1414b, and 1414c. The image decoding apparatus

100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
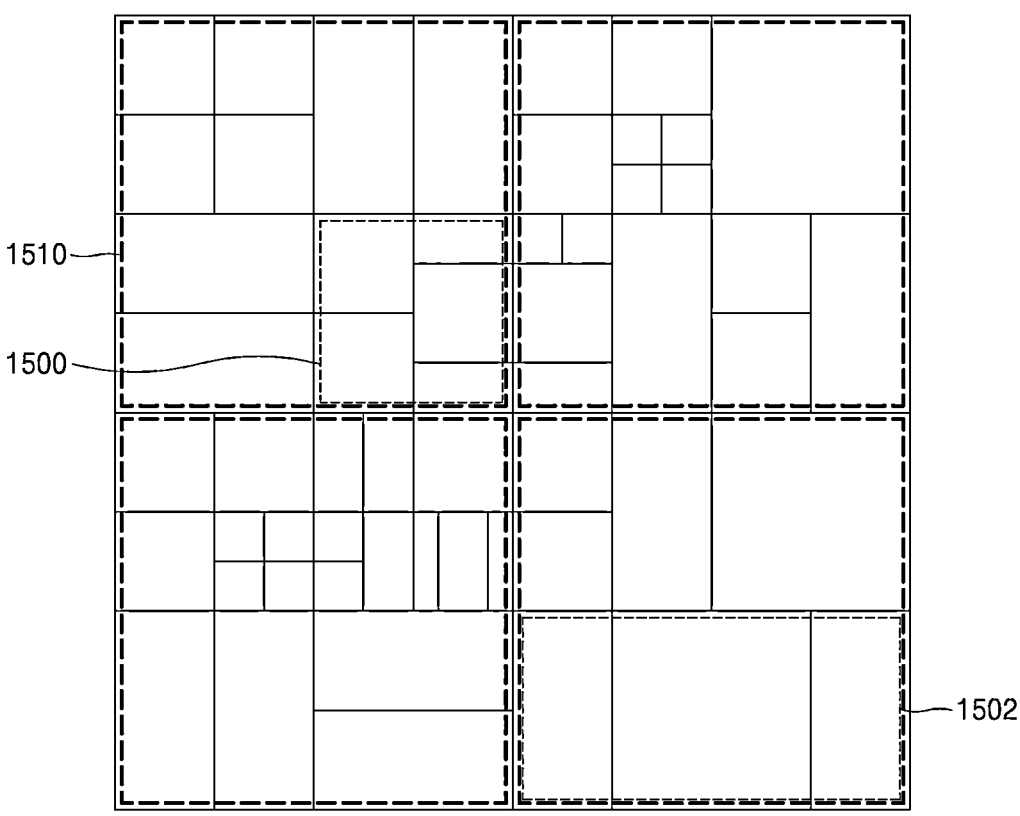
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit.

The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, each slice segment, or each largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
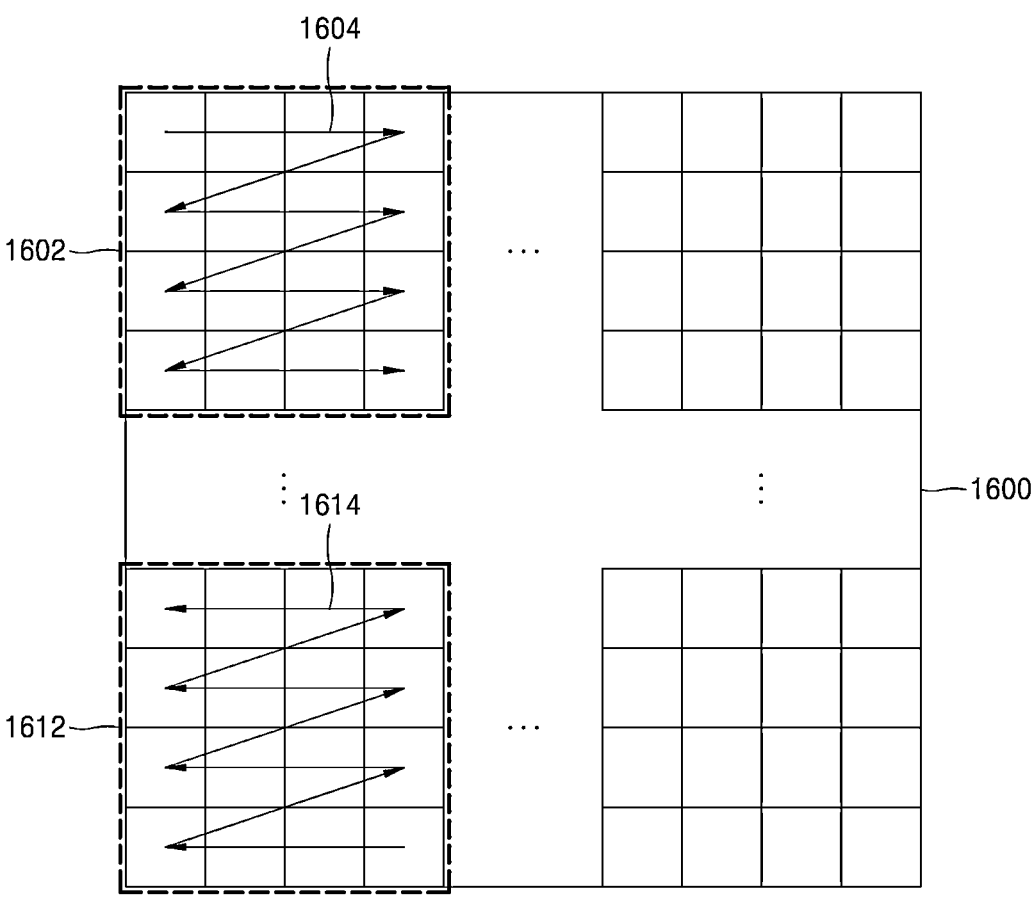
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the receiver (not shown) may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

With reference to FIGS. 17A through 20C, an image encoding apparatus, an image decoding apparatus, an image encoding method, and an image decoding method for encoding or decoding an image by performing transformation, inverse transformation, or the like on data units determined in various shapes according to various embodiments will be described.

FIG. 17A illustrates a syntax structure of a transform unit including a syntax element of MTS and residual coding syntax structure, according to various embodiments.

Referring to FIG. 17A, the image decoding apparatus 100 may parse a flag tu_mts_flag 1705 indicating whether or not to perform inverse transformation on a current transform unit according to the MTS in a transform unit syntax structure 1700. In detail, when a prediction mode CuPredMode of a current coding unit is an intra-mode MODE_INTRA, and a value of an MTS enable flag sps_mts_intra_enabled_flag in the intra-mode, the MTS enable flag being obtained from an SPS, is 1, or when the prediction mode CuPredMode of the current coding unit is an inter-mode MODE_INTER, and a value of the MTS enable flag sps_mts_inter_enabled_flag in the inter-mode, the MTS enable flag being obtained from the SPS, is 1, the image decoding apparatus 100 may parse the flag tu_mts_flag 1705, when a width tbWidth of the current transform unit is less than or equal to 32 or a height tbHeight of the current transform unit is less than or equal to 32, when a value of a coded block flag tu_cbf_luma of a current luma transform unit is 1, and a tree type treeType is not dual tree chroma. When values of tu_cbf_luma, which is a coded block flag of a transform unit of a luma component and tu_cbf_cb or tu_cbf_cr, which is a coded block flag of a transform unit of a chroma component cb or cr, are 1, the image decoding apparatus 100 may call a residual coding syntax structure residual_coding 1710.

The image decoding apparatus 100 may parse an index mts_idx 1715 indicating one of a plurality of modes of the MTS from a bitstream in a residual coding syntax structure residual_coding 1710. Here, the index mts_idx may indicate one of the plurality of modes based on an available type of a horizontal kernel and a vertical kernel. For example, when the available type of the horizontal kernel and the vertical kernel is a DCT8 or a DST7, the plurality of modes may include four modes.

That is, when a value of tu_mts_flag is 1 and a color index cldx is 0 (that is, a color component of a current image is a luma component), the image decoding apparatus 100 may parse the index mts_indx 1715 from the bitstream.

However, according to the embodiment, the image encoding apparatus 200 corresponding to the image decoding apparatus 100 may have to evaluate the four modes (the number of modes when the available type is the DCT8 or the DST7) with respect to the MTS with respect to blocks having various sizes and may finally determine a size and a mode of a block used in the MTS. However, an immense temporal complexity may have to be considered, and thus, it may be difficult to operate as a real time encoding apparatus. Thus, a method is required, whereby the image encoding apparatus 200 may perform transform according to the MTS, by using only a minimum number of modes, without the deterioration of the encoding performance.

Also, according to the embodiment, not both of the syntax elements with respect to the MTS tu_mts_flag 1705 and mts_idx 1715 are included in the transform unit syntax structure 1700. Rather, only tu_mts_flag 1705 is included in the transform unit syntax structure 1700, and mts_idx 1715 is included in the residual coding syntax structure 1710. Thus, the image decoding apparatus 100 may parse the syntax elements with respect to the MTS in different syntax structures in a distributed fashion. Thus, because not all of the syntax elements with respect to transform are parsed at once, a parsing delay may occur, and operations related to (inverse) transform may be performed after parsing of a residual coding structure. Thus, the image decoding apparatus 100 may not perform separate parsing with respect to the transform.

The image decoding apparatus 100 according to various embodiments may perform operations described below to solve the problem described above.

When a prediction mode of the current coding unit is an intra-mode or an inter-mode, and when the current coding unit is encoded in a merge mode, an affine mode, an adaptive motion vector range (AMVR) mode, an advanced motion vector prediction (AMVP) mode, a triangle partition mode, a combined inter- and intra-prediction mode, or a generalized bi-prediction mode, which require residual encoding, the image decoding apparatus 100 may perform a decoding operation as below, when MTS is selected as a transform encoding method.

The image decoding apparatus 100 may parse a flag with respect to on/off of the MTS into a coding unit or a transform unit under a next condition, according to a size of the transform unit, in order to determine whether or not to use the MTS. That is, the image decoding apparatus 100 may parse the flag with respect to on/off of the MTS, when a value of a coded block flag cbf is 1, when decoding of the current coding unit or transform unit is not dual-tree chroma decoding.

When the flag with respect to on/off of the MTS indicates off, the image decoding apparatus 100 may set a DCT2 as a kernel for (inverse) transform, and then, may perform parsing of a residual syntax structure and an inverse transformation operation based on the set kernel, and when the flag with respect to on/off of the MTS indicates on, the image decoding apparatus 100 may perform 1 bit parsing or 2 bit parsing to determine which mode a mode with respect to the MTS is.

When the mode with respect to the MTS is parsed, the image decoding apparatus 100 may finish parsing a syntax structure of the transform unit or the coding unit and then may parse the residual coding syntax structure.

For example, the image decoding apparatus 100 may parse a 1 bit flag with respect to on/off of the MTS in a coding unit or a transform unit under a next condition, according to a size of the transform unit, in order to determine whether or not to use the MTS. That is, when decoding of the current coding unit or transform unit is not dual-tree chroma decoding, the image decoding apparatus 100 may parse the 1 bit flag with respect to on/off of the MTS, when a value of the coded block flag cbf is 1.

When the 1 bit flag with respect to on/off of the MTS indicates off, the image decoding apparatus 100 may set a DCT2 as a kernel for (inverse) transform, and then, may perform parsing of the residual syntax structure and an inverse transformation operation based on the set kernel, and when the 1 bit flag with respect to on/off of the MTS indicates on, the image decoding apparatus 100 may additionally perform 1 bit parsing or 2 bit parsing to determine which mode a mode with respect to the MTS is. For example, the image decoding apparatus 100 may obtain a parsing bit and determine a horizontal kernel and a vertical kernel based on a value of the parsing bit, as shown in one of Tables 1 through 4 below. When the mode with respect to the MTS is parsed, the image decoding apparatus 100 may finish parsing the syntax structure of the transform unit or the coding unit and then may parse the residual coding syntax structure.

TABLE 1

| Parsing Bit | Horizontal Kernel | Vertical Kernel |
| --- | --- | --- |
| 0 (1 bit) | DST7 | DST7 |
| 10 (2 bits) | DST7 | DCT8 |
| 11 (2 bits) | DCT8 | DST7 |

TABLE 2

| Parsing Bit | Horizontal Kernel | Vertical Kernel |
| --- | --- | --- |
| 0 (1 bit) | DST7 | DST7 |
| 10 (2 bits) | DCT8 | DST7 |
| 11 (2 bits) | DST7 | DCT8 |

TABLE 3

| Parsing Bit | Horizontal Kernel | Vertical Kernel |
| --- | --- | --- |
| 0 (1 bit) | DST7 | DST7 |
| 1 (1 bit) | DST7 | DCT8 |

TABLE 4

| Parsing Bit | Horizontal Kernel | Vertical Kernel |
| --- | --- | --- |
| 0 (1 bit) | DST7 | DST7 |
| 1 (1 bit) | DCT8 | DST7 |

FIG. 17B illustrates a syntax structure of a transform unit including a syntax element of a transform selection method, according to various embodiments.

Referring to FIG. 17B, the image decoding apparatus 100 may parse tu_mts_flag in a transform unit syntax structure 1720, and when a value of tu_mts_flag is 1 and a color index cldx is 0, the image decoding apparatus 100 may parse mts_idx. The image decoding apparatus 100 may obtain a parsing bit with respect to mts_idx and determine a horizontal kernel and a vertical kernel based on the value of the parsing bit, based on one of Table 1 through Table 4.

For example, the image decoding apparatus 100 may parse a 2 bit flag with respect to on/off of MTS and a mode of the MTS in a coding unit or a transform unit under a next condition, according to a size of the transform unit, in order to determine whether or not to use the MTS. That is, when encoding of a current coding unit or transform unit is not dual-tree chroma encoding, the image decoding apparatus 100 may parse a 2 bit flag with respect to on/off of the MTS and the mode of the MTS, when a value of the coded block flag cbf is 1. That is, the image decoding apparatus 100 may obtain a parsing bit and determine a horizontal kernel and a vertical kernel based on a value of the parsing bit, based on one of Tables 5 and 6 below. When the 2 bit flag is parsed, the image decoding apparatus 100 may finish parsing a syntax structure of the transform unit or the coding unit and then may parse a residual coding syntax structure.

TABLE 5

| Parsing Bit | Horizontal Kernel | Vertical Kernel |
|---|---|---|
| 00 (2 bits) | DCT2 | DCT2 |
| 01 (2 bits) | DST7 | DST7 |
| 10 (2 bits) | DST7 | DCT8 |
| 11 (2 bits) | DCT8 | DST7 |

TABLE 6

| Parsing Bit | Horizontal Kernel | Vertical Kernel |
|---|---|---|
| 00 (2 bits) | DCT2 | DCT2 |
| 01 (2 bits) | DST7 | DST7 |
| 10 (2 bits) | DCT8 | DST7 |
| 11 (2 bits) | DST7 | DCT8 |

FIG. 17C illustrates a syntax structure of a transform unit including a syntax element of a transform selection method, according to various embodiments.

Referring to FIG. 17C, the image decoding apparatus 100 may parse tu_mts_flag in a transform unit syntax structure 1730. When a prediction mode CuPredMode of a current coding unit is an intra-mode MODE_INTRA, and a value of an MTS enable flag sps_mts_intra_enabled_flag in the intra-mode, the MTS enable flag being obtained from an SPS, is 1, or when the prediction mode CuPredMode of the current coding unit is an inter-mode MODE_INTER, and a value of the MTS enable flag sps_mts_inter_enabled_flag in the inter-mode, the MTS enable flag being obtained from the SPS, is 1, the image decoding apparatus 100 may parse tu_mts_flag 1735 when a width tbWidth of the current transform unit is less than or equal to 32 or a height tbHeight of the current transform unit is less than or equal to 32, when a value of a coded block flag tu_cbf_luma of a current luma transform unit is 1, and a tree type treeType is not dual tree chroma.

The image decoding apparatus 100 may obtain a parsing bit with respect to tu_mts_flag and determine a horizontal kernel and a vertical kernel based on a value of the parsing bit, based on one of Tables 5 and 6.

When values of tu_cbf_luma, which is a coded block flag of a transform unit of a luma component and tu_cbf_cb or tu_cbf_cr, which is a coded block flag of a transform unit of a chroma component cb or cr, are 1, the image decoding apparatus 100 may call a residual coding syntax structure residual_coding.

According to various embodiments described with reference to FIG. 17B or 17C, the encoding speed of the image encoding apparatus 200 corresponding to the image decoding apparatus 100 may be improved, without the deterioration of the performance of inverse transformation according to the MTS in the image decoding apparatus 100.

Also, because the image decoding apparatus 100 may parse the syntax element according to the MTS in the syntax structure of the coding unit or the transform unit and not in the residual coding syntax structure, a parsing delay until parsing of the residual syntax structure may not occur. Thus, separate parsing with respect to (inverse) transform may be possible, and there may be an advantage for parallel processing.

Compared to when the syntax element, etc. are obtained from a header of an SPS or a PPS including a parameter commonly applied to a lower data unit, when the image decoding apparatus 100 obtains the syntax element from the syntax structure of the coding unit, the syntax structure of the transform unit, and the residual coding syntax structure, the image decoding apparatus 100 may first obtain the syntax element from the syntax structure of the coding unit, then, may call at least one syntax structure of the transform unit from the syntax structure of the coding unit, and then, may obtain the syntax element from the syntax structure of the transform unit. Also, the image decoding apparatus 100 may call the residual coding syntax structure from the syntax structure of the transform unit, and then, may obtain the syntax element from the residual coding syntax structure. That is, when the image decoding apparatus 100 obtains the syntax element from the syntax structure having a depth (the syntax structures of the coding unit/transform unit/and the residual coding syntax structure), and when the image decoding apparatus 100 obtains the syntax element from a syntax structure having a greater depth, a parsing delay may occur compared to when the image decoding apparatus 100 obtains the syntax element from a syntax structure having a less depth. In general, the syntax structure of the transform unit or the coding unit may include a syntax element mainly corresponding to mode information, and the residual coding syntax structure may include a syntax element associated with a value (that is, sample data) of a transform coefficient, and thus, it is desirable to obtain a syntax element related to the mode information, such as a syntax element according to the MTS, from the syntax structure of the coding unit or the transform unit including the syntax element mainly corresponding to the mode information, rather than the residual coding syntax structure, and in this case, a parsing delay may also be reduced.

FIG. 17D illustrates a syntax structure of a coding unit including a syntax element of multiple transform selection, according to various embodiments.

Referring to FIG. 17D, when a tree type is not dual tree chroma DUAL_TREE_CHROMA and a value of a transform skip flag transform_skip_flag is 1 in a coding unit syntax structure 1740, the image decoding apparatus 100 may parse mtx_idx 1745 according to an additional condition below, when a maximum value of a widtdh cbWidth or a height cbHeight of a coding unit is less than or equal to 32, when a value of a sub-block transform flag cu_sbt_flag is 0 and a value of tu_cbf_luma is 1. That is, when a prediction mode CuMode of a current coding unit is an intra-mode MODE_INTRA and a value of an MTS enable flag sps_explicit_mts_intra_enabled_flag in the intra-mode, the MTS enable flag being obtained from an SPS, is 1, or when a prediction mode CuPredMode of the current coding unit is an inter-mode MODE_INTER and a value of the MTS enable flag sps_explicit_mts_inter_enabled_flag in the inter-mode, the MTS enable flag being obtained from the SPS, is 1, the image decoding apparatus 100 may parse mtx_idx 1745. The image decoding apparatus 100 may determine a horizontal transform kernel type trTypeHor and a vertical transform kernel type trType Ver according to a value of mtx_idx 1745, as shown in Table 7 below. Here, when a value of a transform kernel type is 0, a corresponding transform kernel may denote the DCT2, and when the value is 1 or 2, the transform kernel may denote the DST7 or the DCT8 (However, it is not limited thereto and may denote one of various transform kernels.).

TABLE 7

| mts_idx | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

According to various embodiments described with reference to FIG. 17D, because, in the image decoding apparatus 100, the syntax element according to the MTS is parsed in the syntax structure of the coding unit and not in the residual coding syntax structure, the parsing delay until parsing of the residual syntax structure may not occur, and thus, the image decoding apparatus 100 may separately parse with respect to (inverse) transform and may have an advantage for parallel processing.

FIG. 18A illustrates a residual coding syntax structure including a transform unit syntax and a transform skip flag, according to various embodiments.

Referring to FIG. 18A, when values of tu_cbf_luma, which is a coded block flag of a transform unit of a luma component and tu_cbf_cb or tu_cbf_cr, which is a coded block flag of a transform unit of a chroma component cb or cr, are 1 in the transform unit syntax structure 1800, the image decoding apparatus 100 may call and parse a residual coding syntax structure residual_coding 1810.

When a value of a flag transform_skip_enabled_flag indicating whether or not to enable a transform skip in the residual coding syntax structure 1810 is 1 and cldx is not 0 (that is, a color component is a chroma component), or when it is determined not to perform (inverse) transform by using MTS and a value log2TbWidth or log2TbHeight, which is obtained by applying log2 to a width and a height of the transform unit, is less than or equal to 2 (that is, when the width and the height of the transform unit is less than or equal to 4×4), the image decoding apparatus 100 may parse a transform skip flag transform_skip_flag 1815.

According to the embodiment described above, not all parsing operations are performed in the syntax structure of the transform unit, and the parsing operations are performed in the residual coding syntax structure. Also, syntaxing with respect to (inverse) transform may not be performed in one syntax structure. Thus, a syntax element (in particular, a transform skip flag) with respect to transform may have to be separately parsed, or a location change of a syntax with respect to a transform skip mode may be required in order to increase the decoding efficiency of a screen content sequence.

The image encoding apparatus 200 may separately evaluate whether or not to skip (inverse) transform in the transform unit according to the transform skip mode along with a size of a transform skip block to be applied in the transform skip mode. Also, the image decoding apparatus 100 may separately parse information about whether or not to skip (inverse) transform in the transform unit according to the transform skip mode along the size of the transform skip block to be applied in the transform skip mode.

When a tree type is not dual tree chroma, the image decoding apparatus 100 may parse a flag indicating whether or not to skip (inverse) transform according to the transform skip mode, when a width tb Width of the transform unit is less than sps_trans_skip_size obtained from an SPS or a height tbHeight of the transform unit is less than sps_trans_skip_size, when a value of a flag sps_trans_skip_ flag indicating whether or not to enable the transform skip mode obtained from the SPS is 1. Here, sps_trans_skip_size indicates a maximum size of a block used in the transform skip mode and may be obtained not only from the SPS, but also from a video parameter set (VPS), a picture parameter set (PPS), a tile group header or a slice header. When the value of the transform skip flag is 1, the image decoding apparatus 100 may skip (inverse) transform with respect to the current transform unit according to the transform skip mode. When the value of the transform skip flag is 0, the image decoding apparatus 100 may not apply the transform skip mode with respect to the current transform unit.

When cbf of a transform unit of a luma component tu_cbf_luma is 1, the image decoding apparatus 100 may determine whether or not to skip (inverse) transform with respect to the luma component according to the transform skip mode. Alternatively, when cbf of a transform unit of a chroma component cr or cb tu_cbf_cr or tu_cbf_cb is 1, the image decoding apparatus 100 may determine whether or not to skip (inverse) transform with respect to the chroma component cr or cb according to the transform skip mode.

When tu_cbf_luma is 1 when the MTS is used in the SPS, the image decoding apparatus 100 may parse the flag indicating whether or not to skip (inverse) transform according to the transform skip mode, according to an additional condition below, when sps_trans_skip_enable_flab is 1, when a tree type is not dual tree chroma.

When the width tbWidth of the current transform unit is less than or equal to sps_transform_skip_size or the height tbHeight of the current transform unit is less than or equal to sps_transform_skip_size, the image decoding apparatus 100 may parse a flag indicating whether or not to skip (inverse) transform according to the transform skip mode.

When cbf of a transform unit of a luma component tu_cbf_luma is 1, the image decoding apparatus 100 may determine whether or not to skip (inverse) transform with respect to the luma component according to the transform skip mode. Alternatively, when cbf of a transform unit of a chroma component cr or cb tu_cbf_cr or tu_cbf_cb is 1, the image decoding apparatus 100 may determine whether or not to skip (inverse) transform with respect to the chroma component cr or cb according to the transform skip mode.

The image encoding apparatus 200 may evaluate whether or not to skip (inverse) transform in the transform unit according to the transform skip mode along with other transform methods, along with a size of the transform skip block to be applied in the transform skip mode, and the image decoding apparatus 100 may parse information about whether or not to skip (inverse) transform according to the transform skip mode along with other transform methods.

When a tree type is not dual tree chroma, the image encoding apparatus 200 may parse the flag indicating whether or not to skip (inverse) transform according to the transform skip mode from a bitstream according to an additional condition below, when a value of sps_trans_skip_enabled_flag is 1. Alternatively, when the MTS is used with respect to the current transform unit and when a value of tu_cbf_luma is 1, the image encoding apparatus 200 may parse the flag indicating whether or not to skip (inverse) transform according to the transform skip mode from the bitstream according to the additional condition below, when the value of sps_trans_skip_flag is 1 when the tree type is not dual tree chroma.

When a width tbWidth of the transform unit is less than sps_transform_skip_size obtained from an SPS or a height tbHeight of the transform unit is less than sps_transform_skip_size, the image decoding apparatus 100 may parse the flag indicating whether or not to skip (inverse) transform according to the transform skip mode. Here, sps_trans_skip_size indicates a maximum size of a block used in the transform skip mode and may be obtained not only from the SPS, but also from a VPS, a PPS, a tile group header or a slice header. sps_trans_skip_size may be the same as a size of the block to which the MTS is applied.

The image decoding apparatus 100 may parse a harmonized transform syntax element from a bitstream. A harmonized transform syntax element may indicate whether or not to apply other transform kernels (the DCT2, the DST7, the DCT8, the DST4, and the DCT4) and the transform skip mode.

The harmonized transform syntax element may include codewords composed as shown in Table 8 below.

TABLE 8

| Number | Whether or not to use TS | Whether or not to use DCT2 | Whether or not to use MTS | Codewords |
|---|---|---|---|---|
| 1 | On | — | — | 1 |
| 2 | Off | On | — | 01 |
| 3 | Off | Off | On | 001 |
| 4 | Off | Off | On | 0001 |
| 5 | Off | Off | On | 00000 (or 00001) |
| 6 | Off | Off | On | 00001 (or 00000) |

With respect to the cases of Numbers 3 through 6, a vertical kernel or a horizontal kernel may be determined as a pair including any of the DCT2, the DST7, the DCT8, the DST4, and the DCT4, and to which horizontal kernel or vertical kernel the codewords of each number correspond may be adaptively determined based on at least one of a size of a block, a ratio between a width and a height of the block, a prediction type, an intra-prediction mode, and a quantization parameter.

Also, the order of Numbers 1 through 6 may be adaptively determined based on at least one of the size of the block, the ratio between the width and the height of the block, the prediction type, the intra-prediction mode, and the quantization parameter.

The harmonized transform syntax element may include codewords composed as shown in Table 9 below.

TABLE 9

| Number | Whether or not to use TS | Whether or not to use DCT2 | Whether or not to use MTS | Codewords |
|---|---|---|---|---|
| 1 | On | — | — | 1 |
| 2 | Off | On | — | 01 |
| 3 | Off | Off | On | 0000 |
| 4 | Off | Off | On | 0001 |
| 5 | Off | Off | On | 0010 |
| 6 | Off | Off | On | 0011 |

With respect to the cases of Numbers 3 through 6, a vertical kernel or a horizontal kernel may be determined as a pair including any of the DCT2, the DST7, the DCT8, the DST4, and the DCT4, and to which horizontal kernel or vertical kernel the codewords of each number correspond may be adaptively determined based on at least one of a size of a block, a ratio between a width and a height of the block, a prediction type, an intra-prediction mode, and a quantization parameter.

Also, the order of Numbers 1 through 6 may be adaptively determined based on at least one of the size of the block, the ratio between the width and the height of the block, the prediction type, the intra-prediction mode, and the quantization parameter.

FIG. 18B illustrates a syntax structure of a transform unit including a transform skip flag, according to various embodiments.

Referring to FIG. 18B, the image decoding apparatus 100 may parse a flag transform_skip_flag indicating whether or not to skip (inverse) transform according to a transform skip mode in a transform unit syntax structure 1820. For example, when tu_cbf_luma is 1 and a tree type is not dual tree chroma, and when a value of sps_transform_skip_enabled_flag is 1 and a width tBWidth of a current transform unit is less than or equal to a maximum skip block size MaxTsSize and a height tBHeight of the current transform unit is less than or equal to the maximum skip block size MaxTsSize, the image decoding apparatus 100 may parse a flag transform_skip_flag 1825 indicating whether or not to skip (inverse) transform according to the transform skip mode, when a value of a flag cu_sbt_flag indicating whether or not to use SBT is 0.

When tu_cbf_cb is 1 and the tree type is not dual tree chroma, and when the value of sps_transform_skip_enabled_flag is 1 and a width wC of a current transform unit of a chroma component cb is less than or equal to the maximum skip block size MaxTsSize and a height hC of the current transform unit of the chroma component cb is less than or equal to the maximum skip block size MaxTsSize, the image decoding apparatus 100 may parse a flag transform_skip_flag 1830 indicating whether or not to skip (inverse) transform with respect to a current transform unit of a chroma component cr according to the transform skip mode, when the value of the flag cu_sbt_flag indicating whether or not to use SBT is 0.

When tu_cbf_cr is 1 and the tree type is not dual tree chroma, and when it is not that tu_cbf_cb is 1 and a value of tu_joint_cbcr_residual_flag is 1, the image decoding apparatus 100 may parse a flag transform_skip_flag 1835 indicating whether or not to skip (inverse) transform with respect to the current transform unit of the chroma component cb according to the transform skip mode, when the value of the flag cu_sbt_flag indicating whether or not to use SBT is 0, when the value of sps_transform_skip_enabled_flag is 1 and a width wC of the current transform unit of the chroma component cr is less than or equal to the maximum skip block size MaxTsSize and a height hC of the current transform unit of the chroma component er is less than or equal to the maximum skip block size MaxTsSize. Here, tu_joint_cb_cr_residual_flag is a flag indicating whether or not to obtain only a residual of the chromate component cb, rather than obtaining residuals of both of the chroma components cb and cr, so that the residual of the chroma component cr is generated by using the residual of the chroma component cb.

Figure 19A:
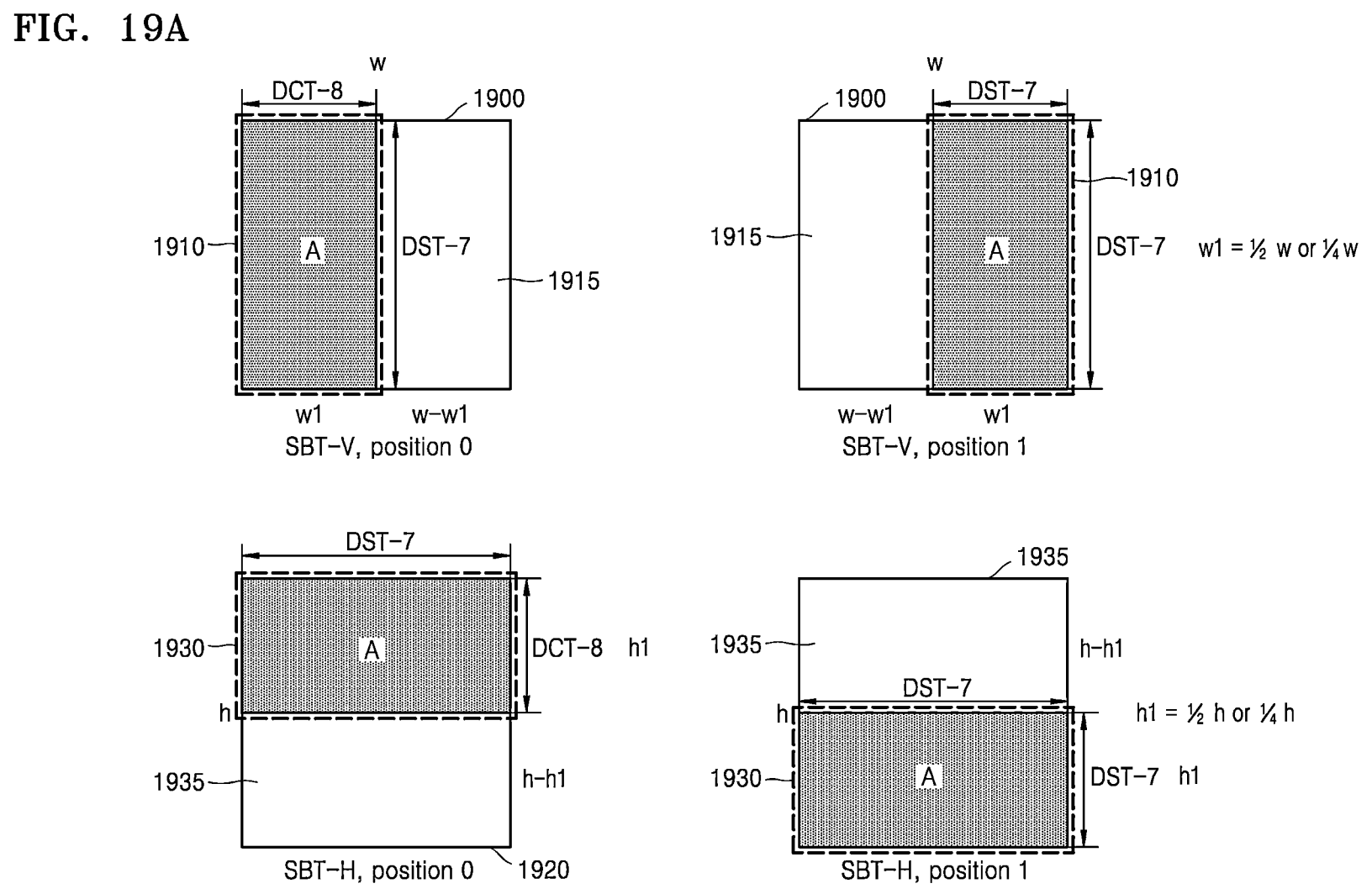

FIG. 19A is a diagram for describing an SBT mode with respect to a block encoded in an inter-mode, according to an embodiment.

Referring to FIG. 19A, the image decoding apparatus 100 may perform inverse transformation according to an SBT mode, when a prediction mode of a current coding unit is an inter-prediction mode. The SBT mode denotes a mode in which the current coding unit is split into two sub-blocks (transform units) based on a split direction, a size of a sub-block, and a location of the sub-block, inverse transformation is performed on only one sub-block of the split two sub-blocks and is not performed on the other sub-block, and all residual values are filled with 0.

The image decoding apparatus 100 may parse a syntax element regarding SBT as below.

First, the image decoding apparatus 100 may parse a flag cu_sbt_flag indicating whether or not to use the SBT with respect to the current coding unit. When a value of the flag cu_sbt_flag is 1, the image decoding apparatus 100 may determine to use the SBT with respect to the current coding unit. When a value of the flag cu_sbt_flag is 0, the image decoding apparatus 100 may determine not to use the SBT with respect to the current coding unit. When the flag cu_sbt_flag does not exist in a bitstream, the image decoding apparatus 100 may determine not to use the SBT with respect to the current coding unit.

Also, the image decoding apparatus 100 may parse a flag cu_sbt_quad_flag indicating whether or not to split the current coding unit into sub-blocks including a sub-block having a ¼ size. When a value of the flag cu_sbt_quad_flag is 1, the image decoding apparatus 100 may determine that the current coding unit is split into the sub-blocks including the sub-block having the ¼ size. When the value of the flag cu_sbt_quad_flag is 0, the image decoding apparatus 100 may determine that the current coding unit is split into sub-blocks including a sub-block having a ½ size.

When the flag cu_sbt_quad_flag does not exist in the bitstream, the image decoding apparatus 100 may determine that the current coding unit is split into the sub-blocks including the sub-block having the ½ size.

The image decoding apparatus 100 may parse a flag cu_sbt_horizontal_flag indicating whether or not to horizontally split the current coding unit into two transform units.

When a value of the flag cu_sbt_horizontal_flag is 1, the image decoding apparatus 100 may determine that the current coding unit is horizontally split. When the value of the flag cu_sbt_horizontal_flag is 0, the image decoding apparatus 100 may determine that the current coding unit is vertically split.

When the flag cu_sbt_horizontal_flag does not exist in the bitstream, the image decoding apparatus 100 may decode the flag cu_sbt_horizontal_flag based on whether or not (allowSbtHorQ) to allow the current coding unit to be horizontally split into the sub-blocks including the sub-block having the ¼ size, when the value of the flag cu_sbt_quad_flag is 1.

When the value of the flag cu_sbt_quad_flag is 0, the image decoding apparatus 100 may decode the flag cu_sbt_horizontal_flag based on whether or not (allowSbtHorH) to allow the current coding unit to be horizontally split into the sub-blocks including the sub-block having the ½ size.

The image decoding apparatus 100 may parse a flag sbt_pos_flag indicating a location of a transform unit on which inverse transformation is performed (or the other transform unit on which inverse transformation is not performed) of two transform units, with respect to the current coding unit.

For example, when a value of the flag cu_pos_flag is 1, the image decoding apparatus 100 may determine that tu_cbf_luma, tu_cbf_cb, and tu_cbf_cr do not exist in a bitstream with respect to a first transform unit of the two transform unit, with respect to the current coding unit. When the value of the flag cu_pos_flag is 0, the image decoding apparatus 100 may determine that tu_cbf_luma, tu_cbf_cb, and tu_cbf_cr do not exist in a bitstream with respect to a second transform unit of the two transform unit, with respect to the current coding unit.

For example, when a current coding unit 1900 is vertically split (SBT-V) in two transform units 1910 and 1915, and when a position is 0, the image decoding apparatus 100 may perform inverse transformation on the transform unit 1910 having a width w1 (½w or ¼w) by using a DCT8, as a horizontal transform kernel, and a DCT7 as a vertical transform kernel. All residual values may be determined as 0, with respect to the other transform unit 1915.

When the current coding unit 1900 is vertically split (SBT-V) in the two transform units 1910 and 1915, and when the position is 1, the image decoding apparatus 100 may perform inverse transformation on the transform unit 1910 having the width w1 (½w or ¼w) by using the DST7, as a horizontal transform kernel, and DST7 as a vertical transform kernel. All residual values may be determined as 0, with respect to the other transform unit 1915.

When a current coding unit 1920 is horizontally split (SBT-V) into two transform units 1930 and 1935, and when a position is 0, the image decoding apparatus 100 may perform inverse transformation on the transform unit 1930 having a height h1 (½h or ¼h) by using the DST7, as a horizontal transform kernel, and the DCT8 as a vertical transform kernel. All residual values may be determined as 0, with respect to the other transform unit 1935.

In the case of the SBT mode according to an embodiment described with reference to FIG. 19A, only one sub-block is an object of (inverse) transform and an area of the other sub-block is not an object for information signaling, and thus, a loss of information may occur with respect to an area to which the (inverse) transform is not applied. Also, in the case of the SBT mode according to an embodiment described with reference to FIG. 19A, only one sub-block is the object of (inverse) transform and an area of the other sub-block is not the object for information signaling, and thus, based on this aspect, in terms of coefficient encoding after transform (in an encoding apparatus) or transform coefficient encoding applied before inverse transformation (in a decoding apparatus), additional bit reduction may be achieved.

In the case of the SBT mode according to an embodiment described with reference to FIG. 19A, only one sub-block is the object of (inverse) transform and an area of the other sub-block is not the object for information signaling, and thus, by changing the semantics with respect to an area in which all blocks are encoded as 0 through a coded block flag (CBF), additional bit reduction may be achieved.

Hereinafter, various embodiments to solve the problems of the SBT mode according to an embodiment described with reference to FIG. 19A will be described.

Figure 19B:
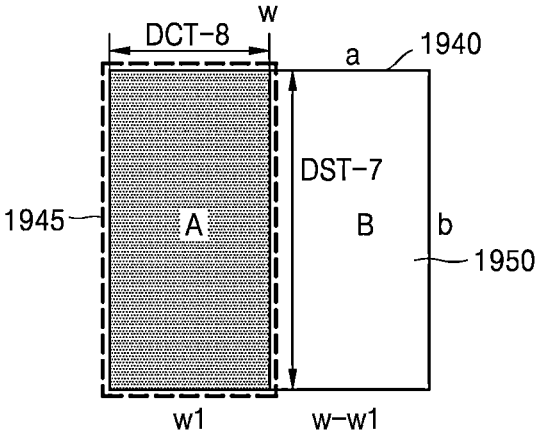
FIG. 19B is a diagram for describing an SBT mode with respect to a block encoded in an inter-mode, according to an embodiment.

FIG. 19B is a diagram for describing an SBT mode with respect to a block encoded in an inter-mode, according to an embodiment.

Referring to FIG. 19B, the image decoding apparatus 100 may perform inverse transformation not only on a transform unit 1945 included in a current coding unit 1940, but also on a transform unit 1950.

The image decoding apparatus 100 may also perform inverse transformation on the transform unit 1950 by using transform kernels based on one default mode from various transform kernel sets with respect to the transform unit 1950. Available Default modes 1 through 9 are as shown in Table 10 below.

TABLE 10

| Default mode1 | a = DCT2, b = DCT2 |
|---|---|
| Default mode2 | a = DCT2, b = DCT8 |
| Default mode3 | a = DCT2, b = DST7 |
| Default mode4 | a = DCT8, b = DCT2 |
| Default mode5 | a = DCT8, b = DCT8 |
| Default mode6 | a = DCT8, b = DST7 |
| Default mode7 | a = DST7, b = DCT2 |
| Default mode8 | a = DST7, b = DCT8 |
| Default mode9 | a = DST7, b = DST7 |

One of ordinary skill in the art would understand that Default modes 1 through 9 may be applied to various transform units 1915 and 1935 of FIG. 19A, on which transform is not performed.

Figure 19C:
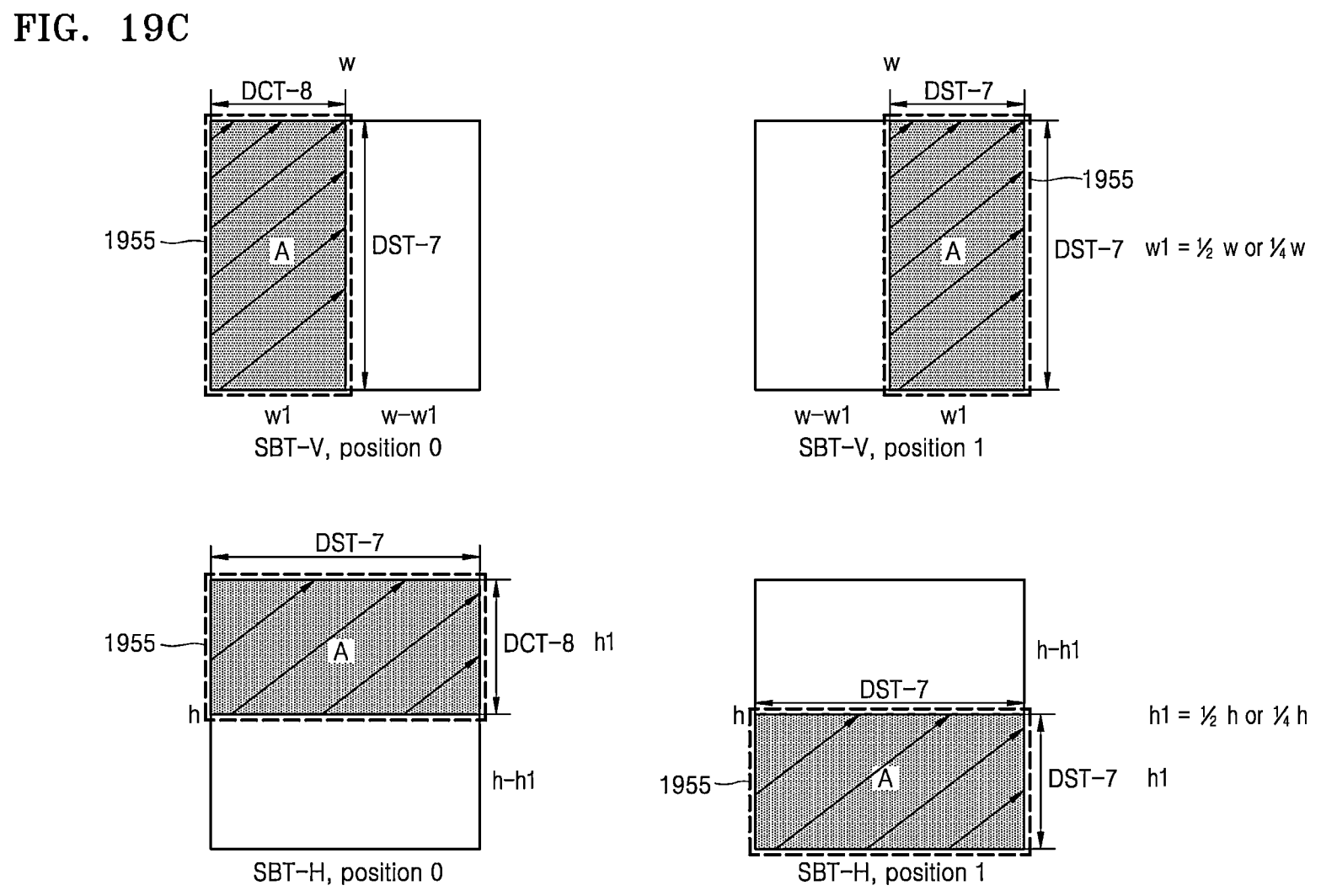

FIG. 19C is a diagram for describing a process of encoding and decoding a coefficient based on SBT with respect to a block encoded in an inter-mode, according to an embodiment.

In the case of the SBT, only one sub-block is an object of (inverse) transform and an area of the other sub-block is not an object for information signaling, and thus, based on this aspect in terms of coefficient encoding after transform (in an encoding apparatus) or transform coefficient encoding applied before inverse transformation (in a decoding apparatus) as below, additional bit reduction may be achieved.

The image decoding apparatus 100 may determine only an area to which the SBT is applied as a scan area during coefficient encoding. Referring to FIG. 19C, the image decoding apparatus 100 may determine only a block 1955 to which the SBT is applied as the scan area and may scan information about a transform coefficient with respect to the scan area according to a scan order. In detail, the image decoding apparatus 100 may determine an area of the block 1955, to which the SBT is applied, as the scan area, according to a size of the block, and may scan the information about the transform coefficient with respect to the scan area according to the scan order.

The image decoding apparatus 100 may determine whether or not to parse information about a location of x and y coordinates of a last significant coefficient during transform coefficient decoding. For example, when a location of a last pixel at a right lower end of the area (or the scan area) to which the SBT is applied during transform coefficient decoding is the same as x and y coordinates of a last significant coefficient during the transform coefficient decoding, the image decoding apparatus 100 may not parse information indicating the x and y coordinates of the last significant coefficient during the transform coefficient decoding from a bitstream. When the x and y coordinates of the last significant coefficient that are parsed from the bitstream do not exist, the image decoding apparatus 100 may determine the x and y coordinates of the last significant coefficient as the location of the last pixel at the right lower end of the area (or the scan area) to which the SBT is applied.

When, during transform coefficient decoding, a flag of a coding group (CG) overlaps a flag of a last CG at the right lower end of the area (or the scan area) to which the SBT is applied, the image decoding apparatus 100 may also skip parsing of the flag of the last CG at the right lower end of the area (or the scan area) to which the SBT is applied. Here, the CG is a block having a predetermined size. For example, the CG may be a block having a 4×4 size.

Also, when, during the transform coefficient decoding, a significant coefficient flag overlaps a significant coefficient flag at the location of the last pixel at the right lower end of the area (or the scan area) to which the SBT is applied, the image decoding apparatus 100 may also skip parsing of the flag of the last pixel at the right lower end of the area (or the scan area) to which the SBT is applied.

The image decoding apparatus 100 may achieve additional bit reduction by changing the semantics with respect to an area for which all residual values are determined as 0 through a CBF.

The image decoding apparatus 100 may indicate whether or not to apply the SBT according to a cbf type, in the case of cu_cbf with respect to a block (CU or TU) to which SBT is applied. In this case, the image decoding apparatus 100 may skip parsing of a flag determining whether or not to apply the SBT.

When the CBF is 1, the image decoding apparatus 100 may determine that there is at least one coefficient in the block (CU or TU).

When the CBF is 2, the image decoding apparatus 100 may determine that the SBT is applied, at least one coefficient exists in a left sub-block of the block (CU or TU), and no coefficient exists in a right sub-block.

When the CBF is 3, the image decoding apparatus 100 may determine that the SBT is applied, at least one coefficient exists in the right sub-block of the block (CU or TU), and no coefficient exists in the left sub-block.

The image decoding apparatus 100 may determine a value of a flag indicating whether or not to use a transform skip mode by using an MTSIdx. In the case of the transform skip mode, the transform skip mode may be operated in screen content having an image, the characteristics of which are different from those of an image used in the MTS. Here, the MTSIdx is an index indicating an MTS mode, and when the value thereof is 0, the horizontal and vertical transform kernels indicate a DCT2, and when the value thereof is one of 1 through 4, the horizontal or vertical transform kernel may be determined as one of a DCT7 and a DCT8, based on the value.

However, according to the MTSIdx, decoding is inefficiently performed by using the same context modelling as an MTS flag without taking into account the characteristics of the transform skip mode.

Thus, the image decoding apparatus 100 according to an embodiment may determine an index indicating a context model during context modeling of the transform skip flag, as below. The image decoding apparatus 100 may determine the index indicating the context model during the context modeling of the transform skip flag, based on a size of a current transform unit. The image decoding apparatus 100 may determine the index indicating the context model during the context modeling of the transform skip flag, based on at least one of a height and a width of the current transform unit. For example, the index indicating the context model may be determined based on $\min(\log_2 W, \log_2 H)$, $\text{average}(\log_2 W, \log_2 H)$, or $\log_2 W + \log_2 H$. It is not limited thereto. The image decoding apparatus 100 may determine the index indicating the context model during the context modeling of the transform skip flag, in various shapes, based on the size of the current transform unit.

The image decoding apparatus 100 may determine the index indicating the context model during the context modeling of the transform skip flag, based on an area of the current transform unit.

The image decoding apparatus 100 may determine the index indicating the context model during the context modeling of the skip flag, based on a block type of the current transform unit or a current coding unit including the current transform unit. Here, the block type may indicate whether a block is encoded in an inter-mode or in an intra-mode.

The image decoding apparatus 100 may determine the index indicating the context model during the context modeling of the transform skip flag, based on a shape (or a ratio between height/width) of the current transform unit.

The image decoding apparatus 100 may determine the index indicating the context model during the context modeling of the skip flag, based on a prediction type (for example, uni-prediction or bi-prediction) of a current block.

The image decoding apparatus 100 may determine the index indicating the context model during the context modeling of the transform skip flag, based on a neighboring skip flag. The image decoding apparatus 100 may determine the index indicating the context model during the context modeling of the transform skip flag, based on whether a value of the MTSIdx is 0. Here, the MTSIdx may be with respect to the current block. However, the MTSIdx is not limited thereto and may be with respect to a neighboring block.

The image decoding apparatus 100 may allow the SBT in a horizontal direction or the SBT in a vertical direction based on a size of the block.

For example, when a width satisfies the condition of a width limit or a height satisfies the condition of a height limit, the image decoding apparatus 100 may allow the SBT in the horizontal direction or the SBT in the vertical direction. Here, there is no dependency between a current width and a current height.

The image decoding apparatus 100 may parse information about the SBT based on Pseudo Code 1.

---

Pseudo Code 1

---

Parse SBT_flag
If SBT_flag = 1
    Parse SBT_type of 1/2 or 1/4 (2:2 or 1:3/3:1)
    Parse SBT_dir flag (ctxIdx): Hor or Ver
      ctxIdx = (cuWidth == cuHeight) ? 0 : (cuWidth < cuHeight ? 1: 2)
    Parse SBT_pos (p0 or p1)

---

That is, according to Pseudo Code 1, the image decoding apparatus 100 may parse SBT_flag. When a value thereof is 1, the image decoding apparatus 100 may parse SBT_type indicating ½ or ¼ and parse SBT_dir_flag based on ctxIdx to determine a split direction. Here, ctxIdx may be determined according to a width cuWidth and a height cuHeight of a current block. The image decoding apparatus 100 may determine whether a location of a transform block is p0 or p1 by parsing SBT_pos indicating a location of a sub-block.

The image decoding apparatus 100 according to an embodiment may determine a split direction of the SBT, the split direction being adaptive according to a block shape based on a current size limit.

The image decoding apparatus 100 may allow only the SBT in the vertical direction, when the width of the current block is greater than the height of the current block. The image decoding apparatus 100 may allow only the SBT in the horizontal direction, when the width of the current block is less than the height of the current block. When the width and the height of the current block are the same as each other, the image decoding apparatus 100 may allow both the SBT in the horizontal direction and the SBT in the vertical direction. This may be because coefficients of residuals of a wide block or a long block are concentrated at one side of CU, and thus, the image decoding apparatus 100 may determine whether or not to allow the SBT in the horizontal direction or the SBT in the vertical direction to reduce the overheads of the SBT split direction.

The image decoding apparatus 100 may parse information about the SBT based on Pseudo Code 2.

---

Pseudo Code 2

---

Parse SBT flag
    If SBT_flag = 1
        Parse SBT_type of 1/2 or 1/4 (2:2 or 1:3/3:1)
        if cuWidth == cuHeight
          Parse SBT_dir flag
        Else
          SBT_dir flag = vertical, if cuWidth > cuHeight
          SBT_dir flag = horizontal, if cuWidth < cuHeight
        Parse SBT_pos (p0 or p1)

---

That is, according to Pseudo Code 2, the image decoding apparatus 100 may parse SBT_flag. When a value thereof is 1, the image decoding apparatus 100 may parse SBT_type indicating ½ or ¼, and when a height and a width of the current coding unit are the same as each other, the image decoding apparatus 100 may parse SBT_dir_flag to determine a split direction. If that is not the case, for example, when the height of the current coding unit is less than the width of the current coding unit, the image decoding apparatus 100 may not parse SBT_dir flag and may determine the split direction as a vertical direction. When the height of the current coding unit is greater than the width of the current coding unit, the image decoding apparatus 100 may not parse SBT_dir_flag and may determine the split direction as a horizontal direction.

The image decoding apparatus 100 may parse information about the SBT based on Pseudo Code 3.

---

Pseudo Code 3

---

Parse SBT flag
If SBT flag = 1
    cuWidth < cuHeight
      Parse SBT_type of horizontal ½ or ¼ (if both ½, ¼ is allowed)
    cuWidth > cuHeight
      Parse SBT_type of vertical ½ or ¼ (if both ½ ¼ is allowed)
    cuWidth == cuHeight
      Parse SBT_dir flag
      Parse SBT_type
    Parse SBT_pos (p0 or p1)

---

That is, based on Pseudo Code 3, the image decoding apparatus 100 may parse SBT_flag. When a value thereof is 1, and when a height of the current coding unit is greater than a width (+ when both ½ and ¼ are allowed), the image decoding apparatus 100 may parse SBT_type of ½ or ¼ in the horizontal direction.

The image decoding apparatus 100 may parse SBT_flag. When the value is 1, and when the width of the current coding unit is less than the height (+ when both ½ and ¼ are allowed), the image decoding apparatus 100 may parse SBT_type of ½ or ¼ in the vertical direction.

When the height of the current coding unit is the same as the width of the current coding unit, the image decoding apparatus 100 may parse SBT_dir_flag and may parse SBT_type.

The image decoding apparatus 100 may determine whether a location of a transform block is p0 or p1 by parsing SBT_pos.

However, the dependency of a block shape is not limited to a value of the width or the height of the current coding unit and may be based on the conditions width>ratio*height and height>ratio*width, wherein the ratio may be 1, 2, or 4, but is not limited thereto.

The image decoding apparatus 100 according to an embodiment may determine a split direction of the SBT, the split direction being adaptive according to the block shape based on the current size limit.

The image decoding apparatus 100 may allow only the SBT in the horizontal direction, when the width of the current block is greater than the height of the current block. The image decoding apparatus 100 may allow only the SBT in the vertical direction, when the width of the current block is less than the height of the current block. When the width and the height of the current block are the same as each other, the image decoding apparatus 100 may allow both the SBT in the horizontal direction and the SBT in the vertical direction. This may be because, in a wide block, some residuals are located above or below a horizontal boundary and there is almost no residual at the other areas, and in a long block, some residuals are located on the left side or the right side of a vertical boundary and there is almost no residual at the other areas, and thus, based on this characteristics, whether or not to allow the SBT in the horizontal direction or the vertical direction may be determined to reduce the overheads of the SBT split direction.

The image decoding apparatus 100 may parse information about the SBT based on Pseudo Code 4.

---

Pseudo Code 4

```
Parse SBT flag
If SBT_flag = 1
    Parse SBT_type of 1/2 or 1/4 (2:2 or 1:3/3:1)
    If cuWidth == cuHeight
        Parse SBT_dir flag
    Else
        SBT_dir flag = horizontal, if cuWidth > cuHeight
        SBT_dir flag = vertical, if cuWidth < cuHeight
    Parse SBT_pos (p0 or p1)
```

---

That is, according to Pseudo Code 4, the image decoding apparatus 100 may parse SBT_flag. When a value thereof is 1, the image decoding apparatus 100 may parse SBT_type indicating ½ or ¼, and when a height and a width of the current coding unit are the same as each other, the image decoding apparatus 100 may parse SBT_dir_flag to determine a split direction. If that is not the case, for example, when the height of the current coding unit is less than the width of the current coding unit, the image decoding apparatus 100 may not parse SBT_dir flag and may determine the split direction as a horizontal direction. When the height of the current coding unit is greater than the width of the current coding unit, the image decoding apparatus 100 may not parse SBT_dir_flag and may determine the split direction as a vertical direction.

The image decoding apparatus 100 may parse information about the SBT based on Pseudo Code 5.

---

Pseudo Code 5

```
Parse SBT flag
If SBT flag = 1
    cuWidth < cuHeight
        Parse SBT_type of vertical ½ or ¼ (if both ½, ¼ is allowed)
    cuWidth > cuHeight
        Parse SBT_type of horizontal ½ or ¼ (if both ½ ¼ is allowed)
    cuWidth == cuHeight
        Parse SBT_dir flag
        Parse SBT_type
Parse SBT_pos (p0 or p1)
```

---

That is, based on Pseudo Code 5, the image decoding apparatus 100 may parse SBT_flag. When the value is 1, and when a height of the current coding unit is greater than a width (+ when both ½ and ¼ are allowed), the image decoding apparatus 100 may parse SBT_type of ½ or ¼ in the vertical direction.

The image decoding apparatus 100 may parse SBT_flag. When the value is 1, and when the width of the current coding unit is less than the height (+ when both ½ and ¼ are allowed), the image decoding apparatus 100 may parse SBT_type of ½ or ¼ in the horizontal direction.

When the height of the current coding unit is the same as the width of the current coding unit, the image decoding apparatus 100 may parse SBT_dir_flag and may parse SBT_type.

The image decoding apparatus 100 may determine whether a location of the transform block is p0 or p1 by parsing SBT_pos.

However, the dependency of a block shape is not limited to a value of the width or the height of the current coding unit and may be based on the conditions width>ratio*height and height>ratio*width, wherein the ratio may be 1, 2, or 4, but is not limited thereto.

FIG. 20A illustrates a residual coding syntax structure for determining a size of a scanned area, according to an embodiment.

Referring to FIG. 20A, when a value of sps_mts_enabled_flag is 1, a value of cu_sbt_flag is 1, an index of a color component is 0 (that is, a current color component is a luma component), a value obtained by applying log2 to a width of a current transform unit is 5, and a value obtained by applying log2 to a height of the current transform unit is less than 6, in the residual coding syntax structure 2000, the image decoding apparatus 100 may determine a value obtained by applying log2 to a width of an area in a transform unit, the area being subject for scanning of the transform unit, as 4. That is, the width of the area in the transform unit, the area being subject for the scanning of the transform unit, may be determined as 16. If that is not the case, the value obtained by applying log2 to the width of the area in the transform unit, the area being subject for the scanning of the transform unit, may be a value corresponding to a less value between 5 and a value obtained by applying log2 to a width of the current transform unit.

When a value of sps_mts_enabled_flag is 1, a value of cu_sbt_flag is 1, an index of a color component is 0 (that is, a current color component is a luma component), a value obtained by applying log2 to a height of the current transform unit is 5, and a value obtained by applying log2 to a width of the current transform unit is less than 6, in the residual coding syntax structure 2000, the image decoding apparatus 100 may determine a value obtained by applying log2 to a height of an area in the transform unit, the area being subject for scanning of the transform unit, as 4. That is, the height of the area in the transform unit, the area being subject for the scanning of the transform unit, may be determined as 16. If that is not the case, the value obtained by applying log2 to the height of the area in the transform unit, the area being subject for the scanning of the transform unit, may be a value corresponding to a less value between 5 and a value obtained by applying log2 to the height of the current transform unit.

FIG. 20B illustrates residual coding semantics of syntax elements indicating a location of a last significant coefficient in consideration of a scanned area, according to an embodiment.

Referring to FIG. 20B, a range of a prefix of an x location or a prefix of a y location of the last significant coefficient may be determined as a range of 0~(log2ZoTbWidth<<1)–1 or 0~(log2ZoTbHeight<<1)–1. That is, the prefix of the x location or the prefix of the y location of the last significant coefficient may be determined in the range between 0 and x and y locations of the last coefficient in an actually scanned area.

Also, a range of a suffix of the x location or a suffix of the y location of the last significant coefficient may be determined as a range of (1<<((last_sig_coeff_x_prefix>>1)–1))–1, 0~(1<<((last_sig_coeff_y_prefix>>1)–1))–1.

FIG. 20C illustrates a syntax structure of a coding unit for determining whether or not to allow a predetermined split direction and a predetermined split type based on a size (a height or a width) of a current coding unit, according to an embodiment.

Referring to FIG. 20C, when, in a coding unit syntax structure 2010, a prediction mode of a current coding unit is an inter-mode when a value of cu_cbf is 1, the image decoding apparatus 100 may determine to allow SBT in a vertical split direction having a ½ sized sub-block, when a width of the current coding unit is greater than or equal to 8, when sps_enabled_flag is 1, and the width of the current coding unit is less than or equal to a maximum size of a transform unit and a height of the current coding unit is less than or equal to the maximum size of the transform unit.

The image decoding apparatus 100 may determine to allow SBT in the vertical split direction having a ¼ sized sub-block, when the width of the current coding unit is greater than or equal to 16.

The image decoding apparatus 100 may determine to allow SBT in a horizontal split direction having a ½ sized sub-block, when the height of the current coding unit is greater than or equal to 8.

The image decoding apparatus 100 may determine to allow SBT in the horizontal split direction having a ¼ sized sub-block, when the height of the current coding unit is greater than or equal to 16.

When cu_sbt_horizontal_flag does not exist in a bitstream, the image decoding apparatus 100 may derive the value. For example, when cu_sbt_quad_flag is 1, the image decoding apparatus 100 may set cu_sbt_horizontal_flag to be the same as a value of allowSbtHorQ. When cu_sbt_quad_flag is 0, cu_sbt_horizontal_flag may be set to be the same as the value of allowSbtHorH. Each of allowSbtHorQ and allowSbtHorH may be a value indicating whether or not to allow SBT in the horizontal split direction having the ¼ sized sub-block or ½ sized sub-block.

For example, when the width of the current coding unit is greater than or equal to 8 and the height of the current coding unit is less than 8 (when the width is greater than the height of the current coding unit), the image decoding apparatus 100 may not parse cu_sbt_horizontal_flag from the bitstream and may determine to allow SBT in the horizontal split direction having the ½ sized sub-block. That is, the image decoding apparatus 100 may determine the split direction for obtaining the sub-block, without parsing cu_sbt_horizontal_flag from the bitstream based on a relative relationship between the height and the width of the current coding unit.

Although the operations of the image decoding apparatus 100 are described above with reference to FIGS. 17A to 20C, it would be obvious to one of ordinary skill in the art that the image encoding apparatus 200 may perform operations similar to those of the image decoding apparatus 100.

Various embodiments have been described above. It will be understood by those of ordinary skill in the art that the disclosure may be embodied in many different forms without departing from essential features of the disclosure. Therefore, the embodiments of the disclosure set forth herein should be considered in a descriptive sense only and not for purposes of limitation. The scope of the disclosure is set forth in the claims rather than in the foregoing description, and all differences falling within a scope equivalent thereto should be construed as being included in the disclosure.

The above-described embodiments of the disclosure may be written as a computer executable program and implemented by a general-purpose digital computer which operates the program via a computer-readable recording medium. The computer-readable recording medium may include a storage medium such as a magnetic storage medium (e.g., a ROM, a floppy disk, a hard disk, etc.) and an optical recording medium (e.g., a CD-ROM, a DVD, etc.).

The invention claimed is:
1. An image decoding method comprising:
obtaining a sub-block transform flag, from a bitstream, indicating whether or not a sub-block transform is used for a current coding unit;
obtaining, from a coding unit syntax structure in the bitstream, a syntax element regarding multiple transform selection (MTS) based on a maximum value of a width of the current coding unit or a height of the current coding unit being equal to or less than a predetermined value and the sub-block transform flag indicating that the sub-block transform is not used for the current coding unit, with respect to the current coding unit, wherein the current coding unit includes a plurality of transform units and the syntax element regarding the MTS is index information indicating a type of a horizontal transform kernel and a type of a vertical transform kernel with respect to the plurality of transform units included in the current coding unit;
determining the horizontal transform kernel and the vertical transform kernel with respect to the plurality of transform units included in the current coding unit based on the obtained syntax element regarding the MTS;
obtaining a residual block with respect to a current transform unit among the plurality of transform units by applying the determined horizontal transform kernel and vertical transform kernel to the current transform unit; and
generating a reconstruction block for the current coding unit based on the residual block with respect to the current transform unit,
wherein a same horizontal transform kernel is applied to the plurality of transform units included in the current coding unit and a same vertical transform kernel is applied to the plurality of transform units included in the current coding unit.

2. An image decoding apparatus comprising at least one processor configured to:

obtain a sub-block transform flag from a bitstream indicating whether or not a sub-block transform is used for a current coding unit;

obtain, from a coding unit syntax structure in the bitstream, a syntax element regarding multiple transform selection (MTS) based on a maximum value of a width of the current coding unit or a height of the current coding unit being equal to or less than a predetermined value and the sub-block transform flag indicating that the sub-block transform is not used for the current coding unit, with respect to the current coding unit, wherein the current coding unit includes a plurality of transform units and the syntax element regarding the MTS is index information indicating a type of a horizontal transform kernel and a type of a vertical transform kernel with respect to the plurality of transform units included in the current coding unit;

determine the horizontal transform kernel and the vertical transform kernel with respect to the plurality of transform units included in the current coding unit based on the obtained syntax element regarding the MTS;

obtain a residual block with respect to a current transform unit among the plurality of transform units by applying the determined horizontal transform kernel and vertical transform kernel to the current transform unit; and generate a reconstruction block for the current coding unit based on the residual block with respect to the current transform unit, wherein a same horizontal transform kernel is applied to the plurality of transform units included in the current coding unit and a same vertical transform kernel is applied to the plurality of transform units included in the current coding unit.

3. An image encoding method comprising:

determining a horizontal transform kernel and a vertical transform kernel with respect to a plurality of transform units included in a current coding unit by performing transformation on the plurality of transform units included in the current coding unit; and generating a syntax element regarding multiple transform selection (MTS) with respect to the current coding unit based on the horizontal transform kernel and the vertical transform kernel with respect to the plurality of transform units included in the current coding unit, wherein the syntax element regarding the MTS is index information indicating a type of a horizontal transform kernel and a type of a vertical transform kernel with respect to the plurality of transform units included in the current coding unit and the syntax element regarding the MTS is included in a coding unit syntax structure;

generating a sub-block transform flag indicating whether or not a sub-block transform is used for the current coding unit;

encoding a transform coefficient generated by performing transformation on a current transform unit among the plurality of transform units; and generating a bitstream including the encoded transform coefficient with respect to the current transform unit, the sub-block transform flag and the syntax element regarding the MTS based on a maximum value of a width of the current coding unit or a height of the current coding unit being equal to or less than a predetermined value and the sub-block transform flag indicating that the sub-block transform is not used for the current coding unit, wherein a same horizontal transform kernel is applied to the plurality of transform units included in the current coding unit and a same vertical transform kernel is applied to the plurality of transform units included in the current coding unit.

4. A method for transmitting a bitstream comprising:

determining a horizontal transform kernel and a vertical transform kernel with respect to a plurality of transform units included in a current coding unit by performing transformation on the plurality of transform units included in the current coding unit; and generating a syntax element regarding multiple transform selection (MTS) with respect to the current coding unit based on the horizontal transform kernel and the vertical transform kernel with respect to the plurality of transform units included in the current coding unit, wherein the syntax element regarding the MTS is index information indicating a type of a horizontal transform kernel and a type of a vertical transform kernel with respect to the plurality of transform units included in the current coding unit and the syntax element regarding the MTS is included in a coding unit syntax structure;

generating sub-block transform flag indicating whether or not a sub-block transform is used for the current coding unit;

encoding a transform coefficient generated by performing transformation on a current transform unit among the plurality of transform units;

generating the bitstream including the encoded transform coefficient with respect to the current transform unit, the sub-block transform flag and the syntax element regarding the MTS based on a maximum value of a width of the current coding unit or a height of the current coding unit being equal to or less than a predetermined value and the sub-block transform flag indicating that the sub-block transform is not used for the current coding unit; and transmitting the bitstream to a non-transitory computer-readable recording medium, wherein a same horizontal transform kernel is applied to the plurality of transform units included in the current coding unit and a same vertical transform kernel is applied to the plurality of transform units included in the current coding unit.

* * * * *